United States Patent
Henderson et al.

(10) Patent No.: US 11,995,285 B2
(45) Date of Patent: May 28, 2024

(54) METHODS FOR ADJUSTING AND/OR CONTROLLING IMMERSION ASSOCIATED WITH USER INTERFACES

(71) Applicant: Apple Inc., Cupertino, CA (US)

(72) Inventors: Nicholas W. Henderson, San Carlos, CA (US); Ieyuki Kawashima, Pleasanton, CA (US); Stephen O. Lemay, Palo Alto, CA (US); Israel Pastrana Vicente, Spring, TX (US); Wesley M. Holder, Union City, CA (US); Jeffrey M. Faulkner, San Francisco, CA (US); William A. Sorrentino, III, Mill Valley, CA (US); Peter D. Anton, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/932,655

(22) Filed: Sep. 15, 2022

(65) Prior Publication Data

US 2023/0008537 A1     Jan. 12, 2023

Related U.S. Application Data

(63) Continuation of application No. 17/448,876, filed on Sep. 25, 2021, now Pat. No. 11,520,456.
(Continued)

(51) Int. Cl.
*G06F 3/048*     (2013.01)
*G06F 3/01*      (2006.01)
(Continued)

(52) U.S. Cl.
CPC ............ *G06F 3/0481* (2013.01); *G06F 3/017* (2013.01); *G06F 3/0487* (2013.01)

(58) Field of Classification Search
CPC ....... G06F 3/0481; G06F 3/017; G06F 3/0487
See application file for complete search history.

(56) References Cited

U.S. PATENT DOCUMENTS

| 5,515,488 A | 5/1996 | Hoppe et al. |
| 5,524,195 A | 6/1996 | Clanton et al. |

(Continued)

FOREIGN PATENT DOCUMENTS

| JP | 2012-234550 A | 11/2012 |
| JP | 2013-257716 A | 12/2013 |

(Continued)

OTHER PUBLICATIONS

International Search Report received for PCT Patent Application No. PCT/US2021/071596, dated Apr. 8, 2022, 7 pages.

(Continued)

*Primary Examiner* — David E Choi
(74) *Attorney, Agent, or Firm* — Kubota & Basol LLP

(57) ABSTRACT

In some embodiments, an electronic device emphasizes and/or deemphasizes user interfaces based on the gaze of a user. In some embodiments, an electronic device defines levels of immersion for different user interfaces independently of one another. In some embodiments, an electronic device resumes display of a user interface at a previously-displayed level of immersion after (e.g., temporarily) reducing the level of immersion associated with the user interface. In some embodiments, an electronic device allows objects, people, and/or portions of an environment to be visible through a user interface displayed by the electronic device. In some embodiments, an electronic device reduces the level of immersion associated with a user interface based on characteristics of the electronic device and/or physical environment of the electronic device.

30 Claims, 47 Drawing Sheets

Related U.S. Application Data

(60) Provisional application No. 63/083,792, filed on Sep. 25, 2020.

(51) Int. Cl.
  *G06F 3/0481* (2022.01)
  *G06F 3/0487* (2013.01)

(56) References Cited

U.S. PATENT DOCUMENTS

| | | | |
|---|---|---|---|
| 5,610,828 | A | 3/1997 | Kodosky et al. |
| 5,737,553 | A | 4/1998 | Bartok |
| 5,740,440 | A | 4/1998 | West |
| 5,751,287 | A | 5/1998 | Hahn et al. |
| 5,758,122 | A | 5/1998 | Corda et al. |
| 5,794,178 | A | 8/1998 | Caid et al. |
| 5,877,766 | A | 3/1999 | Bates et al. |
| 5,900,849 | A | 5/1999 | Gallery |
| 5,933,143 | A | 8/1999 | Kobayashi |
| 5,990,886 | A | 11/1999 | Serdy et al. |
| 6,061,060 | A | 5/2000 | Berry et al. |
| 6,108,004 | A | 8/2000 | Medl |
| 6,112,015 | A | 8/2000 | Planas et al. |
| 6,323,846 | B1 | 11/2001 | Westerman et al. |
| 6,456,296 | B1 | 9/2002 | Cataudella et al. |
| 6,570,557 | B1 | 5/2003 | Westerman et al. |
| 6,584,465 | B1 | 6/2003 | Zhu et al. |
| 6,677,932 | B1 | 1/2004 | Westerman |
| 6,756,997 | B1 | 6/2004 | Ward et al. |
| 7,035,903 | B1 | 4/2006 | Baldonado |
| 7,137,074 | B1 | 11/2006 | Newton et al. |
| 7,230,629 | B2 | 6/2007 | Reynolds et al. |
| 7,614,008 | B2 | 11/2009 | Ording |
| 7,633,076 | B2 | 12/2009 | Huppi et al. |
| 7,653,883 | B2 | 1/2010 | Hotelling et al. |
| 7,657,849 | B2 | 2/2010 | Chaudhri et al. |
| 7,663,607 | B2 | 2/2010 | Hotelling et al. |
| 7,844,914 | B2 | 11/2010 | Andre et al. |
| 7,957,762 | B2 | 6/2011 | Herz et al. |
| 8,006,002 | B2 | 8/2011 | Kalayjian et al. |
| 8,239,784 | B2 | 8/2012 | Hotelling et al. |
| 8,279,180 | B2 | 10/2012 | Hotelling et al. |
| 8,381,135 | B2 | 2/2013 | Hotelling et al. |
| 8,479,122 | B2 | 7/2013 | Hotelling et al. |
| 8,803,873 | B2 | 8/2014 | Yoo et al. |
| 8,970,478 | B2 | 3/2015 | Johansson |
| 8,970,629 | B2 | 3/2015 | Kim et al. |
| 9,185,062 | B1* | 11/2015 | Yang ................ H04W 4/02 |
| 9,348,458 | B2 | 5/2016 | Hotelling et al. |
| 9,465,479 | B2 | 10/2016 | Cho et al. |
| 9,563,331 | B2 | 2/2017 | Poulos et al. |
| 9,681,112 | B2 | 6/2017 | Son |
| 9,851,866 | B2 | 12/2017 | Goossens et al. |
| 9,886,087 | B1* | 2/2018 | Wald ................ G06F 1/1686 |
| 9,933,937 | B2 | 4/2018 | Lemay et al. |
| 10,307,671 | B2 | 6/2019 | Barney et al. |
| 10,664,048 | B2* | 5/2020 | Cieplinski .......... H04N 21/4852 |
| 10,699,488 | B1 | 6/2020 | Terrano |
| 10,768,693 | B2 | 9/2020 | Powderly et al. |
| 10,983,663 | B2* | 4/2021 | Iglesias ................ G06F 3/0304 |
| 2001/0047250 | A1 | 11/2001 | Schuller et al. |
| 2002/0015024 | A1 | 2/2002 | Westerman et al. |
| 2002/0044152 | A1 | 4/2002 | Abbott et al. |
| 2003/0151611 | A1 | 8/2003 | Turpin et al. |
| 2004/0059784 | A1 | 3/2004 | Caughey |
| 2004/0243926 | A1 | 12/2004 | Trenbeath et al. |
| 2005/0100210 | A1 | 5/2005 | Rice et al. |
| 2005/0144570 | A1 | 6/2005 | Loverin et al. |
| 2005/0144571 | A1 | 6/2005 | Loverin et al. |
| 2005/0190059 | A1 | 9/2005 | Wehrenberg |
| 2005/0198143 | A1 | 9/2005 | Moody et al. |
| 2006/0017692 | A1 | 1/2006 | Wehrenberg et al. |
| 2006/0033724 | A1 | 2/2006 | Chaudhri et al. |
| 2006/0197753 | A1 | 9/2006 | Hotelling |
| 2006/0283214 | A1 | 12/2006 | Donadon et al. |
| 2009/0231356 | A1 | 9/2009 | Barnes et al. |
| 2011/0018895 | A1 | 1/2011 | Buzyn et al. |
| 2011/0018896 | A1 | 1/2011 | Buzyn et al. |
| 2011/0310001 | A1 | 12/2011 | Madau et al. |
| 2012/0170840 | A1 | 7/2012 | Caruso et al. |
| 2013/0342564 | A1 | 12/2013 | Kinnebrew et al. |
| 2014/0075361 | A1 | 3/2014 | Reynolds et al. |
| 2014/0108942 | A1 | 4/2014 | Freeman et al. |
| 2014/0198017 | A1 | 7/2014 | Lamb et al. |
| 2015/0242095 | A1 | 8/2015 | Sonnenberg |
| 2015/0332091 | A1* | 11/2015 | Kim ..................... G06V 40/19 382/103 |
| 2015/0370323 | A1 | 12/2015 | Cieplinski et al. |
| 2016/0171304 | A1 | 6/2016 | Golding et al. |
| 2016/0275702 | A1 | 9/2016 | Reynolds et al. |
| 2017/0038829 | A1 | 2/2017 | Lanier et al. |
| 2017/0038837 | A1 | 2/2017 | Faaborg et al. |
| 2017/0132694 | A1 | 5/2017 | Damy |
| 2017/0132822 | A1 | 5/2017 | Marschke et al. |
| 2018/0045963 | A1 | 2/2018 | Hoover et al. |
| 2018/0075658 | A1 | 3/2018 | Lanier et al. |
| 2018/0081519 | A1* | 3/2018 | Kim ..................... G06F 3/011 |
| 2018/0181199 | A1 | 6/2018 | Harvey et al. |
| 2018/0300023 | A1 | 10/2018 | Hein |
| 2018/0348861 | A1 | 12/2018 | Uscinski et al. |
| 2019/0146128 | A1* | 5/2019 | Cao ..................... G06F 3/011 359/838 |
| 2020/0159017 | A1 | 5/2020 | Lin et al. |
| 2020/0225747 | A1 | 7/2020 | Bar-Zeev et al. |
| 2021/0074062 | A1 | 3/2021 | Madonna et al. |
| 2022/0155909 | A1 | 5/2022 | Kawashima et al. |
| 2022/0326837 | A1 | 10/2022 | Dessero et al. |

FOREIGN PATENT DOCUMENTS

| | | |
|---|---|---|
| JP | 2015-118332 A | 6/2015 |
| KR | 10-2019-0100957 A | 8/2019 |
| WO | 2013/169849 A2 | 11/2013 |
| WO | 2014/105276 A1 | 7/2014 |

OTHER PUBLICATIONS

Notice of Allowance received for U.S. Appl. No. 17/448,876, dated Apr. 7, 2022, 9 Pages.

Notice of Allowance received for U.S. Appl. No. 17/448,876, dated Jul. 20, 2022, 8 Pages.

International Search Report received for PCT Patent Application No. PCT/US2022/071704, dated Aug. 26, 2022, 6 pages.

Non-Final Office Action received for U.S. Appl. No. 17/659,147, dated Mar. 16, 2023, 19 pages.

Final Office Action received for U.S. Appl. No. 17/659,147, mailed on Oct. 4, 2023, 17 pages.

\* cited by examiner

1000

1002 — Display, via the display generation component, a first respective user interface of an operating system of the electronic device

1004 — The first respective user interface is displayed at a first level of immersion

1006 — While displaying the first respective user interface at the first level of immersion, receive, via the one or more input devices, a first user input corresponding to a request to display a second respective user interface of a respective application

1008 — In response to receiving the first user input, display, via the display generation component, the second respective user interface of the respective application

1010 — The second respective user interface of the respective application is displayed at a second level of immersion

1012 — While displaying the second respective user interface at the second level of immersion, receive, via the one or more input devices, a second user input corresponding to a request to change a current level of immersion associated with the electronic device

1014 — In response to receiving the second user input, display, via the display generation component, the second respective user interface at a third level of immersion, different from the second level of immersion (A)

FIG. 10A

METHODS FOR ADJUSTING AND/OR CONTROLLING IMMERSION ASSOCIATED WITH USER INTERFACES

CROSS-REFERENCE TO RELATED APPLICATIONS

This application is a continuation of U.S. patent application Ser. No. 17/448,876, filed Sep. 25, 2021, which claims the benefit of U.S. Provisional Application No. 63/083,792, filed Sep. 25, 2020, the contents of which are incorporated herein by reference in their entireties for all purposes.

TECHNICAL FIELD

This relates generally to computer systems with a display generation component and one or more input devices that present graphical user interfaces, including but not limited to electronic devices that present three-dimensional environments, via the display generation component, that include virtual objects.

BACKGROUND

The development of computer systems for augmented reality has increased significantly in recent years. Example augmented reality environments include at least some virtual elements that replace or augment the physical world. Input devices, such as cameras, controllers, joysticks, touch-sensitive surfaces, and touch-screen displays for computer systems and other electronic computing devices are used to interact with virtual/augmented reality environments. Example virtual elements include virtual objects include digital images, video, text, icons, and control elements such as buttons and other graphics.

But methods and interfaces for interacting with environments that include at least some virtual elements (e.g., applications, augmented reality environments, mixed reality environments, and virtual reality environments) are cumbersome, inefficient, and limited. For example, systems that provide insufficient feedback for performing actions associated with virtual objects, systems that require a series of inputs to achieve a desired outcome in an augmented reality environment, and systems in which manipulation of virtual objects are complex, tedious and error-prone, create a significant cognitive burden on a user, and detract from the experience with the virtual/augmented reality environment. In addition, these methods take longer than necessary, thereby wasting energy. This latter consideration is particularly important in battery-operated devices.

SUMMARY

Accordingly, there is a need for computer systems with improved methods and interfaces for providing computer generated experiences to users that make interaction with the computer systems more efficient and intuitive for a user. Such methods and interfaces optionally complement or replace conventional methods for providing computer generated reality experiences to users. Such methods and interfaces reduce the number, extent, and/or nature of the inputs from a user by helping the user to understand the connection between provided inputs and device responses to the inputs, thereby creating a more efficient human-machine interface.

The above deficiencies and other problems associated with user interfaces for computer systems with a display generation component and one or more input devices are reduced or eliminated by the disclosed systems. In some embodiments, the computer system is a desktop computer with an associated display. In some embodiments, the computer system is portable device (e.g., a notebook computer, tablet computer, or handheld device). In some embodiments, the computer system is a personal electronic device (e.g., a wearable electronic device, such as a watch, or a head-mounted device). In some embodiments, the computer system has a touchpad. In some embodiments, the computer system has one or more cameras. In some embodiments, the computer system has a touch-sensitive display (also known as a "touch screen" or "touch-screen display"). In some embodiments, the computer system has one or more eye-tracking components. In some embodiments, the computer system has one or more hand-tracking components. In some embodiments, the computer system has one or more output devices in addition to the display generation component, the output devices including one or more tactile output generators and one or more audio output devices. In some embodiments, the computer system has a graphical user interface (GUI), one or more processors, memory and one or more modules, programs or sets of instructions stored in the memory for performing multiple functions. In some embodiments, the user interacts with the GUI through stylus and/or finger contacts and gestures on the touch-sensitive surface, movement of the user's eyes and hand in space relative to the GUI or the user's body as captured by cameras and other movement sensors, and voice inputs as captured by one or more audio input devices. In some embodiments, the functions performed through the interactions optionally include image editing, drawing, presenting, word processing, spreadsheet making, game playing, telephoning, video conferencing, e-mailing, instant messaging, workout support, digital photographing, digital videoing, web browsing, digital music playing, note taking, and/or digital video playing. Executable instructions for performing these functions are, optionally, included in a non-transitory computer readable storage medium or other computer program product configured for execution by one or more processors.

There is a need for electronic devices with improved methods and interfaces for adjusting and/or controlling immersion associated with user interfaces. Such methods and interfaces may complement or replace conventional methods for displaying user interfaces in a three-dimensional environment. Such methods and interfaces reduce the number, extent, and/or the nature of the inputs from a user and produce a more efficient human-machine interface.

In some embodiments, an electronic device emphasizes and/or deemphasizes user interfaces based on the gaze of a user. In some embodiments, an electronic device defines levels of immersion for different user interfaces independently of one another. In some embodiments, an electronic device resumes display of a user interface at a previously-displayed level of immersion after (e.g., temporarily) reducing the level of immersion associated with the user interface. In some embodiments, an electronic device allows objects, people, and/or portions of an environment to be visible through a user interface displayed by the electronic device. In some embodiments, an electronic device reduces the level of immersion associated with a user interface based on characteristics of the electronic device and/or physical environment of the electronic device.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 10A-10K is a flowchart illustrating a method of defining levels of immersion for different user interfaces independently of one another in accordance with some embodiments.

DESCRIPTION OF EMBODIMENTS

Figure 1:
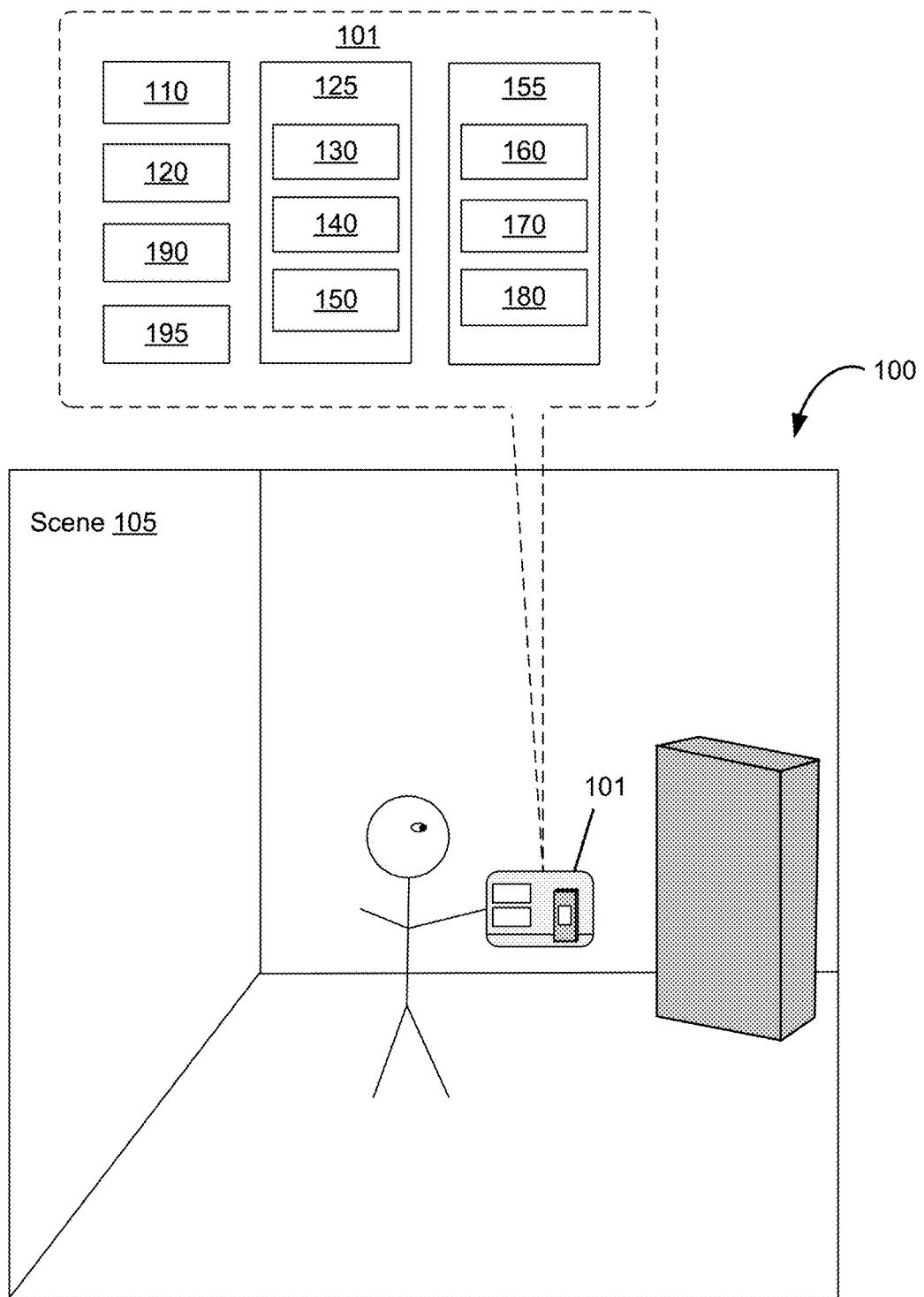
FIG. 1 is a block diagram illustrating an operating environment of a computer system for providing CGR experiences in accordance with some embodiments.

The present disclosure relates to user interfaces for providing a computer generated reality (CGR) experience to a user, in accordance with some embodiments.

The systems, methods, and GUIs described herein provide improved ways for an electronic device to adjust and/or control the level of immersion associated with user interfaces.

In some embodiments, a computer system deemphasizes a second user interface with respect to a first user interface when the system detects that the gaze of a user is directed to the first user interface. In some embodiments, the system performs such deemphasizing when the first user interface is a user interface of a particular type of application (e.g., a media player application). In some embodiments, the second user interface includes representations of one or more of virtual elements displayed by the system or portions of a physical environment of the system. Deemphasizing the second user interface allows the user to focus on the first user interface with less distraction from content outside of the first user interface.

In some embodiments, a computer system defines levels of immersion for different user interfaces independently of one another. Changes in the level of immersion with which the system displays a first user interface (e.g., of an operating system, of a first application) optionally does not affect the level of immersion with which the system displays a second user interface (e.g., of a second application). In some embodiments, immersion is controlled via manipulation of a mechanical input element (e.g., rotatable input element) associated with the computer system, where the direction and/or magnitude of the input at the mechanical input element defines the magnitude and/or direction of the change in the level of immersion. The level of immersion optionally defines the degree to which content other than the user interface in question (e.g., representations of the physical environment of the system, virtual elements outside of the user interface, etc.) is visible via the display. Providing for independently controlled levels of immersion, and/or doing so in accordance with a magnitude and/or direction of input, provides the user with consistent and expected display behavior for various user interfaces, and reduces errors of interaction with such user interfaces as a result.

In some embodiments, a computer system resumes display of a user interface at a previously-displayed level of immersion after (e.g., temporarily) reducing the level of immersion associated with the user interface. The computer system optionally detects an event for reducing the level of immersion at which a respective user interface is displayed, and reduces the level of immersion in response to the event. Subsequently, in response to detecting an event corresponding to a request to redisplay the respective user interface at the previously-displayed level of immersion, the system optionally resumes display of the respective user interface at the previously-displayed level of immersion. In some embodiments, the event to reduce the level of immersion includes detecting a press input on a mechanical input element used to control immersion, and the event to resume the previous level of immersion includes detecting release of the mechanical input element used to control immersion. Resuming display of a user interface at its previous level of immersion provides a quick and efficient manner of returning to a previously in-effect level of immersion, without requiring user input defining the particular level of immersion to which to return, which also avoids erroneous user inputs that define erroneous levels of immersion to which to return.

In some embodiments, a computer system allows objects, people, and/or portions of an environment to be visible through a user interface displayed by the system. Representations of people in the environment of the system are optionally made visible through the user interface based on their distance from the user and/or their attention (e.g., whether it is directed to the user). Representations of objects in the environment of the system are optionally made visible through the user interface based on their distance from the user and/or their determined risk level towards the user (e.g., whether or not the object(s) pose a risk to the user). Making representations of the physical environment of the system visible through the user interface helps users avoid danger in their physical environment, and facilitates interaction with people in their environment without requiring separate input from the user to do so.

In some embodiments, a computer system reduces the level of immersion associated with a user interface based on characteristics of the system and/or physical environment of the system. If the computer system determines that it is moving at a speed greater than a speed threshold, the system optionally reduces the level of immersion at which it is displaying user interface(s) so the user of the system is able to view the physical environment via the system. If the computer system determines that a sound associated with potential danger is detected in the environment of the system, the system optionally reduces the level of immersion at which it is displaying user interface(s) so the user of the system is able to view the physical environment via the system. Reducing the level of immersion as described provides a quick and efficient manner of allowing the user of the system to see the physical environment, without requiring separate input from the user to do so.

FIGS. 1-6 provide a description of example computer systems for providing CGR experiences to users (such as described below with reference to methods 800, 1000, 1200, 1400, and 1600). In some embodiments, as shown in FIG. 1, the CGR experience is provided to the user via an operating environment 100 that includes a computer system 101. The computer system 101 includes a controller 110 (e.g., processors of a portable electronic device or a remote server), a display generation component 120 (e.g., a head-mounted device (HMD), a display, a projector, a touch-screen, etc.), one or more input devices 125 (e.g., an eye tracking device 130, a hand tracking device 140, other input devices 150), one or more output devices 155 (e.g., speakers 160, tactile output generators 170, and other output devices 180), one or more sensors 190 (e.g., image sensors, light sensors, depth sensors, tactile sensors, orientation sensors, proximity sensors, temperature sensors, location sensors, motion sensors, velocity sensors, etc.), and optionally one or more peripheral devices 195 (e.g., home appliances, wearable devices, etc.). In some embodiments, one or more of the input devices 125, output devices 155, sensors 190, and peripheral devices 195 are integrated with the display generation component 120 (e.g., in a head-mounted device or a handheld device).

When describing a CGR experience, various terms are used to differentially refer to several related but distinct environments that the user may sense and/or with which a user may interact (e.g., with inputs detected by a computer system 101 generating the CGR experience that cause the computer system generating the CGR experience to generate audio, visual, and/or tactile feedback corresponding to various inputs provided to the computer system 101). The following is a subset of these terms:

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Computer-generated reality: In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands). A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality. Augmented reality: An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

Augmented virtuality: An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

Hardware: There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface. In some embodiments, the controller 110 is configured to manage and coordinate a CGR experience for the user. In some embodiments, the controller 110 includes a suitable combination of software, firmware, and/or hardware. The controller 110 is described in greater detail below with respect to FIG. 2. In some embodiments, the controller 110 is a computing device that is local or remote relative to the scene 105 (e.g., a physical environment). For example, the controller 110 is a local server located within the scene 105. In another example, the controller 110 is a remote server located outside of the scene 105 (e.g., a cloud server, central server, etc.). In some embodiments, the controller 110 is communicatively coupled with the display generation component 120 (e.g., an HMD, a display, a projector, a touch-screen, etc.) via one or more wired or wireless communication channels 144 (e.g., BLUETOOTH, IEEE 802.11x, IEEE 802.16x, IEEE 802.3x, etc.). In another example, the controller 110 is included within the enclosure (e.g., a physical housing) of the display generation component 120 (e.g., an HMD, or a portable electronic device that includes a display and one or more processors, etc.), one or more of the input devices 125, one or more of the output devices 155, one or more of the sensors 190, and/or one or more of the peripheral devices 195, or share the same physical enclosure or support structure with one or more of the above.

In some embodiments, the display generation component 120 is configured to provide the CGR experience (e.g., at least a visual component of the CGR experience) to the user. In some embodiments, the display generation component 120 includes a suitable combination of software, firmware, and/or hardware. The display generation component 120 is described in greater detail below with respect to FIG. 3. In some embodiments, the functionalities of the controller 110 are provided by and/or combined with the display generation component 120.

According to some embodiments, the display generation component 120 provides a CGR experience to the user while the user is virtually and/or physically present within the scene 105.

In some embodiments, the display generation component is worn on a part of the user's body (e.g., on his/her head, on his/her hand, etc.). As such, the display generation component 120 includes one or more CGR displays provided to display the CGR content. For example, in various embodiments, the display generation component 120 encloses the field-of-view of the user. In some embodiments, the display generation component 120 is a handheld device (such as a smartphone or tablet) configured to present CGR content, and the user holds the device with a display directed towards the field-of-view of the user and a camera directed towards the scene 105. In some embodiments, the handheld device is optionally placed within an enclosure that is worn on the head of the user. In some embodiments, the handheld device is optionally placed on a support (e.g., a tripod) in front of the user. In some embodiments, the display generation component 120 is a CGR chamber, enclosure, or room configured to present CGR content in which the user does not wear or hold the display generation component 120. Many user interfaces described with reference to one type of hardware for displaying CGR content (e.g., a handheld device or a device on a tripod) could be implemented on another type of hardware for displaying CGR content (e.g., an HMD or other wearable computing device). For example, a user interface showing interactions with CGR content triggered based on interactions that happen in a space in front of a handheld or tripod mounted device could similarly be implemented with an HMD where the interactions happen in a space in front of the HMD and the responses of the CGR content are displayed via the HMD. Similarly, a user interface showing interactions with CRG content triggered based on movement of a handheld or tripod mounted device relative to the physical environment (e.g., the scene 105 or a part of the user's body (e.g., the user's eye(s), head, or hand)) could similarly be implemented with an HMD where the movement is caused by movement of the HMD relative to the physical environment (e.g., the scene 105 or a part of the user's body (e.g., the user's eye(s), head, or hand)).

While pertinent features of the operation environment 100 are shown in FIG. 1, those of ordinary skill in the art will appreciate from the present disclosure that various other features have not been illustrated for the sake of brevity and so as not to obscure more pertinent aspects of the example embodiments disclosed herein.

Figure 2:
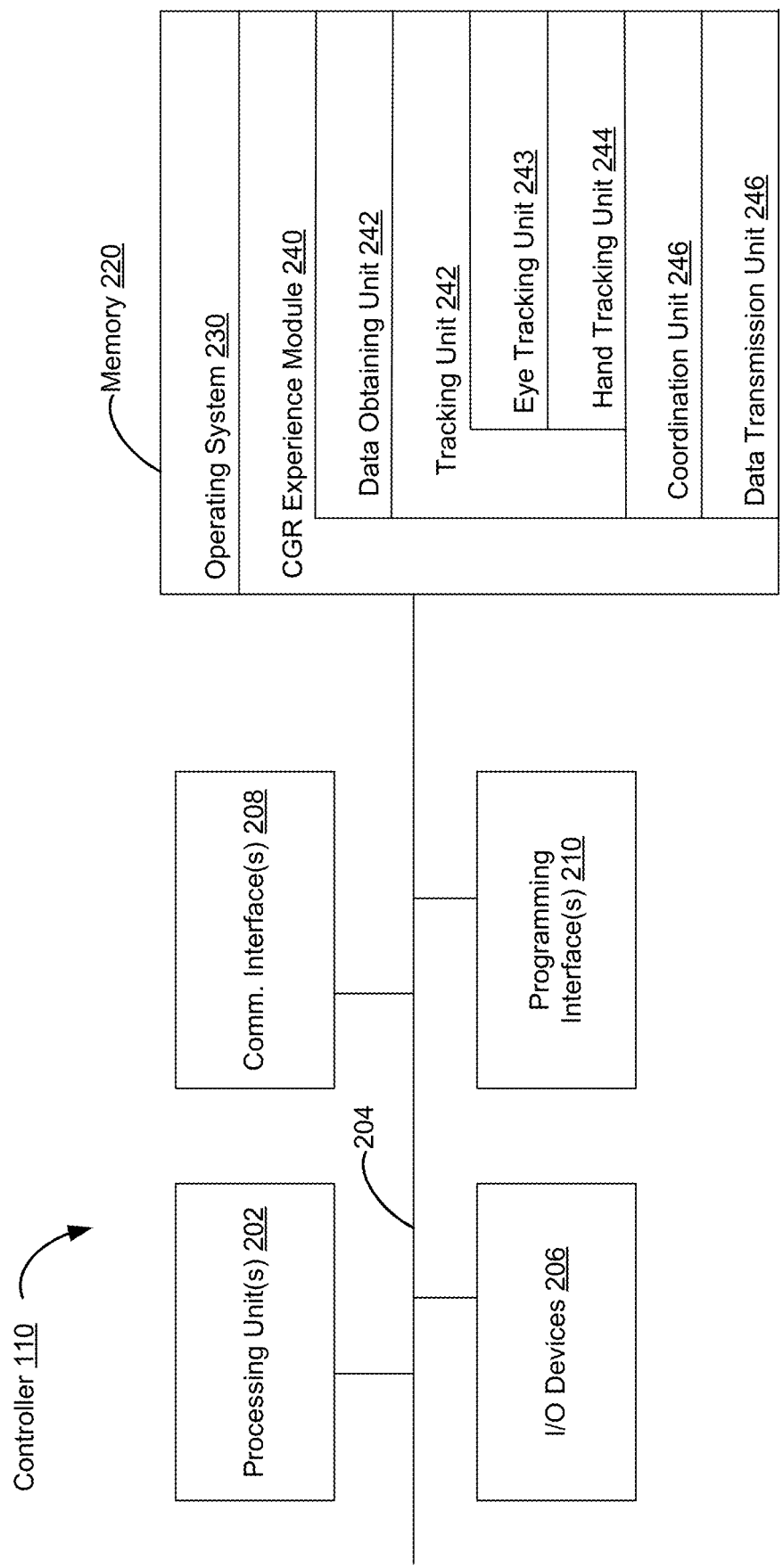
FIG. 2 is a block diagram illustrating a controller of a computer system that is configured to manage and coordinate a CGR experience for the user in accordance with some embodiments.

FIG. 2 is a block diagram of an example of the controller 110 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments, the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some embodiments, the one or more communication buses 204 include circuitry that interconnects and controls communications between system components. In some embodiments, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some embodiments, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some embodiments, the memory 220 or the non-transitory computer readable storage medium of the memory 220 stores the following programs, modules and data structures, or a subset thereof including an optional operating system 230 and a CGR experience module 240.

The operating system 230 includes instructions for handling various basic system services and for performing hardware dependent tasks. In some embodiments, the CGR experience module 240 is configured to manage and coordinate one or more CGR experiences for one or more users (e.g., a single CGR experience for one or more users, or multiple CGR experiences for respective groups of one or more users). To that end, in various embodiments, the CGR experience module 240 includes a data obtaining unit 242, a tracking unit 244, a coordination unit 246, and a data transmitting unit 248.

In some embodiments, the data obtaining unit 242 is configured to obtain data (e.g., presentation data, interaction data, sensor data, location data, etc.) from at least the display generation component 120 of FIG. 1, and optionally one or more of the input devices 125, output devices 155, sensors 190, and/or peripheral devices 195. To that end, in various embodiments, the data obtaining unit 242 includes instructions and/or logic therefor, and heuristics and metadata therefor.

In some embodiments, the tracking unit 244 is configured to map the scene 105 and to track the position/location of at least the display generation component 120 with respect to the scene 105 of FIG. 1, and optionally, to one or more of the input devices 125, output devices 155, sensors 190, and/or peripheral devices 195. To that end, in various embodiments, the tracking unit 244 includes instructions and/or logic therefor, and heuristics and metadata therefor. In some embodiments, the tracking unit 244 includes hand tracking unit 243 and/or eye tracking unit 245. In some embodiments, the hand tracking unit 243 is configured to track the position/location of one or more portions of the user's hands, and/or motions of one or more portions of the user's hands with respect to the scene 105 of FIG. 1, relative to the display generation component 120, and/or relative to a coordinate system defined relative to the user's hand. The hand tracking unit 243 is described in greater detail below with respect to FIG. 4. In some embodiments, the eye tracking unit 245 is configured to track the position and movement of the user's gaze (or more broadly, the user's eyes, face, or head) with respect to the scene 105 (e.g., with respect to the physical environment and/or to the user (e.g., the user's hand)) or with respect to the CGR content displayed via the display generation component 120. The eye tracking unit 245 is described in greater detail below with respect to FIG. 5.

In some embodiments, the coordination unit 246 is configured to manage and coordinate the CGR experience presented to the user by the display generation component 120, and optionally, by one or more of the output devices 155 and/or peripheral devices 195. To that end, in various embodiments, the coordination unit 246 includes instructions and/or logic therefor, and heuristics and metadata therefor.

In some embodiments, the data transmitting unit 248 is configured to transmit data (e.g., presentation data, location data, etc.) to at least the display generation component 120, and optionally, to one or more of the input devices 125, output devices 155, sensors 190, and/or peripheral devices 195. To that end, in various embodiments, the data transmitting unit 248 includes instructions and/or logic therefor, and heuristics and metadata therefor.

Although the data obtaining unit 242, the tracking unit 244 (e.g., including the eye tracking unit 243 and the hand tracking unit 244), the coordination unit 246, and the data transmitting unit 248 are shown as residing on a single device (e.g., the controller 110), it should be understood that in other embodiments, any combination of the data obtaining unit 242, the tracking unit 244 (e.g., including the eye tracking unit 243 and the hand tracking unit 244), the coordination unit 246, and the data transmitting unit 248 may be located in separate computing devices.

Moreover, FIG. 2 is intended more as functional description of the various features that may be present in a particular implementation as opposed to a structural schematic of the embodiments described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 3:
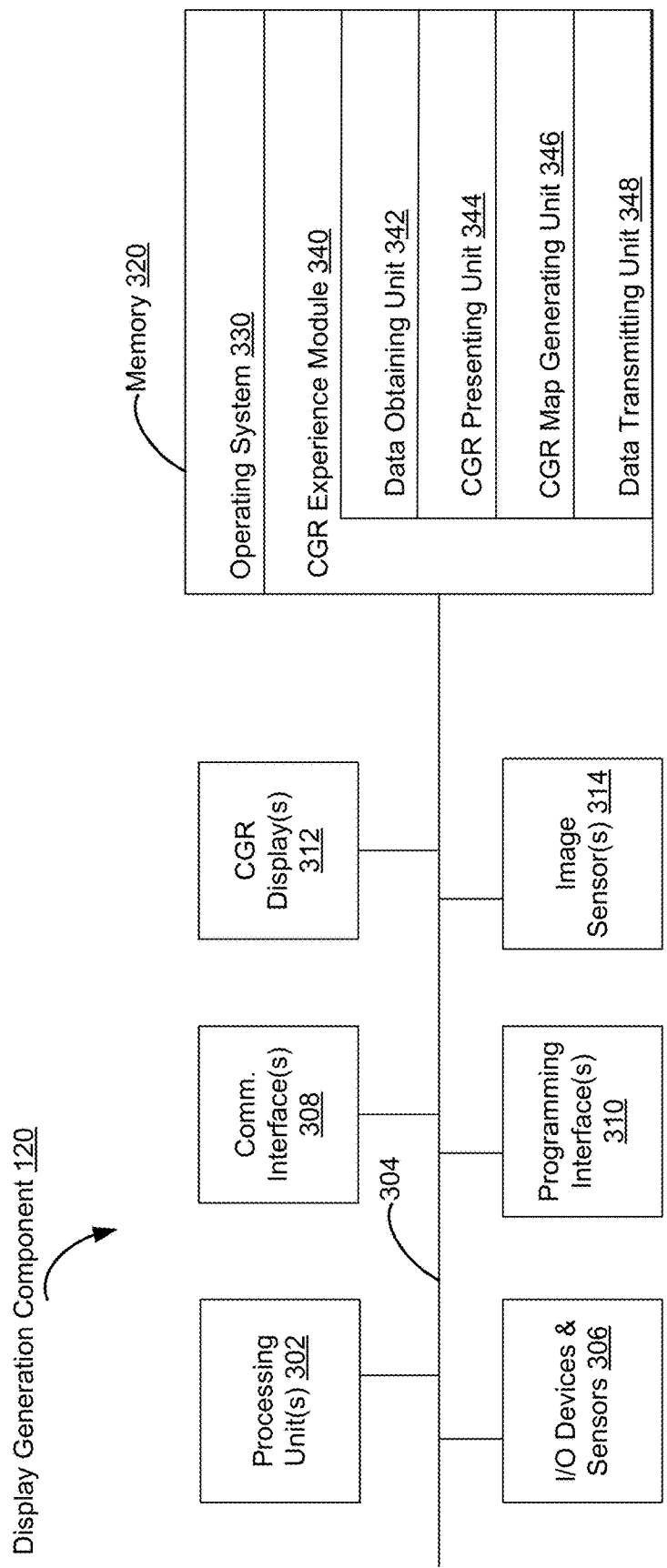
FIG. 3 is a block diagram illustrating a display generation component of a computer system that is configured to provide a visual component of the CGR experience to the user in accordance with some embodiments.

FIG. 3 is a block diagram of an example of the display generation component 120 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the HMD 120 includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more CGR displays 312, one or more optional interior- and/or exterior-facing image sensors 314, a memory 320, and one or more communication buses 304 for interconnecting these and various other components.

In some embodiments, the one or more communication buses 304 include circuitry that interconnects and controls communications between system components. In some embodiments, the one or more I/O devices and sensors 306 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some embodiments, the one or more CGR displays 312 are configured to provide the CGR experience to the user. In some embodiments, the one or more CGR displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some embodiments, the one or more CGR displays 312 correspond to diffractive, reflective, polarized, holographic, etc. waveguide displays. For example, the HMD 120 includes a single CGR display. In another example, the HMD 120 includes a CGR display for each eye of the user. In some embodiments, the one or more CGR displays 312 are capable of presenting MR and VR content. In some embodiments, the one or more CGR displays 312 are capable of presenting MR or VR content.

In some embodiments, the one or more image sensors 314 are configured to obtain image data that corresponds to at least a portion of the face of the user that includes the eyes of the user (and may be referred to as an eye-tracking camera). In some embodiments, the one or more image sensors 314 are configured to obtain image data that corresponds to at least a portion of the user's hand(s) and optionally arm(s) of the user (and may be referred to as a hand-tracking camera). In some embodiments, the one or more image sensors 314 are configured to be forward-facing so as to obtain image data that corresponds to the scene as would be viewed by the user if the HMD 120 was not present (and may be referred to as a scene camera). The one or more optional image sensors 314 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 320 includes high-speed random-access memory, such as DRAM, SRAM, DDR RAM, or other random-access solid-state memory devices. In some embodiments, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some embodiments, the memory 320 or the non-transitory computer readable storage medium of the memory 320 stores the following programs, modules and data structures, or a subset thereof including an optional operating system 330 and a CGR presentation module 340.

The operating system 330 includes instructions for handling various basic system services and for performing hardware dependent tasks. In some embodiments, the CGR presentation module 340 is configured to present CGR content to the user via the one or more CGR displays 312. To that end, in various embodiments, the CGR presentation module 340 includes a data obtaining unit 342, a CGR presenting unit 344, a CGR map generating unit 346, and a data transmitting unit 348.

In some embodiments, the data obtaining unit 342 is configured to obtain data (e.g., presentation data, interaction data, sensor data, location data, etc.) from at least the controller 110 of FIG. 1. To that end, in various embodiments, the data obtaining unit 342 includes instructions and/or logic therefor, and heuristics and metadata therefor.

In some embodiments, the CGR presenting unit 344 is configured to present CGR content via the one or more CGR displays 312. To that end, in various embodiments, the CGR presenting unit 344 includes instructions and/or logic therefor, and heuristics and metadata therefor.

In some embodiments, the CGR map generating unit 346 is configured to generate a CGR map (e.g., a 3D map of the mixed reality scene or a map of the physical environment into which computer generated objects can be placed to generate the computer generated reality) based on media content data. To that end, in various embodiments, the CGR map generating unit 346 includes instructions and/or logic therefor, and heuristics and metadata therefor.

In some embodiments, the data transmitting unit 348 is configured to transmit data (e.g., presentation data, location data, etc.) to at least the controller 110, and optionally one or more of the input devices 125, output devices 155, sensors 190, and/or peripheral devices 195. To that end, in various embodiments, the data transmitting unit 348 includes instructions and/or logic therefor, and heuristics and metadata therefor.

Although the data obtaining unit 342, the CGR presenting unit 344, the CGR map generating unit 346, and the data transmitting unit 348 are shown as residing on a single device (e.g., the display generation component 120 of FIG. 1), it should be understood that in other embodiments, any combination of the data obtaining unit 342, the CGR presenting unit 344, the CGR map generating unit 346, and the data transmitting unit 348 may be located in separate computing devices.

Moreover, FIG. 3 is intended more as a functional description of the various features that could be present in a particular implementation as opposed to a structural schematic of the embodiments described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 4:
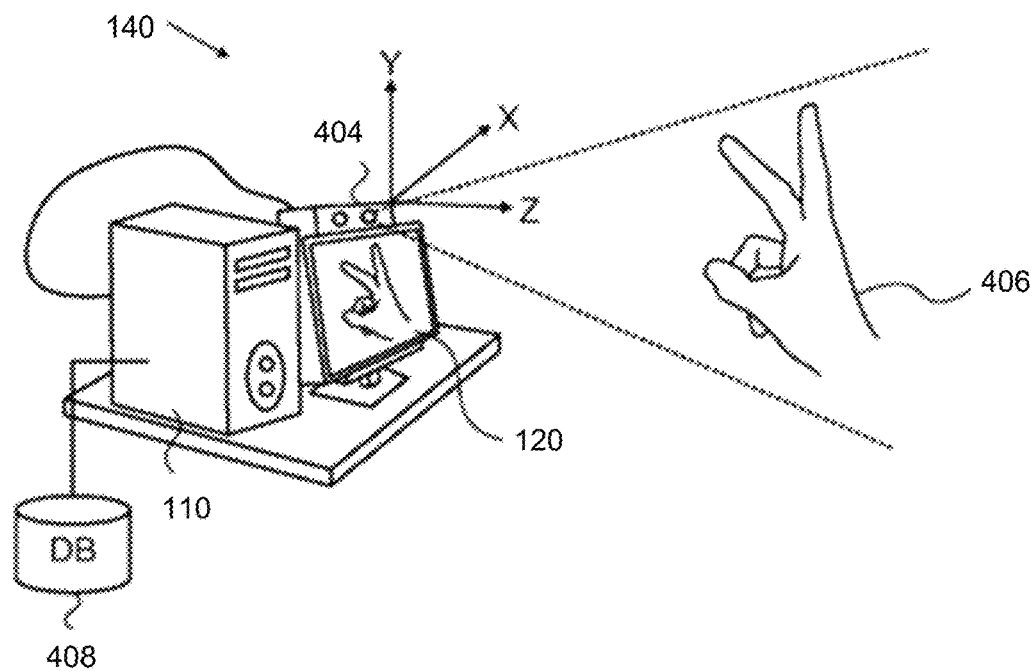
FIG. 4 is a block diagram illustrating a hand tracking unit of a computer system that is configured to capture gesture inputs of the user in accordance with some embodiments.
Figure 4:
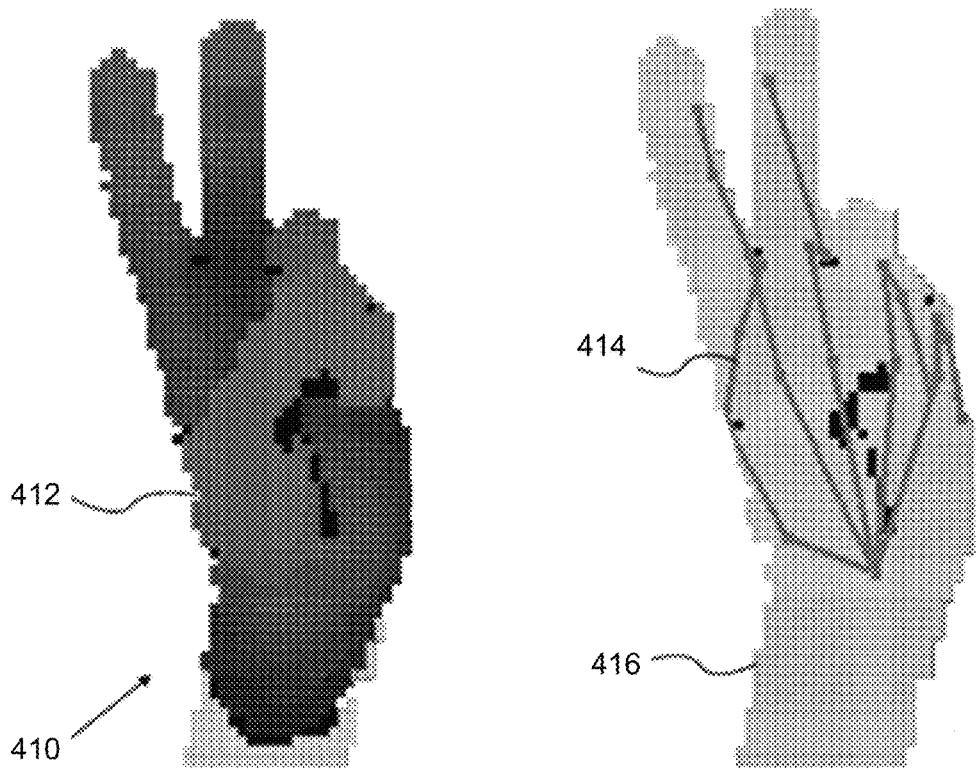

FIG. 4 is a schematic, pictorial illustration of an example embodiment of the hand tracking device 140. In some embodiments, hand tracking device 140 (FIG. 1) is controlled by hand tracking unit 243 (FIG. 2) to track the position/location of one or more portions of the user's hands, and/or motions of one or more portions of the user's hands with respect to the scene 105 of FIG. 1 (e.g., with respect to a portion of the physical environment surrounding the user, with respect to the display generation component 120, or with respect to a portion of the user (e.g., the user's face, eyes, or head), and/or relative to a coordinate system defined relative to the user's hand. In some embodiments, the hand tracking device 140 is part of the display generation component 120 (e.g., embedded in or attached to a head-mounted device). In some embodiments, the hand tracking device 140 is separate from the display generation component 120 (e.g., located in separate housings or attached to separate physical support structures).

In some embodiments, the hand tracking device 140 includes image sensors 404 (e.g., one or more IR cameras, 3D cameras, depth cameras, and/or color cameras, etc.) that capture three-dimensional scene information that includes at least a hand 406 of a human user. The image sensors 404 capture the hand images with sufficient resolution to enable the fingers and their respective positions to be distinguished. The image sensors 404 typically capture images of other parts of the user's body, as well, or possibly all of the body, and may have either zoom capabilities or a dedicated sensor with enhanced magnification to capture images of the hand with the desired resolution. In some embodiments, the image sensors 404 also capture 2D color video images of the hand 406 and other elements of the scene. In some embodiments, the image sensors 404 are used in conjunction with other image sensors to capture the physical environment of the scene 105, or serve as the image sensors that capture the physical environments of the scene 105. In some embodiments, the image sensors 404 are positioned relative to the user or the user's environment in a way that a field of view of the image sensors or a portion thereof is used to define an interaction space in which hand movement captured by the image sensors are treated as inputs to the controller 110.

In some embodiments, the image sensors 404 outputs a sequence of frames containing 3D map data (and possibly color image data, as well) to the controller 110, which extracts high-level information from the map data. This high-level information is typically provided via an Application Program Interface (API) to an application running on the controller, which drives the display generation component 120 accordingly. For example, the user may interact with software running on the controller 110 by moving his hand 408 and changing his hand posture.

In some embodiments, the image sensors 404 project a pattern of spots onto a scene containing the hand 406 and captures an image of the projected pattern. In some embodiments, the controller 110 computes the 3D coordinates of points in the scene (including points on the surface of the user's hand) by triangulation, based on transverse shifts of the spots in the pattern. This approach is advantageous in that it does not require the user to hold or wear any sort of beacon, sensor, or other marker. It gives the depth coordinates of points in the scene relative to a predetermined reference plane, at a certain distance from the image sensors 404. In the present disclosure, the image sensors 404 are assumed to define an orthogonal set of x, y, z axes, so that depth coordinates of points in the scene correspond to z components measured by the image sensors. Alternatively, the hand tracking device 440 may use other methods of 3D mapping, such as stereoscopic imaging or time-of-flight measurements, based on single or multiple cameras or other types of sensors.

In some embodiments, the hand tracking device 140 captures and processes a temporal sequence of depth maps containing the user's hand, while the user moves his hand (e.g., whole hand or one or more fingers). Software running on a processor in the image sensors 404 and/or the controller 110 processes the 3D map data to extract patch descriptors of the hand in these depth maps. The software matches these descriptors to patch descriptors stored in a database 408, based on a prior learning process, in order to estimate the pose of the hand in each frame. The pose typically includes 3D locations of the user's hand joints and finger tips.

The software may also analyze the trajectory of the hands and/or fingers over multiple frames in the sequence in order to identify gestures. The pose estimation functions described herein may be interleaved with motion tracking functions, so that patch-based pose estimation is performed only once in every two (or more) frames, while tracking is used to find changes in the pose that occur over the remaining frames. The pose, motion and gesture information are provided via the above-mentioned API to an application program running on the controller 110. This program may, for example, move and modify images presented on the display generation component 120, or perform other functions, in response to the pose and/or gesture information.

In some embodiments, the software may be downloaded to the controller 110 in electronic form, over a network, for example, or it may alternatively be provided on tangible, non-transitory media, such as optical, magnetic, or electronic memory media. In some embodiments, the database 408 is likewise stored in a memory associated with the controller 110. Alternatively or additionally, some or all of the described functions of the computer may be implemented in dedicated hardware, such as a custom or semi-custom integrated circuit or a programmable digital signal processor (DSP). Although the controller 110 is shown in FIG. 4, by way of example, as a separate unit from the image sensors 440, some or all of the processing functions of the controller may be performed by a suitable microprocessor and software or by dedicated circuitry within the housing of the hand tracking device 402 or otherwise associated with the image sensors 404. In some embodiments, at least some of these processing functions may be carried out by a suitable processor that is integrated with the display generation component 120 (e.g., in a television set, a handheld device, or head-mounted device, for example) or with any other suitable computerized device, such as a game console or media player. The sensing functions of image sensors 404 may likewise be integrated into the computer or other computerized apparatus that is to be controlled by the sensor output.

FIG. 4 further includes a schematic representation of a depth map 410 captured by the image sensors 404, in accordance with some embodiments. The depth map, as explained above, comprises a matrix of pixels having respective depth values. The pixels 412 corresponding to the hand 406 have been segmented out from the background and the wrist in this map. The brightness of each pixel within the depth map 410 corresponds inversely to its depth value, i.e., the measured z distance from the image sensors 404, with the shade of gray growing darker with increasing depth. The controller 110 processes these depth values in order to identify and segment a component of the image (i.e., a group of neighboring pixels) having characteristics of a human hand. These characteristics, may include, for example, overall size, shape and motion from frame to frame of the sequence of depth maps.

FIG. 4 also schematically illustrates a hand skeleton 414 that controller 110 ultimately extracts from the depth map 410 of the hand 406, in accordance with some embodiments. In FIG. 4, the skeleton 414 is superimposed on a hand background 416 that has been segmented from the original depth map. In some embodiments, key feature points of the hand (e.g., points corresponding to knuckles, finger tips, center of the palm, end of the hand connecting to wrist, etc.) and optionally on the wrist or arm connected to the hand are identified and located on the hand skeleton 414. In some embodiments, location and movements of these key feature points over multiple image frames are used by the controller 110 to determine the hand gestures performed by the hand or the current state of the hand, in accordance with some embodiments.

Figure 5:
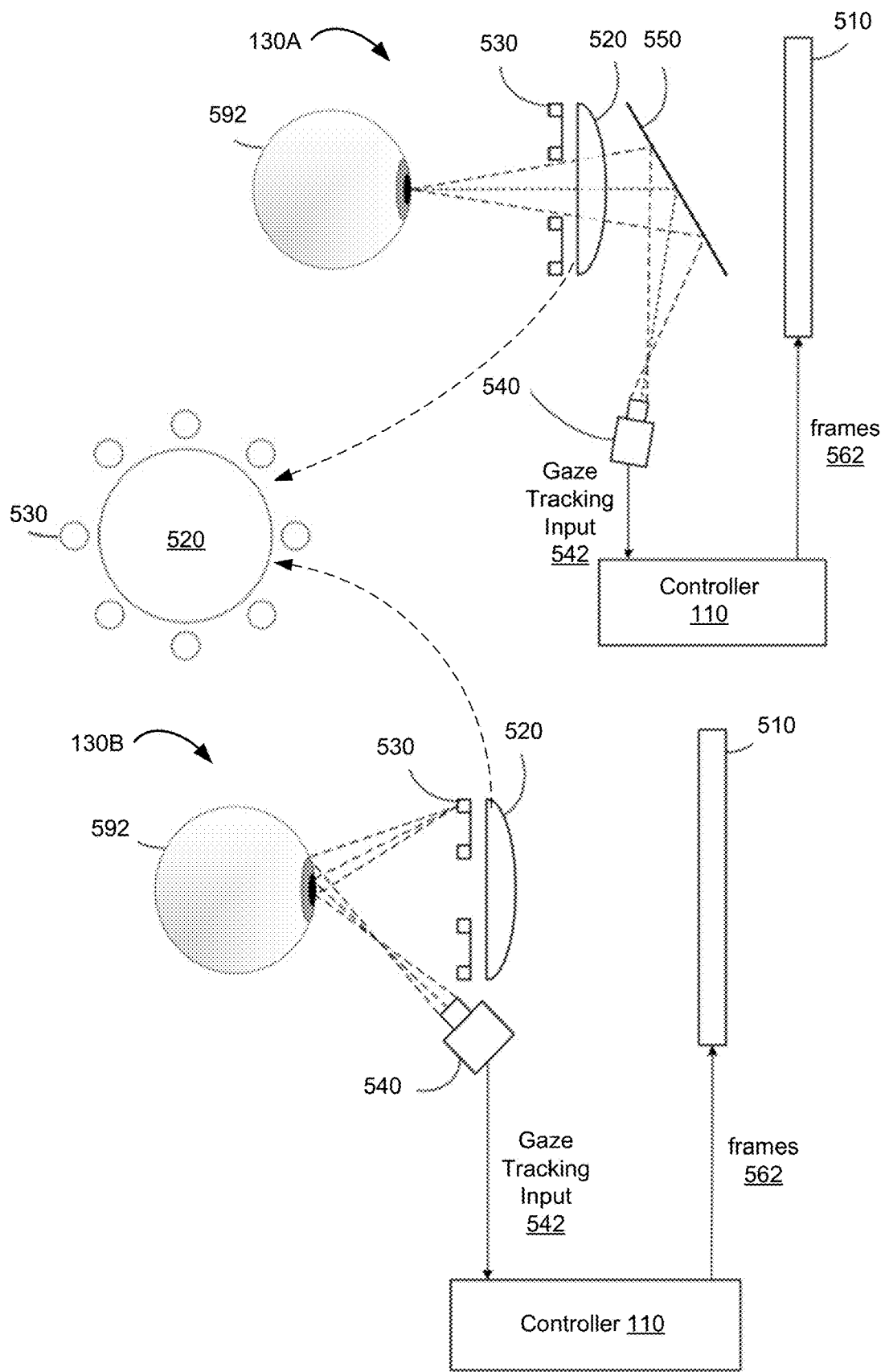
FIG. 5 is a block diagram illustrating an eye tracking unit of a computer system that is configured to capture gaze inputs of the user in accordance with some embodiments.

FIG. 5 illustrates an example embodiment of the eye tracking device 130 (FIG. 1). In some embodiments, the eye tracking device 130 is controlled by the eye tracking unit 245 (FIG. 2) to track the position and movement of the user's gaze with respect to the scene 105 or with respect to the CGR content displayed via the display generation component 120. In some embodiments, the eye tracking device 130 is integrated with the display generation component 120. For example, in some embodiments, when the display generation component 120 is a head-mounted device such as headset, helmet, goggles, or glasses, or a handheld device placed in a wearable frame, the head-mounted device includes both a component that generates the CGR content for viewing by the user and a component for tracking the gaze of the user relative to the CGR content. In some embodiments, the eye tracking device 130 is separate from the display generation component 120. For example, when display generation component is a handheld device or a CGR chamber, the eye tracking device 130 is optionally a separate device from the handheld device or CGR chamber. In some embodiments, the eye tracking device 130 is a head-mounted device or part of a head-mounted device. In some embodiments, the head-mounted eye-tracking device 130 is optionally used in conjunction with a display generation component that is also head-mounted, or a display generation component that is not head-mounted. In some embodiments, the eye tracking device 130 is not a head-mounted device, and is optionally used in conjunction with a head-mounted display generation component. In some embodiments, the eye tracking device 130 is not a head-mounted device, and is optionally part of a non-head-mounted display generation component.

In some embodiments, the display generation component 120 uses a display mechanism (e.g., left and right near-eye display panels) for displaying frames including left and right images in front of a user's eyes to thus provide 3D virtual views to the user. For example, a head-mounted display generation component may include left and right optical lenses (referred to herein as eye lenses) located between the display and the user's eyes. In some embodiments, the display generation component may include or be coupled to one or more external video cameras that capture video of the user's environment for display. In some embodiments, a head-mounted display generation component may have a transparent or semi-transparent display through which a user may view the physical environment directly and display virtual objects on the transparent or semi-transparent display. In some embodiments, display generation component projects virtual objects into the physical environment. The virtual objects may be projected, for example, on a physical surface or as a holograph, so that an individual, using the system, observes the virtual objects superimposed over the physical environment. In such cases, separate display panels and image frames for the left and right eyes may not be necessary.

As shown in FIG. 5, in some embodiments, a gaze tracking device 130 includes at least one eye tracking camera (e.g., infrared (IR) or near-IR (NIR) cameras), and illumination sources (e.g., IR or NIR light sources such as an array or ring of LEDs) that emit light (e.g., IR or NIR light) towards the user's eyes. The eye tracking cameras may be pointed towards the user's eyes to receive reflected IR or NIR light from the light sources directly from the eyes, or alternatively may be pointed towards "hot" mirrors located between the user's eyes and the display panels that reflect IR or NIR light from the eyes to the eye tracking cameras while allowing visible light to pass. The gaze tracking device 130 optionally captures images of the user's eyes (e.g., as a video stream captured at 60-120 frames per second (fps)), analyze the images to generate gaze tracking information, and communicate the gaze tracking information to the controller 110. In some embodiments, two eyes of the user are separately tracked by respective eye tracking cameras and illumination sources. In some embodiments, only one eye of the user is tracked by a respective eye tracking camera and illumination sources.

In some embodiments, the eye tracking device 130 is calibrated using a device-specific calibration process to determine parameters of the eye tracking device for the specific operating environment 100, for example the 3D geometric relationship and parameters of the LEDs, cameras, hot mirrors (if present), eye lenses, and display screen. The device-specific calibration process may be performed at the factory or another facility prior to delivery of the AR/VR equipment to the end user. The device-specific calibration process may an automated calibration process or a manual calibration process. A user-specific calibration process may include an estimation of a specific user's eye parameters, for example the pupil location, fovea location, optical axis, visual axis, eye spacing, etc. Once the device-specific and user-specific parameters are determined for the eye tracking device 130, images captured by the eye tracking cameras can be processed using a glint-assisted method to determine the current visual axis and point of gaze of the user with respect to the display, in accordance with some embodiments.

As shown in FIG. 5, the eye tracking device 130 (e.g., 130A or 130B) includes eye lens(es) 520, and a gaze tracking system that includes at least one eye tracking camera 540 (e.g., infrared (IR) or near-IR (NIR) cameras) positioned on a side of the user's face for which eye tracking is performed, and an illumination source 530 (e.g., IR or NIR light sources such as an array or ring of NIR light-emitting diodes (LEDs)) that emit light (e.g., IR or NIR light) towards the user's eye(s) 592. The eye tracking cameras 540 may be pointed towards mirrors 550 located between the user's eye(s) 592 and a display 510 (e.g., a left or right display panel of a head-mounted display, or a display of a handheld device, a projector, etc.) that reflect IR or NIR light from the eye(s) 592 while allowing visible light to pass (e.g., as shown in the top portion of FIG. 5), or alternatively may be pointed towards the user's eye(s) 592 to receive reflected IR or NIR light from the eye(s) 592 (e.g., as shown in the bottom portion of FIG. 5).

In some embodiments, the controller 110 renders AR or VR frames 562 (e.g., left and right frames for left and right display panels) and provide the frames 562 to the display 510. The controller 110 uses gaze tracking input 542 from the eye tracking cameras 540 for various purposes, for example in processing the frames 562 for display. The controller 110 optionally estimates the user's point of gaze on the display 510 based on the gaze tracking input 542 obtained from the eye tracking cameras 540 using the glint-assisted methods or other suitable methods. The point of gaze estimated from the gaze tracking input 542 is optionally used to determine the direction in which the user is currently looking.

The following describes several possible use cases for the user's current gaze direction, and is not intended to be limiting. As an example use case, the controller 110 may render virtual content differently based on the determined direction of the user's gaze. For example, the controller 110 may generate virtual content at a higher resolution in a foveal region determined from the user's current gaze direction than in peripheral regions. As another example, the controller may position or move virtual content in the view based at least in part on the user's current gaze direction. As another example, the controller may display particular virtual content in the view based at least in part on the user's current gaze direction. As another example use case in AR applications, the controller 110 may direct external cameras for capturing the physical environments of the CGR experience to focus in the determined direction. The autofocus mechanism of the external cameras may then focus on an object or surface in the environment that the user is currently looking at on the display 510. As another example use case, the eye lenses 520 may be focusable lenses, and the gaze tracking information is used by the controller to adjust the focus of the eye lenses 520 so that the virtual object that the user is currently looking at has the proper vergence to match the convergence of the user's eyes 592. The controller 110 may leverage the gaze tracking information to direct the eye lenses 520 to adjust focus so that close objects that the user is looking at appear at the right distance.

In some embodiments, the eye tracking device is part of a head-mounted device that includes a display (e.g., display 510), two eye lenses (e.g., eye lense(s) 520), eye tracking cameras (e.g., eye tracking camera(s) 540), and light sources (e.g., light sources 530 (e.g., IR or NIR LEDs), mounted in a wearable housing. The Light sources emit light (e.g., IR or NIR light) towards the user's eye(s) 592. In some embodiments, the light sources may be arranged in rings or circles around each of the lenses as shown in FIG. 5. In some embodiments, eight light sources 530 (e.g., LEDs) are arranged around each lens 520 as an example. However, more or fewer light sources 530 may be used, and other arrangements and locations of light sources 530 may be used.

In some embodiments, the display 510 emits light in the visible light range and does not emit light in the IR or NIR range, and thus does not introduce noise in the gaze tracking system. Note that the location and angle of eye tracking camera(s) 540 is given by way of example, and is not intended to be limiting. In some embodiments, a single eye tracking camera 540 located on each side of the user's face. In some embodiments, two or more NIR cameras 540 may be used on each side of the user's face. In some embodiments, a camera 540 with a wider field of view (FOV) and a camera 540 with a narrower FOV may be used on each side of the user's face. In some embodiments, a camera 540 that operates at one wavelength (e.g. 850 nm) and a camera 540 that operates at a different wavelength (e.g. 940 nm) may be used on each side of the user's face.

Embodiments of the gaze tracking system as illustrated in FIG. 5 may, for example, be used in computer-generated reality, virtual reality, and/or mixed reality applications to provide computer-generated reality, virtual reality, augmented reality, and/or augmented virtuality experiences to the user.

Figure 6:
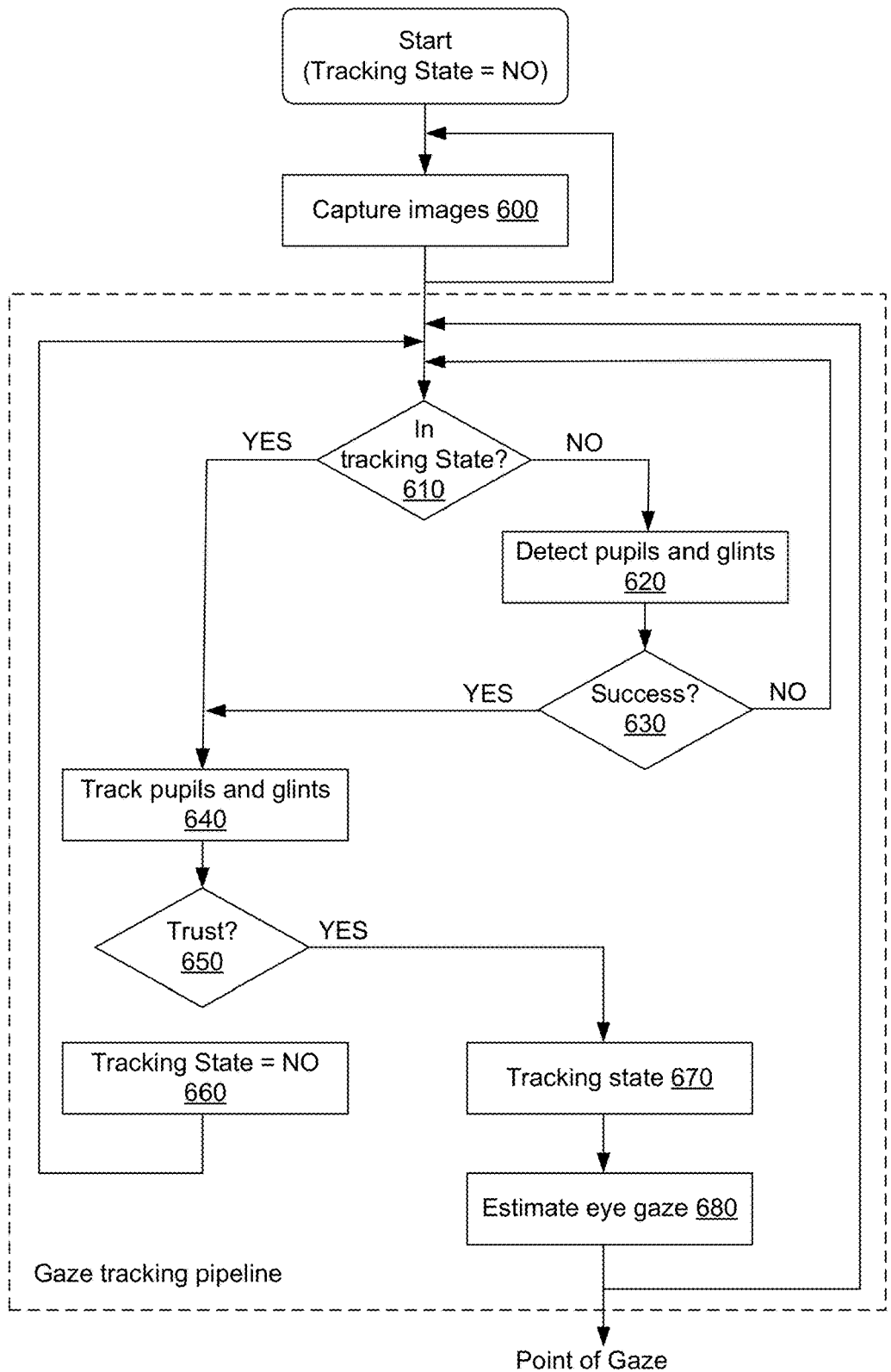
FIG. 6 is a flowchart illustrating a glint-assisted gaze tracking pipeline in accordance with some embodiments.

FIG. 6 illustrates a glint-assisted gaze tracking pipeline, in accordance with some embodiments. In some embodiments, the gaze tracking pipeline is implemented by a glint-assisted gaze tracing system (e.g., eye tracking device 130 as illustrated in FIGS. 1 and 5). The glint-assisted gaze tracking system may maintain a tracking state. Initially, the tracking state is off or "NO". When in the tracking state, the glint-assisted gaze tracking system uses prior information from the previous frame when analyzing the current frame to track the pupil contour and glints in the current frame. When not in the tracking state, the glint-assisted gaze tracking system attempts to detect the pupil and glints in the current frame and, if successful, initializes the tracking state to "YES" and continues with the next frame in the tracking state.

As shown in FIG. 6, the gaze tracking cameras may capture left and right images of the user's left and right eyes. The captured images are then input to a gaze tracking pipeline for processing beginning at 610. As indicated by the arrow returning to element 600, the gaze tracking system may continue to capture images of the user's eyes, for example at a rate of 60 to 120 frames per second. In some embodiments, each set of captured images may be input to the pipeline for processing. However, in some embodiments or under some conditions, not all captured frames are processed by the pipeline.

At 610, for the current captured images, if the tracking state is YES, then the method proceeds to element 640. At 610, if the tracking state is NO, then as indicated at 620 the images are analyzed to detect the user's pupils and glints in the images. At 630, if the pupils and glints are successfully detected, then the method proceeds to element 640. Otherwise, the method returns to element 610 to process next images of the user's eyes.

At 640, if proceeding from element 410, the current frames are analyzed to track the pupils and glints based in part on prior information from the previous frames. At 640, if proceeding from element 630, the tracking state is initialized based on the detected pupils and glints in the current frames. Results of processing at element 640 are checked to verify that the results of tracking or detection can be trusted. For example, results may be checked to determine if the pupil and a sufficient number of glints to perform gaze estimation are successfully tracked or detected in the current frames. At 650, if the results cannot be trusted, then the tracking state is set to NO and the method returns to element 610 to process next images of the user's eyes. At 650, if the results are trusted, then the method proceeds to element 670. At 670, the tracking state is set to YES (if not already YES), and the pupil and glint information is passed to element 680 to estimate the user's point of gaze.

FIG. 6 is intended to serve as one example of eye tracking technology that may be used in a particular implementation. As recognized by those of ordinary skill in the art, other eye tracking technologies that currently exist or are developed in the future may be used in place of or in combination with the glint-assisted eye tracking technology describe herein in the computer system 101 for providing CGR experiences to users, in accordance with various embodiments.

Thus, the description herein includes some embodiments of three-dimensional environments (e.g., CGR environments) that include representations of real world objects and representations of virtual objects. For example, a three-dimensional environment optionally includes a representation of a table that exists in the physical environment, which is captured and displayed in the three-dimensional environment (e.g., actively via cameras and displays of an electronic device, or passively via a transparent or translucent display of the electronic device). As described previously, the three-dimensional environment is optionally a mixed reality system in which the three-dimensional environment is based on the physical environment that is captured by one or more sensors of the device and displayed via a display generation component. As a mixed reality system, the device is optionally able to selectively display portions and/or objects of the physical environment such that the respective portions and/or objects of the physical environment appear as if they exist in the three-dimensional environment displayed by the electronic device. Similarly, the device is optionally able to display virtual objects in the three-dimensional environment to appear as if the virtual objects exist in the real world (e.g., physical environment) by placing the virtual objects at respective locations in the three-dimensional environment that have corresponding locations in the real world. For example, the device optionally displays a vase such that it appears as if a real vase is placed on top of a table in the physical environment. In some embodiments, each location in the three-dimensional environment has a corresponding location in the physical environment. Thus, when the device is described as displaying a virtual object at a respective location with respect to a physical object (e.g., such as a location at or near the hand of the user, or at or near a physical table), the device displays the virtual object at a particular location in the three-dimensional environment such that it appears as if the virtual object is at or near the physical object in the physical world (e.g., the virtual object is displayed at a location in the three-dimensional environment that corresponds to a location in the physical environment at which the virtual object would be displayed if it were a real object at that particular location).

In some embodiments, real world objects that exist in the physical environment that are displayed in the three-dimensional environment can interact with virtual objects that exist only in the three-dimensional environment. For example, a three-dimensional environment can include a table and a vase placed on top of the table, with the table being a view of (or a representation of) a physical table in the physical environment, and the vase being a virtual object.

Similarly, a user is optionally able to interact with virtual objects in the three-dimensional environment using one or more hands as if the virtual objects were real objects in the physical environment. For example, as described above, one or more sensors of the device optionally capture one or more of the hands of the user and display representations of the hands of the user in the three-dimensional environment (e.g., in a manner similar to displaying a real world object in three-dimensional environment described above), or in some embodiments, the hands of the user are visible via the display generation component via the ability to see the physical environment through the user interface due to the transparency/translucency of a portion of the display generation component that is displaying the user interface or projection of the user interface onto a transparent/translucent surface or projection of the user interface onto the user's eye or into a field of view of the user's eye. Thus, in some embodiments, the hands of the user are displayed at a respective location in the three-dimensional environment and are treated as if they were objects in the three-dimensional environment that are able to interact with the virtual objects in the three-dimensional environment as if they were real physical objects in the physical environment. In some embodiments, a user is able to move his or her hands to cause the representations of the hands in the three-dimensional environment to move in conjunction with the movement of the user's hand.

In some of the embodiments described below, the device is optionally able to determine the "effective" distance between physical objects in the physical world and virtual objects in the three-dimensional environment, for example, for the purpose of determining whether a physical object is interacting with a virtual object (e.g., whether a hand is touching, grabbing, holding, etc. a virtual object or within a threshold distance from a virtual object). For example, the device determines the distance between the hands of the user and virtual objects when determining whether the user is interacting with virtual objects and/or how the user is interacting with virtual objects. In some embodiments, the device determines the distance between the hands of the user and a virtual object by determining the distance between the location of the hands in the three-dimensional environment and the location of the virtual object of interest in the three-dimensional environment. For example, the one or more hands of the user are located at a particular position in the physical world, which the device optionally captures and displays at a particular corresponding position in the three-dimensional environment (e.g., the position in the three-dimensional environment at which the hands would be displayed if the hands were virtual, rather than physical, hands). The position of the hands in the three-dimensional environment is optionally compared against the position of the virtual object of interest in the three-dimensional environment to determine the distance between the one or more hands of the user and the virtual object. In some embodiments, the device optionally determines a distance between a physical object and a virtual object by comparing positions in the physical world (e.g., as opposed to comparing positions in the three-dimensional environment). For example, when determining the distance between one or more hands of the user and a virtual object, the device optionally determines the corresponding location in the physical world of the virtual object (e.g., the position at which the virtual object would be located in the physical world if it were a physical object rather than a virtual object), and then determines the distance between the corresponding physical position and the one or more hands of the user. In some embodiments, the same techniques are optionally used to determine the distance between any physical object and any virtual object. Thus, as described herein, when determining whether a physical object is in contact with a virtual object or whether a physical object is within a threshold distance of a virtual object, the device optionally performs any of the techniques described above to map the location of the physical object to the three-dimensional environment and/or map the location of the virtual object to the physical world.

In some embodiments, the same or similar technique is used to determine where and what the gaze of the user is directed to and/or where and at what a physical stylus held by a user is pointed. For example, if the gaze of the user is directed to a particular position in the physical environment, the device optionally determines the corresponding position in the three-dimensional environment and if a virtual object is located at that corresponding virtual position, the device optionally determines that the gaze of the user is directed to that virtual object. Similarly, the device is optionally able to determine, based on the orientation of a physical stylus, to where in the physical world the stylus is pointing. In some embodiments, based on this determination, the device determines the corresponding virtual position in the three-dimensional environment that corresponds to the location in the physical world to which the stylus is pointing, and optionally determines that the stylus is pointing at the corresponding virtual position in the three-dimensional environment.

Similarly, the embodiments described herein may refer to the location of the user (e.g., the user of the device) and/or the location of the device in the three-dimensional environment. In some embodiments, the user of the device is holding, wearing, or otherwise located at or near the electronic device. Thus, in some embodiments, the location of the device is used as a proxy for the location of the user. In some embodiments, the location of the device and/or user in the physical environment corresponds to a respective location in the three-dimensional environment. In some embodiments, the respective location is the location from which the "camera" or "view" of the three-dimensional environment extends. For example, the location of the device would be the location in the physical environment (and its corresponding location in the three-dimensional environment) from which, if a user were to stand at that location facing the respective portion of the physical environment displayed by the display generation component, the user would see the objects in the physical environment in the same position, orientation, and/or size as they are displayed by the display generation component of the device (e.g., in absolute terms and/or relative to each other). Similarly, if the virtual objects displayed in the three-dimensional environment were physical objects in the physical environment (e.g., placed at the same location in the physical environment as they are in the three-dimensional environment, and having the same size and orientation in the physical environment as in the three-dimensional environment), the location of the device and/or user is the position at which the user would see the virtual objects in the physical environment in the same position, orientation, and/or size as they are displayed by the display generation component of the device (e.g., in absolute terms and/or relative to each other and the real world objects).

In the present disclosure, various input methods are described with respect to interactions with a computer system. When an example is provided using one input device or input method and another example is provided using another input device or input method, it is to be understood that each example may be compatible with and optionally utilizes the input device or input method described with respect to another example. Similarly, various output methods are described with respect to interactions with a computer system. When an example is provided using one output device or output method and another example is provided using another output device or output method, it is to be understood that each example may be compatible with and optionally utilizes the output device or output method described with respect to another example. Similarly, various methods are described with respect to interactions with a virtual environment or a mixed reality environment through a computer system. When an example is provided using interactions with a virtual environment and another example is provided using mixed reality environment, it is to be understood that each example may be compatible with and optionally utilizes the methods described with respect to another example. As such, the present disclosure discloses embodiments that are combinations of the features of multiple examples, without exhaustively listing all features of an embodiment in the description of each example embodiment.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

User Interfaces and Associated Processes

Attention is now directed towards embodiments of user interfaces ("UP") and associated processes that may be implemented on a computer system, such as portable multifunction device or a head-mounted device, with a display generation component, one or more input devices, and (optionally) one or cameras.

Figure 7A:
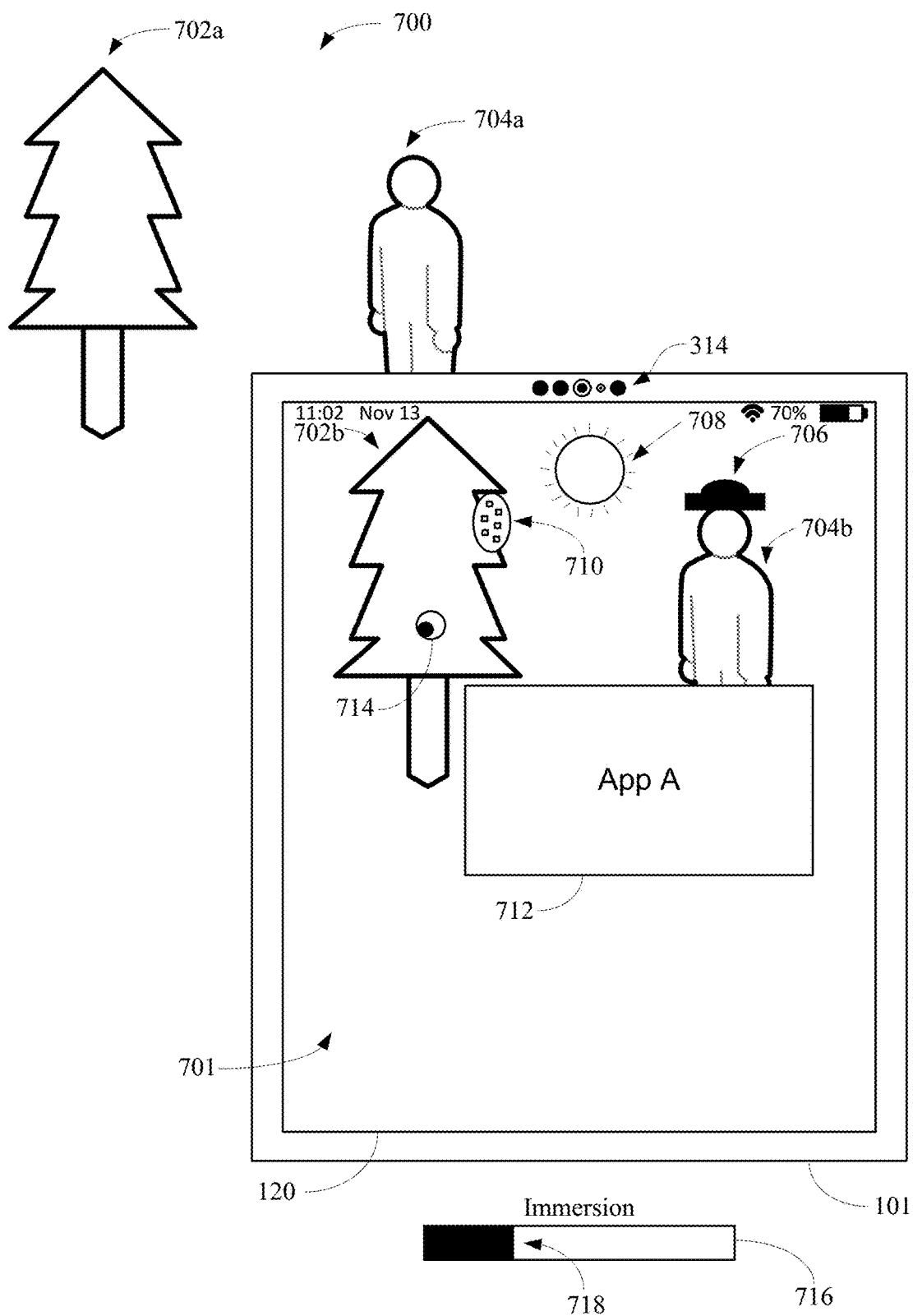
FIGS. 7A-7B illustrate examples of how an electronic device emphasizes and/or deemphasizes user interfaces based on the gaze of a user in accordance with some embodiments.
Figure 7B:
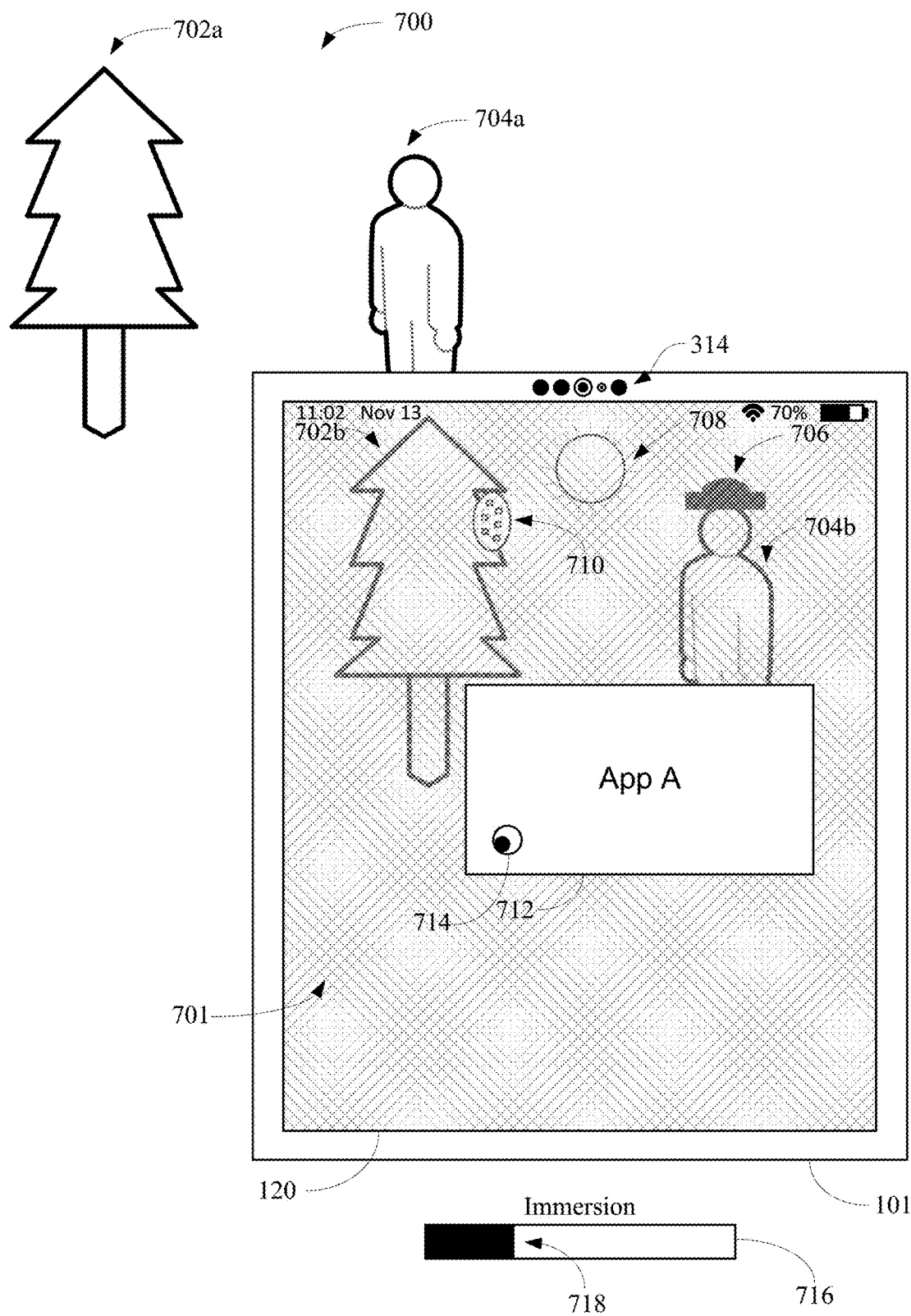
Figure 8A:
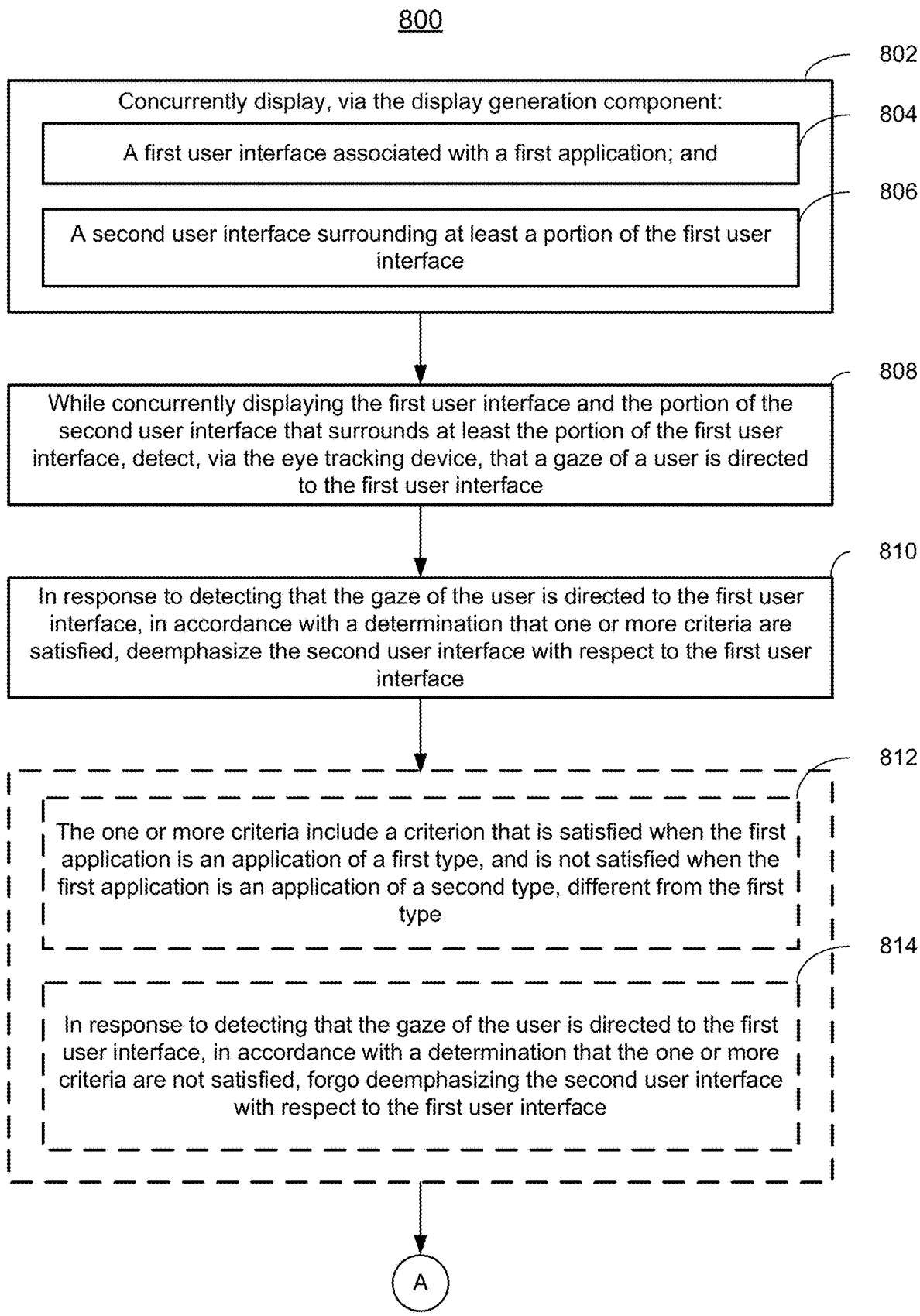
FIGS. 8A-8D is a flowchart illustrating a method of emphasizing and/or deemphasizing user interfaces based on the gaze of a user in accordance with some embodiments.
Figure 8B:
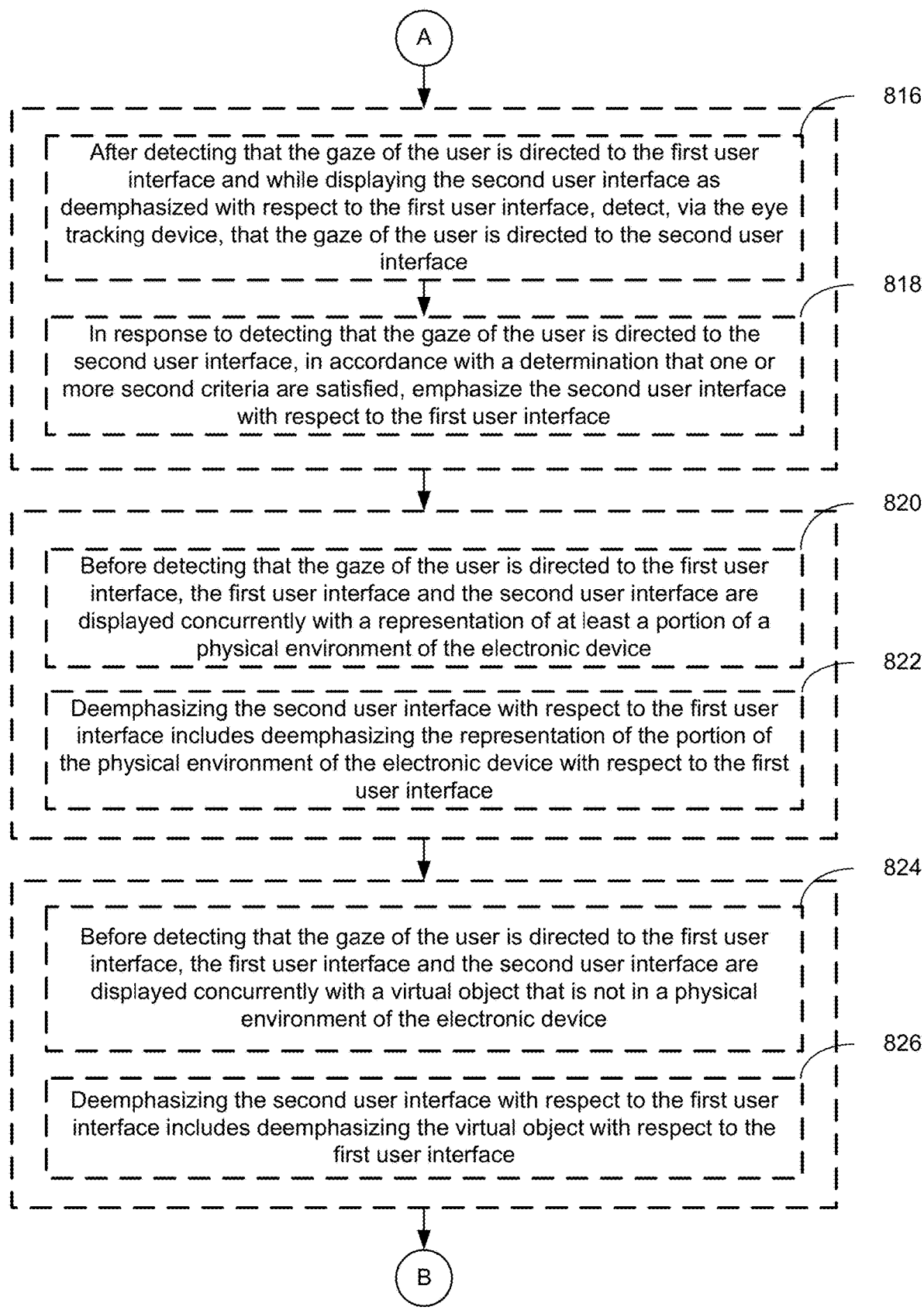
Figure 8C:
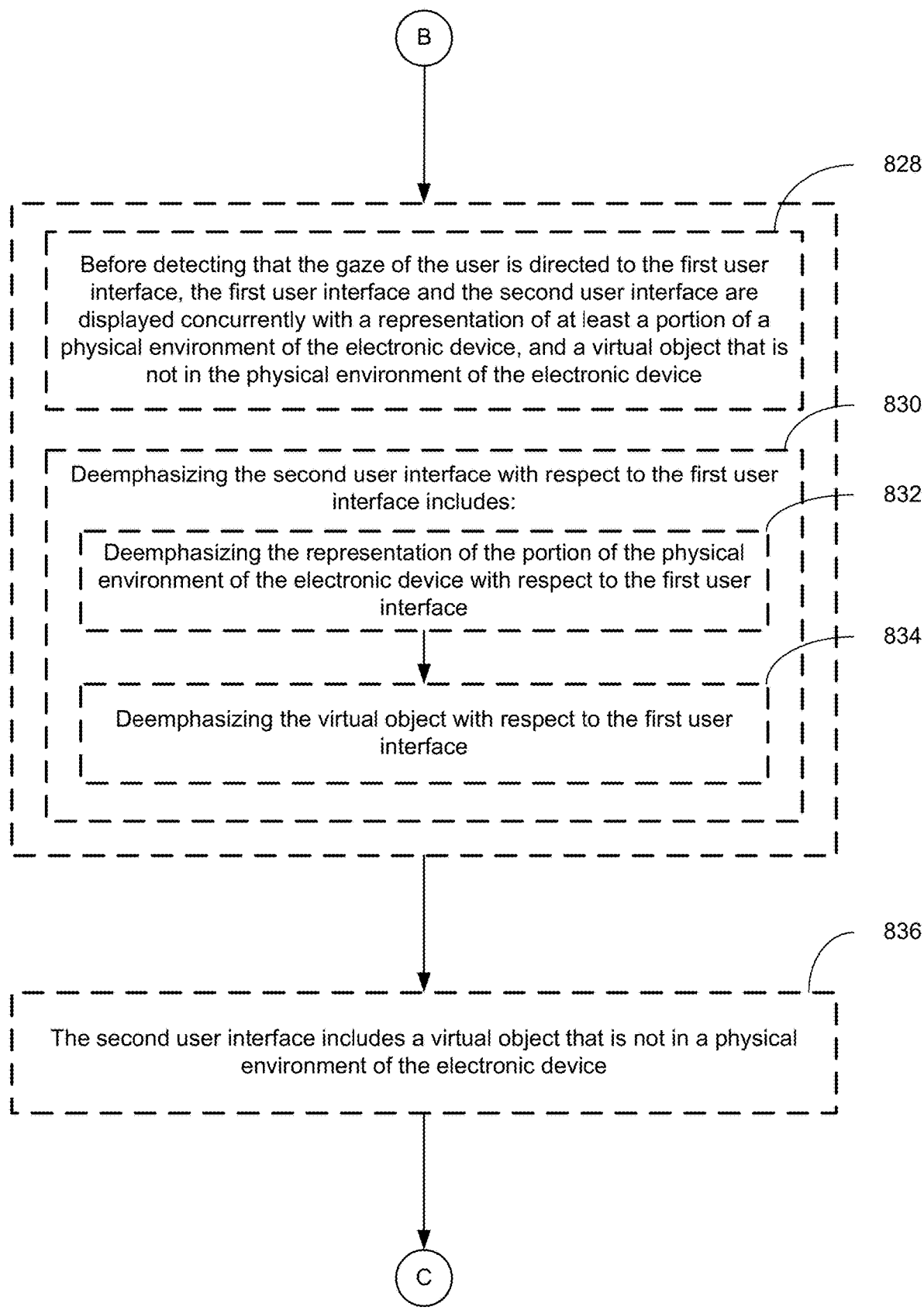
Figure 8D:
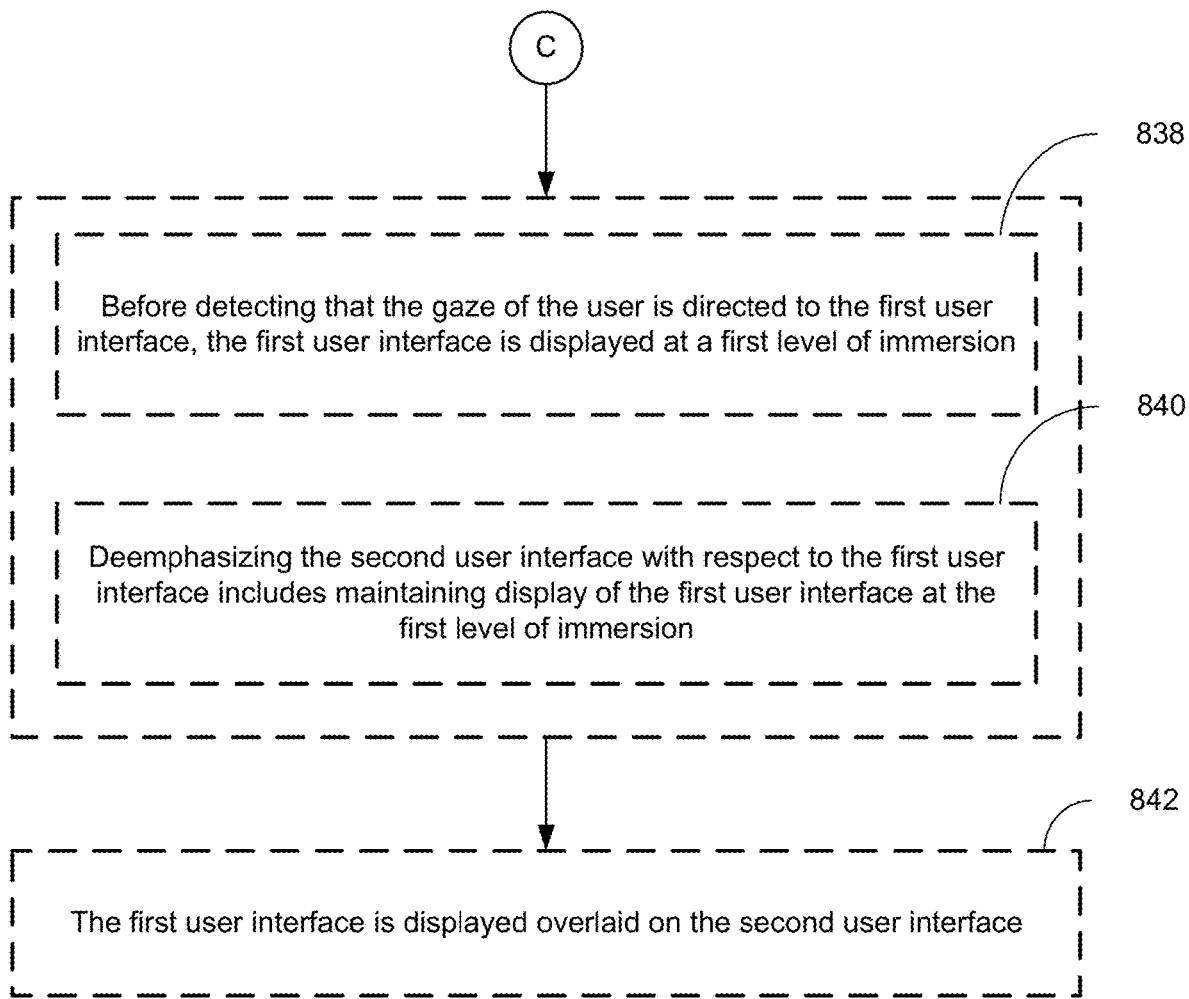

FIGS. 7A-7B illustrate examples of how an electronic device emphasizes and/or deemphasizes portions of user interfaces based on the gaze of a user in accordance with some embodiments.

FIG. 7A illustrates an electronic device 101 displaying, via a display generation component (e.g., display generation component 120 of FIG. 1), a three-dimensional environment 701 in a user interface. As described above with reference to FIGS. 1-6, the electronic device 101 optionally includes a display generation component (e.g., a touch screen) and a plurality of image sensors (e.g., image sensors 314 of FIG. 3). The image sensors optionally include one or more of a visible light camera, an infrared camera, a depth sensor, or any other sensor the electronic device 101 would be able to use to capture one or more images of a user or a part of the user while the user interacts with the electronic device 101. In some embodiments, the user interfaces shown below could also be implemented on a head-mounted display that includes a display generation component that displays the user interface to the user and sensors to detect the physical environment and/or movements of the user's hands (e.g., external sensors facing outwards from the user), and/or gaze of the user (e.g., internal sensors facing inwards towards the face of the user).

As shown in FIG. 7A, device 101 captures one or more images of the physical environment 700 around device 101 (e.g., operating environment 100), including one or more objects in the physical environment 700 around device 101. In some embodiments, device 101 displays representations of the physical environment in three-dimensional environment 701. For example, three-dimensional environment 701 includes a representation 702b of a tree (e.g., corresponding to tree 702a in physical environment 700) and a representation 704b of a person (e.g., corresponding to person 704a in physical environment 700). In some embodiments, device 101 also displays one or more virtual objects (e.g., objects that are not in the physical environment 700) in the three-dimensional environment 701. For example, in FIG. 7A, device 101 is displaying virtual object 710 (e.g., an ornament) on representation 702b of a tree, virtual object 706 (e.g., a hat) on representation 704b of a person, and representation 708 of the sun. In some embodiments, representation 708 of the sun is displayed and treated as a light source in the three-dimensional environment 701, and the lighting effects resulting from representation 708 of the sun are applied, by device 101, to representations of physical objects and/or virtual objects displayed in three-dimensional environment 701.

In FIG. 7A, device 101 is also displaying representation 712 of an application (e.g., App A) in the three-dimensional environment 701. Representation 712 is optionally the user interface of an application (e.g., App A), and includes the content being displayed by that application (e.g., movie playback, collections of photos, etc.). In some embodiments, representation 712 is displayed at a location within three-dimensional environment 701 such that it overlays one or more representations of physical objects and/or virtual objects in three-dimensional environment 701 (e.g., overlaying and in front of part of representation 704b of the person, corresponding to person 704a in physical environment 700). In some embodiments, representation 712 is located within three-dimensional environment 701 such that one or more virtual objects are in front of and overlay part of representation 712 and/or one or more representations of physical objects are in front of and overlay part of representation 712.

In some embodiments, device 101 displays three-dimensional environment 701 and/or user interfaces displayed via display generation component 120 at a particular level of immersion. As will be described in more detail later with reference to FIGS. 9-16, a level of immersion optionally includes an associated degree to which the content displayed by the electronic device 101 obscures background content (e.g., content corresponding to the physical environment, such as representations 702b and 704b, or content other than the user interface of interest) around/behind the user interfaces and/or virtual objects being displayed by device 101, optionally including the number of items of background content displayed and the visual characteristics (e.g., colors, contrast, opacity) with which the background content is displayed, and/or the angular range of the content displayed via the display generation component (e.g., 60 degrees of content displayed at low immersion, 120 degrees of content displayed at medium immersion, 180 degrees of content displayed at high immersion), and/or the proportion of the field of view displayed via the display generation consumed by the content displayed by the electronic device (e.g., 33% of the field of view consumed by content displayed by the electronic device at low immersion, 66% of the field of view consumed by content displayed by the electronic device at medium immersion, 100% of the field of view consumed by content displayed by the electronic device at high immersion). Additional details relating to displaying user interfaces at varying levels of immersion are described with reference to FIGS. 9-16.

In FIG. 7A, device 101 is displaying three-dimensional environment 701 at a particular level of immersion 718 (e.g., indicated on immersion scale 716, the left-most side of which corresponds to no immersion, and the right-mode side of which corresponds to maximum immersion) at which representations 702b and 704b of physical objects are visible via display generation component 120. In some embodiments, device 101 emphasizes and/or deemphasizes various portions of three-dimensional environment 701 based on the gaze of the user of device 101, even when the level of immersion with which device 101 is displaying three-dimensional environment 701 does not change. For example, in FIG. 7A, the gaze 714 of the user of device 101 is directed to representation 702b of the physical tree. However, in FIG. 7B, device 101 detects (e.g., using sensors 314) that the gaze 714 of the user of device 101 is directed to representation 712 of App A. In response to detecting the gaze 714 of the user directed to representation 712 of App A, and without changing the particular level of immersion 718 at which three-dimensional environment 701 is displayed, device 101 optionally deemphasizes portions of the three-dimensional environment outside of representation 712 relative to representation 712, as shown in FIG. 7B. For example, device 101 optionally darkens, blurs, or otherwise obscures display of the representation(s) of the physical environment 700 displayed via display generation component 120 (e.g., representations 702b and 704b and/or the representation of the physical environment in which those representations are displayed), as shown in FIG. 7B. Device 101 additionally or alternatively darkens, blurs, or otherwise obscures display of virtual objects other than representation 712 (e.g., the virtual object to which the gaze 714 of the user of device 101 is directed)—for example, device 101 optionally darkens, blurs, or otherwise obscures display of representation 710, representation 708 and representation 706, as shown in FIG. 7B. In some embodiments, device 101 darkens, blurs or otherwise obscures both display of the representation(s) of the physical environment 700 displayed via display generation component 120 and display of virtual objects other than representation 712. In this way, device 101 is able to reduce distraction(s) posed by representations other than the representation at which the user of device 101 is looking. In some embodiments, if device 101 detects that the gaze 714 of user is directed away from representation 712 (e.g., returns to being directed to a portion of the three-dimensional environment 701 outside of representation 712, such as in FIG. 7A), device 101 optionally ceases to deemphasize the portions of the three-dimensional environment 701 that are deemphasized in FIG. 7B, and returns to the display of the various representations shown in FIG. 7A. As described previously, in some embodiments, the deemphasizing described with reference to FIGS. 7A-7B is separate and independent from changing the level of immersion at which device 101 displays various user interfaces, which will be described in more detail with reference to FIGS. 9-16.

In some embodiments, device 101 only performs the above-described de-emphasis when the user of device 101 looks at certain types of objects (e.g., representations of media player applications) and not other types of objects (e.g., representations of other types of applications). For example, in FIGS. 7A-7B, App A is optionally a media player application (e.g., representation 712 is displaying media, such as a movie or television show). If the gaze 714 of the user had instead been directed to representation 706 of a hat, or a representation of a non-media player application, device 101 optionally would not have deemphasized the objects or the representations other than the one that was being looked at by the user.

FIGS. 8A-8D is a flowchart illustrating a method 800 of emphasizing and/or deemphasizing user interfaces based on the gaze of a user in accordance with some embodiments. In some embodiments, the method 800 is performed at a computer system (e.g., computer system 101 in FIG. 1 such as a tablet, smartphone, wearable computer, or head mounted device) including a display generation component (e.g., display generation component 120 in FIGS. 1, 3, and 4) (e.g., a heads-up display, a display, a touchscreen, a projector, etc.) and one or more cameras (e.g., a camera (e.g., color sensors, infrared sensors, and other depth-sensing cameras) that points downward at a user's hand or a camera that points forward from the user's head). In some embodiments, the method 800 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 800 are, optionally, combined and/or the order of some operations is, optionally, changed.

In the method 800, in some embodiments, an electronic device (e.g., computer system 101 in FIG. 1) in communication with a display generation component and one or more input devices (e.g., a mobile device (e.g., a tablet, a smartphone, a media player, or a wearable device), or a computer) receives (802), via the one or more input devices, a user input corresponding to a two-dimensional drawing, such as a user input drawing two-dimensional drawing 708 in FIG. 7A (e.g., receiving a user input drawing, generating, inserting, or otherwise causing display of a two-dimensional drawing).

In method 800, in some embodiments, an electronic device (e.g., computer system 101 in FIG. 1) in communication with a display generation component and an eye tracking device (e.g., a mobile device (e.g., a tablet, a smartphone, a media player, or a wearable device), or a computer), concurrently displays (802) via the display generation component a first user interface associated with a first application (804), such as user interface 712 in FIG. 7A, and a second user interface surrounding at least a portion of the first user interface (806), such as three-dimensional environment 701 in FIG. 7A. In some embodiments, the electronic device is a mobile device (e.g., a tablet, a smartphone, a media player, or a wearable device), or a computer. In some embodiments, the display generation component is a display integrated with the electronic device (optionally a touch screen display), external display such as a monitor, projector, television, or a hardware component (optionally integrated or external) for projecting a user interface or causing a user interface to be visible to one or more users, etc. In some embodiments, the electronic device is in communication with one or more input devices that include an electronic device or component capable of receiving a user input (e.g., capturing a user input, detecting a user input, etc.) and transmitting information associated with the user input to the electronic device. Examples of input devices include a touch screen, mouse (e.g., external), trackpad (optionally integrated or external), touchpad (optionally integrated or external), remote control device (e.g., external), another mobile device (e.g., separate from the electronic device), a handheld device (e.g., external), a controller (e.g., external), a camera, a depth sensor, a motion sensor (e.g., a hand tracking device, a hand motion sensor), and/or an eye tracking device, etc.).

In some embodiments, the electronic device displays the content of the first application in an application window. For example, displaying a video in a video content playback application, such as an application via which one or more types of content (e.g., music, songs, television episodes, movies, etc.) can be browsed and/or in which the content can be played. In some embodiments, the second user interface is a system user interface, such as a user interface of the operating system of the electronic device, in which the first user interface is displayed. In some embodiments, the first user interface is overlaid on the second user interface. In some embodiments, the first user interface was displayed in response to an input to display the first user interface that was received while the electronic device was displaying the second user interface. In some embodiments, the second user interface is not associated with any single application in particular (e.g., because it is an operating system user interface rather than an application user interface). In some embodiments, the second user interface includes or is a three-dimensional environment within which the first user interface is displayed, such as displaying the first user interface within a computer-generated reality (CGR) environment such as a virtual reality (VR) environment, a mixed reality (MR) environment, or an augmented reality (AR) environment, etc. that is generated, displayed, or otherwise caused to be viewable by the electronic device.

In some embodiments, while concurrently displaying the first user interface and the portion of the second user interface that surrounds at least the portion of the first user interface, the electronic device detects (808), via the eye tracking device, that a gaze of a user is directed to the first user interface, such as gaze 714 directed to representation 712 in FIG. 7B (e.g., the electronic device determines, via the eye tracking device, that the user is looking at an area within the first user interface, or within an area/volume of the second user interface that includes the first user interface. In some embodiments, the gaze of the user is directed to the first user interface when the gaze of the user is coincident with a location in the second user interface that is within a threshold distance (e.g., 1 inch, 6 inches, 1 foot, 2 feet, 10 feet, etc.) of the first user interface).

In some embodiments, in response to detecting that the gaze of the user is directed to the first user interface, in accordance with a determination that one or more criteria are satisfied (e.g., the one or more criteria include a criterion that is satisfied when the first application is a first type of application (e.g., a media player application for browsing and/or viewing photos, videos, movies, etc.), but is not satisfied when the first application is a second type of application, different from the first type of application (e.g., a word processing application). In some embodiments, the one or more criteria are satisfied without any additional input from the user other than the gaze of the user being directed to the first user interface (e.g., the second user interface is automatically deemphasized with respect to the first user interface in response to the gaze input). In some embodiments, the one or more criteria include a criterion that is satisfied when the gaze of the user is directed to the first user interface for longer than a time threshold, such as 0.5, 1, 2, 5, 10 seconds, and not satisfied otherwise.), the electronic device deemphasizes (810) the second user interface with respect to the first user interface, such as deemphasizing content of the three-dimensional environment 701 with respect to representation 712 in FIG. 7A. For example, the first user interface is brightened and/or the second user interface is darkened/dimmed. In some embodiments, the first user interface is updated such that a respective visual characteristic of the first user interface changes from having a first value to having a second value, different from the first value. In some embodiments, the second user interface is updated such that a respective visual characteristic of the second user interface changes from having a third value to having a fourth value, different from the third value. In some embodiments, the second user interface becomes blurred (when it wasn't blurred before) or becomes more blurred (when it was already blurred before). In some embodiments, the first user interface is expanded in size, and thus occupies more of and/or overlays more of the second user interface. In some embodiments, if the one or more criteria are not satisfied, the second user interface is not deemphasized with respect to the first user interface. In some embodiments, if the gaze of the user moves to the second user interface from the first user interface, the deemphasizing of the second user interface with respect to the first user interface is reversed (e.g., reverts to the relative emphasis that existed before the gaze of the user was directed to the first user interface). In some embodiments, if the gaze of the user moves to the second user interface from the first user interface, the first user interface is deemphasized with respect to the second user interface (e.g., in the same or similar ways as described herein with respect to deemphasizing the second user interface with respect to the first user interface). The above-described manner of deemphasizing the second user interface with respect to the first user interface provides an efficient way of indicating that the first user interface is the user interface with focus, which simplifies the interaction between the user and the electronic device and enhances the operability of the electronic device and makes the user-device interface more efficient (e.g., by avoiding distraction by, and thus unnecessary interaction with, the second user interface), which additionally reduces power usage and improves battery life of the electronic device by enabling the user to use the electronic device more quickly and efficiently, while reducing errors in usage.

In some embodiments, the one or more criteria include a criterion that is satisfied when the first application is an application of a first type, and is not satisfied when the first application is an application of a second type, different from the first type (812) (e.g., the criterion is satisfied for applications that are applications for browsing and/or viewing content or media (e.g., applications in which movies, images, music, television shows, etc. are viewable), and is not satisfied for applications that are not applications for viewing content or media (e.g., word processing applications, calendar applications, spreadsheet applications, etc.)). In some embodiments, in response to detecting that the gaze of the user is directed to the first user interface, in accordance with a determination that the one or more criteria are not satisfied (e.g., because the first application is not a content/media browsing and/or viewing application), the electronic device forgoes deemphasizing (814) the second user interface with respect to the first user interface. For example, the display of the first user interface and the second user interface remain as they were before the gaze of the user was detected as being directed to the first user interface, and optionally the relative emphasis of the first user interface with respect to the second user interface, and vice versa, remains as it was before the gaze of the user was detected as being directed to the first user interface. Therefore, the second user interface is optionally not darkened or blurred in response to the gaze of the user being directed to the first user interface. In some embodiments, the gaze-based de-emphasis of the first user interface with respect to the second user interface occurs for all types of applications, including applications other than content and/or media viewing applications (e.g., the one or more criteria do not include the application type criterion described above). The above-described manner of performing gaze-based de-emphasis of user interfaces based on the type of application associated with the user interfaces provides a quick and efficient way of only emphasizing/de-emphasizing user interfaces in situations where such emphasis/de-emphasis is likely desired, which simplifies the interaction between the user and the electronic device and enhances the operability of the electronic device and makes the user-device interface more efficient (e.g., by avoiding erroneous emphasis/de-emphasis of user interfaces, which then requires additional user input to correct), which additionally reduces power usage and improves battery life of the electronic device by enabling the user to use the electronic device more quickly and efficiently, while reducing errors in usage.

In some embodiments, after detecting that the gaze of the user is directed to the first user interface and while displaying the second user interface as deemphasized with respect to the first user interface (e.g., the gaze of the user being directed to the first user interface caused the second user interface to be deemphasized with respect to the first user interface), the electronic device detects (816), via the eye tracking device, that the gaze of the user is directed to the second user interface, such as gaze 714 moving back outside of representation 712, such as in FIG. 7A (e.g., the electronic device determines, via the eye tracking device, that the user is looking at an area within the second user interface, outside of the area/volume occupied by the first user interface. In some embodiments, the gaze of the user is directed to the second user interface when the gaze of the user is coincident with a location in the first user interface that is within a threshold distance (e.g., 1 inch, 6 inches, 1 foot, 2 feet, 10 feet, etc.) of the second user interface). In some embodiments, in response to detecting that the gaze of the user is directed to the second user interface, in accordance with a determination that one or more second criteria are satisfied (In some embodiments, the one or more second criteria are satisfied without any additional input from the user other than the gaze of the user being directed to the second user interface (e.g., the first user interface is automatically deemphasized with respect to the second user interface in response to the gaze input). In some embodiments, the one or more second criteria include a criterion that is satisfied when the gaze of the user is directed to the second user interface for longer than a time threshold, such as 0.5, 1, 2, 5, 10 seconds, and not satisfied otherwise.), the electronic device emphasizes (818) the second user interface with respect to the first user interface, such as resulting in the display of FIG. 7A (e.g., and/or deemphasizing the first user interface with respect to the second user interface).

In some embodiments, the display of the first user interface and the second user interface returns to how the two user interfaces were displayed (e.g., in an absolute sense and/or relative to one another) before the gaze of the user was detected as being directed to the first user interface. In some embodiments, the second user interface is brightened and/or un-blurred and/or otherwise less obscured. In some embodiments, the first user interface is darkened and/or blurred and/or otherwise more obscured. In some embodiments, the second user interface becomes more emphasized relative to the first user interface as compared with the relative display of the first and second user interfaces before the gaze of the user was directed to the first user interface. In some embodiments, the second user interface becomes less emphasized relative to the first user interface as compared with the relative display of the first and second user interfaces before the gaze of the user was directed to the first user interface. The above-described manner of reverting display of the user interfaces based on gaze provides a quick and efficient way of returning to the prior display of the user interfaces, which simplifies the interaction between the user and the electronic device and enhances the operability of the electronic device and makes the user-device interface more efficient (e.g., by not requiring additional or different kinds of user input to revert display of the user interfaces), which additionally reduces power usage and improves battery life of the electronic device by enabling the user to use the electronic device more quickly and efficiently, while reducing errors in usage.

In some embodiments, before detecting that the gaze of the user is directed to the first user interface, the first user interface and the second user interface are displayed concurrently with a representation of at least a portion of a physical environment of the electronic device (820), such as representations 702b and 704b in FIG. 7A (e.g., a representation of the portion and/or an object in the physical environment of the electronic device is passed through via the display generation component to be displayed concurrently with the first user interface and/or the second user interface). In some embodiments, the pass-through object is actively displayed by the electronic device (e.g., by being captured via one or more sensors of the electronic device, and generated for display via the display generation component). In some embodiments, the display of the pass-through object is not obscured by the electronic device (e.g., in the case of a transparent or semi-transparent display generation component that allows portions of the physical environment of the electronic device to be visible through the display generation component). In some embodiments, the second user interface includes the portion(s) of the physical environment visible via the display generation component. In some embodiments, the second user interface and the first user interface are displayed within a three-dimensional environment, displayed via the display generation component, that includes the portion(s) of the physical environment visible via the display generation component. In some embodiments, the portion of the physical environment is a physical table placed on the physical floor of the physical environment of the electronic device.

In some embodiments, deemphasizing the second user interface with respect to the first user interface includes deemphasizing the representation of the portion of the physical environment of the electronic device with respect to the first user interface (822), such as the deemphasizing of representations 702b and 704b shown in FIG. 7B. For example, darkening and/or blurring and/or otherwise obscuring display of the representation of the portion of the physical environment of the electronic device (e.g., darkening the representation of the physical table) and/or brightening and/or otherwise emphasizing display of the first user interface. The above-described manner of treating display of portions of the physical environment of the electronic device similarly to the second user interface maintains consistency of response of the electronic device to the gaze of the user, which simplifies the interaction between the user and the electronic device and enhances the operability of the electronic device and makes the user-device interface more efficient (e.g., by avoiding distraction by, and thus unnecessary interaction with, the portions of the physical environment of the electronic device), which additionally reduces power usage and improves battery life of the electronic device by enabling the user to use the electronic device more quickly and efficiently, while reducing errors in usage.

In some embodiments, before detecting that the gaze of the user is directed to the first user interface, the first user interface and the second user interface are displayed concurrently with a virtual object that is not in a physical environment of the electronic device (824), such as representations 706, 708 and 710 in FIG. 7A (e.g., displaying a representation of an object, element, application, etc. that is a virtual object rather than being a representation of a physical object and/or portion of the physical environment of the electronic device. In some embodiments, the second user interface includes the virtual object. In some embodiments, the virtual object is displayed outside of the first and/or second user interfaces. For example, a representation of a virtual (e.g., not physical, not real) vase displayed as if it were placed on a physical table placed on the physical floor of the physical environment of the electronic device. In some embodiments, deemphasizing the second user interface with respect to the first user interface includes deemphasizing the virtual object with respect to the first user interface (826), such as the deemphasizing of representations 706, 708 and 710 shown in FIG. 7B. For example, darkening and/or blurring and/or otherwise obscuring display of the virtual object (e.g., darkening the virtual vase displayed as if it were placed on the physical table in the physical environment of the electronic device) while brightening and/or otherwise emphasizing display of the first user interface. The above-described manner of treating display of virtual objects similarly to the second user interface maintains consistency of response of the electronic device to the gaze of the user, which simplifies the interaction between the user and the electronic device and enhances the operability of the electronic device and makes the user-device interface more efficient (e.g., by avoiding distraction by, and thus unnecessary interaction with, the virtual object), which additionally reduces power usage and improves battery life of the electronic device by enabling the user to use the electronic device more quickly and efficiently, while reducing errors in usage.

In some embodiments, before detecting that the gaze of the user is directed to the first user interface, the first user interface and the second user interface are displayed concurrently with a representation of at least a portion of a physical environment of the electronic device (828), such as representations 702b and 704b in FIG. 7A (e.g., a representation of the portion and/or an object in the physical environment of the electronic device is passed through via the display generation component to be displayed concurrently with the first user interface and/or the second user interface). In some embodiments, the pass-through object is actively displayed by the electronic device (e.g., by being captured via one or more sensors of the electronic device, and generated for display via the display generation component). In some embodiments, the display of the pass-through object is not obscured by the electronic device (e.g., in the case of a transparent or semi-transparent display generation component that allows portions of the physical environment of the electronic device to be visible through the display generation component). In some embodiments, the second user interface includes the portion(s) of the physical environment visible via the display generation component. In some embodiments, the second user interface and the first user interface are displayed within a three-dimensional environment, displayed via the display generation component, that includes the portion(s) of the physical environment visible via the display generation component. In some embodiments, the portion of the physical environment is a physical table placed on the physical floor of the physical environment of the electronic device.

In some embodiments, the first user interface and the second user interface are displayed concurrently with a virtual object that is not in the physical environment of the electronic device (828), such as representations 706, 708 and 710 in FIG. 7A (e.g., displaying a representation of an object, element, application, etc. that is a virtual object rather than being a representation of a physical object and/or portion of the physical environment of the electronic device). In some embodiments, the second user interface includes the virtual object. In some embodiments, the virtual object is displayed outside of the first and/or second user interfaces. For example, a representation of a virtual (e.g., not physical, not real) vase displayed as if it were placed on a physical table placed on the physical floor of the physical environment of the electronic device. In some embodiments, deemphasizing the second user interface with respect to the first user interface includes (830), deemphasizing the representation of the portion of the physical environment of the electronic device with respect to the first user interface (832), such as shown in FIG. 7B (e.g., darkening and/or blurring and/or otherwise obscuring display of the representation of the portion of the physical environment of the electronic device (e.g., darkening the representation of the physical table) while brightening and/or otherwise emphasizing display of the first user interface), and deemphasizing the virtual object with respect to the first user interface (834), such as shown in FIG. 7B (e.g., darkening and/or blurring and/or otherwise obscuring display of the virtual object (e.g., darkening the virtual vase displayed as if it were placed on the physical table in the physical environment of the electronic device) while brightening and/or otherwise emphasizing display of the first user interface). The above-described manner of treating display of virtual objects and portions of the physical environment of the electronic device similarly to the second user interface maintains consistency of response of the electronic device to the gaze of the user, which simplifies the interaction between the user and the electronic device and enhances the operability of the electronic device and makes the user-device interface more efficient (e.g., by avoiding distraction by, and thus unnecessary interaction with, the virtual object and the portions of the physical environment), which additionally reduces power usage and improves battery life of the electronic device by enabling the user to use the electronic device more quickly and efficiently, while reducing errors in usage.

In some embodiments, the second user interface includes a virtual object that is not in a physical environment of the electronic device (836), such as representations 706, 708 and 710 in FIG. 7A. For example, displaying a representation of an object, element, application, etc. that is a virtual object in the second user interface (e.g., as compared with a representation of a physical object and/or portion of the physical environment of the electronic device). For example, a representation of a virtual (e.g., not physical, not real) vase displayed in the second user interface as if it were placed on a physical table placed on the physical floor of the physical environment of the electronic device. In some embodiments, the second user interface is a background over which and/or within which the first user interface is displayed (e.g., so the first user interface is overlaid on the area/volume that contains the virtual object). In some embodiments, the virtual object is also deemphasized with respect to the first user interface (e.g., similarly to the second user interface) in response to the gaze of the user being directed to the first user interface. The above-described manner of performing gaze-based emphasis/de-emphasis of user interfaces provides a quick and efficient manner of emphasizing/de-emphasizing user interfaces in display spaces that include virtual objects, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, before detecting that the gaze of the user is directed to the first user interface, the first user interface is displayed at a first level of immersion (838), such as level of immersion 718 in FIG. 7A (e.g., displayed at a respective level of immersion as described with reference to methods 1000, 1200 and/or 1600), and deemphasizing the second user interface with respect to the first user interface includes maintaining display of the first user interface at the first level of immersion (840), such as maintaining the same level of immersion 718 in FIG. 7B (e.g., continuing to be displayed at the respective level of immersion as described with reference to methods 1000, 1200 and/or 1600). For example, the gaze-based de-emphasis of the second user interface with respect to the first user interface described here in method 800 optionally does not change the level of immersion with which the displayed user interface(s) are displayed. In some embodiments, the de-emphasis and/or emphasis of one user interface with respect to another user interface described here in method 800 is independent from changes in display characteristics resulting from changes in levels of immersion, as described with reference to methods 1000, 1200 and/or 1600. In some embodiments, the de-emphasis and/or emphasis of one user interface with respect to another user interface described here in method 800 is additive to and/or combined with (e.g., whether a positive or negative contribution) the changes in display characteristics resulting from changes in levels of immersion, as described with reference to methods 1000, 1200 and/or 1600. The above-described manner of performing gaze-based emphasis/de-emphasis of user interfaces provides a quick and efficient manner of emphasizing/de-emphasizing user interfaces without changing the levels of immersion of the displayed user interfaces, which simplifies the interaction between the user and the electronic device and enhances the operability of the electronic device and makes the user-device interface more efficient (e.g., by avoiding erroneous changes to the levels of immersion of the displayed user interfaces, which would require additional user input to correct), which additionally reduces power usage and improves battery life of the electronic device by enabling the user to use the electronic device more quickly and efficiently, while reducing errors in usage.

In some embodiments, the first user interface is displayed overlaid on the second user interface (842), such as representation 712 overlaid on content of three-dimensional environment 701 in FIG. 7A. For example, the second user interface is a background over which and/or within which the first user interface is displayed, such that portions of the second user interface are obscured (e.g., not visible) by the first user interface (e.g., the portions of the second user interface that are behind the first user interface), and other portions of the second user interface are not obscured (e.g., visible) by the first user interface (e.g., the portions of the second user interface that surround and/or are not behind the first user interface). The above-described manner of performing gaze-based emphasis/de-emphasis of a user interface overlaid on another user interface provides a quick and efficient manner of emphasizing/de-emphasizing the overlaying user interface, which simplifies the interaction between the user and the electronic device and enhances the operability of the electronic device and makes the user-device interface more efficient (e.g., by avoiding distraction by, and thus unnecessary interaction with, the background behind the overlaying user interface), which additionally reduces power usage and improves battery life of the electronic device by enabling the user to use the electronic device more quickly and efficiently, while reducing errors in usage.

Figure 9A:
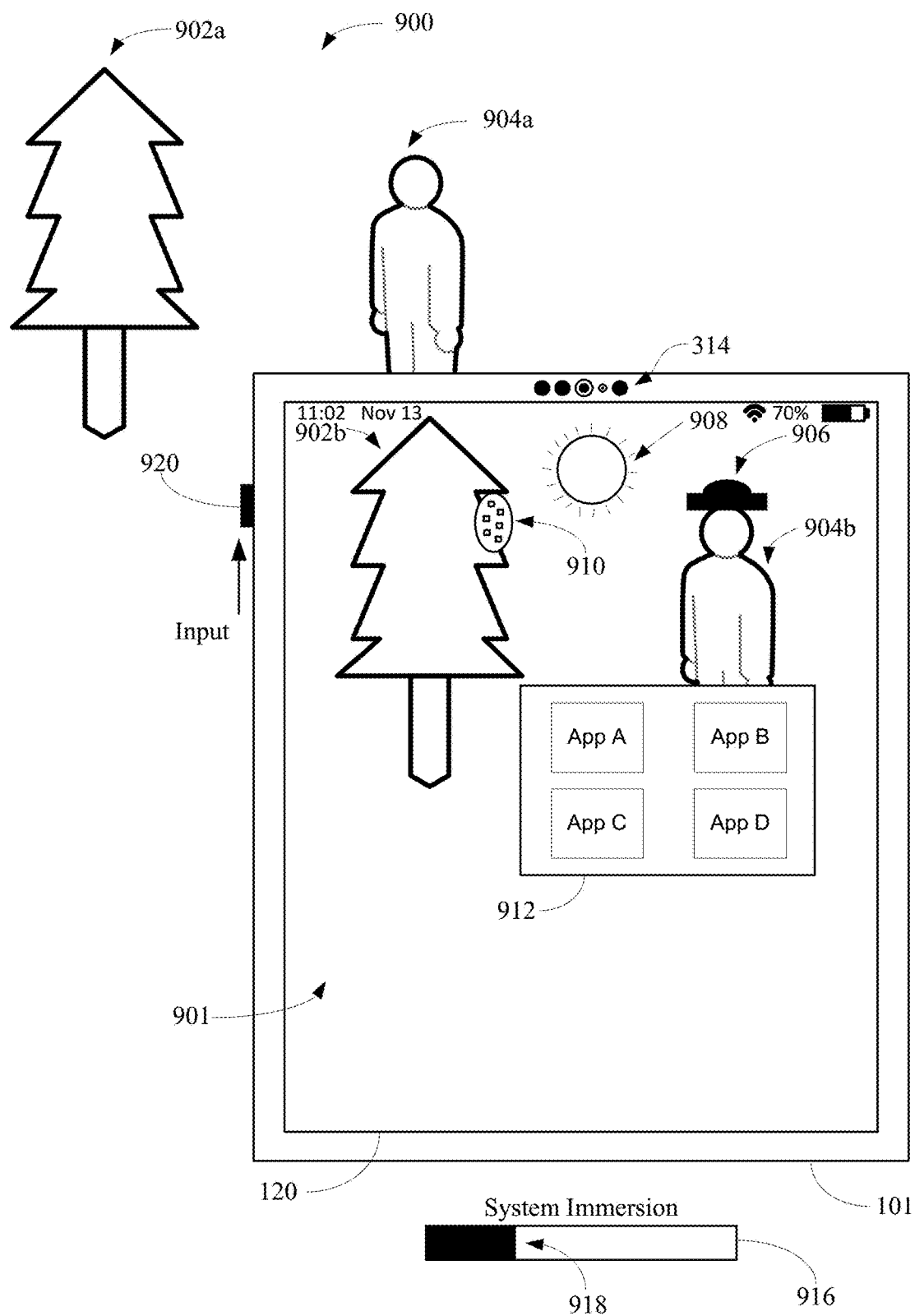
FIGS. 9A-9C illustrate examples of defining levels of immersion for different user interfaces independently of one another in accordance with some embodiments.
Figure 9B:
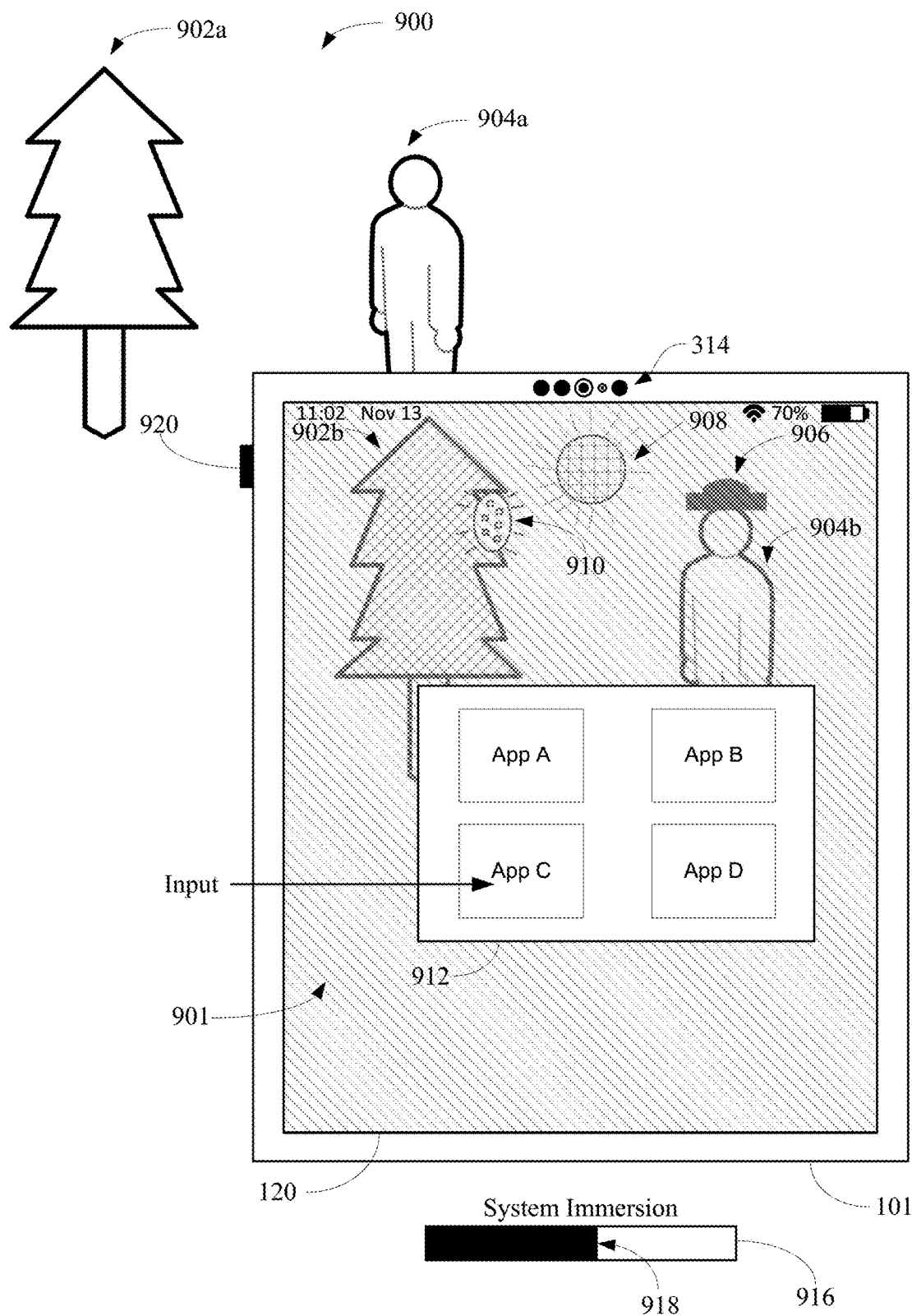
Figure 9C:
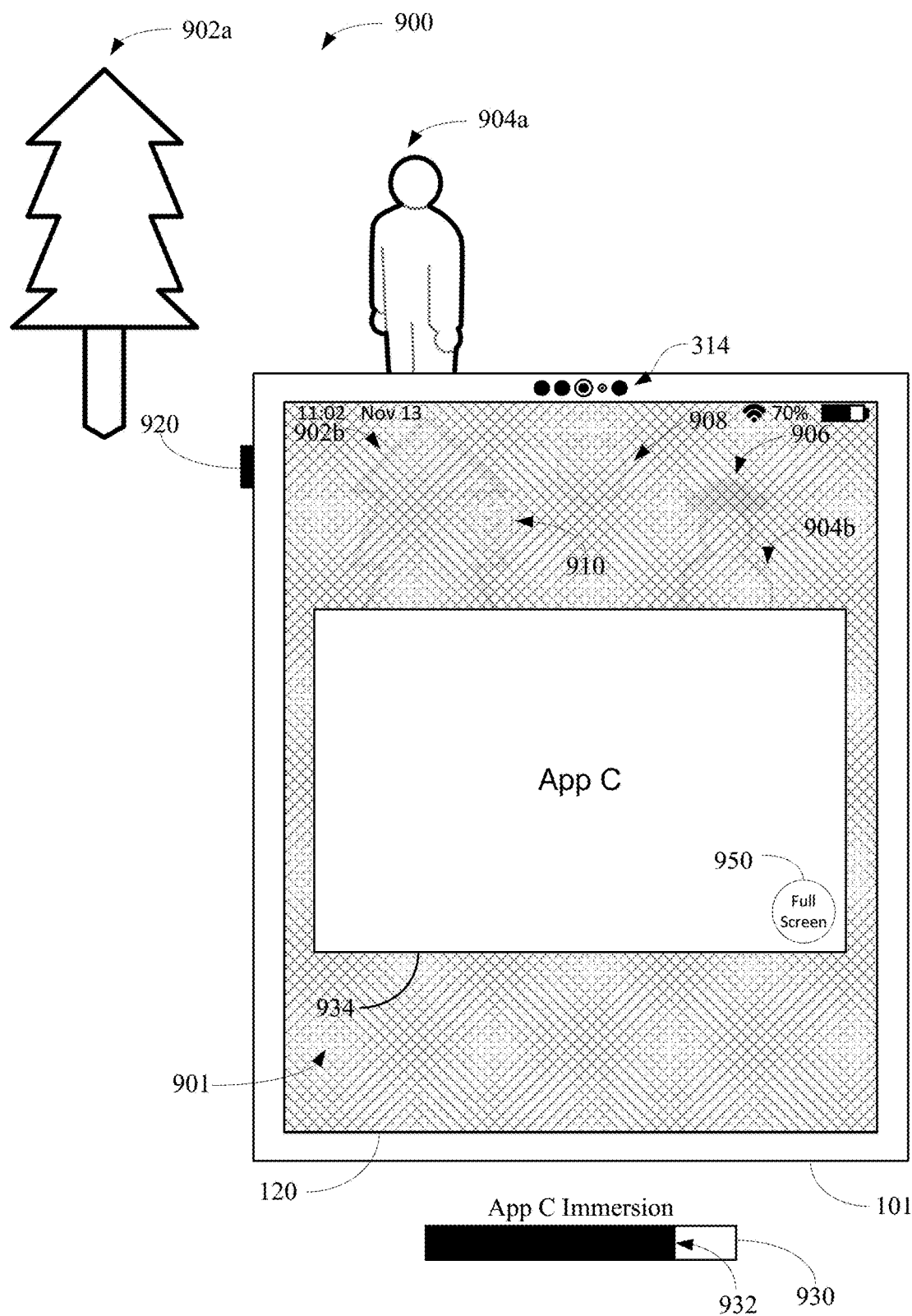
Figure 10B:
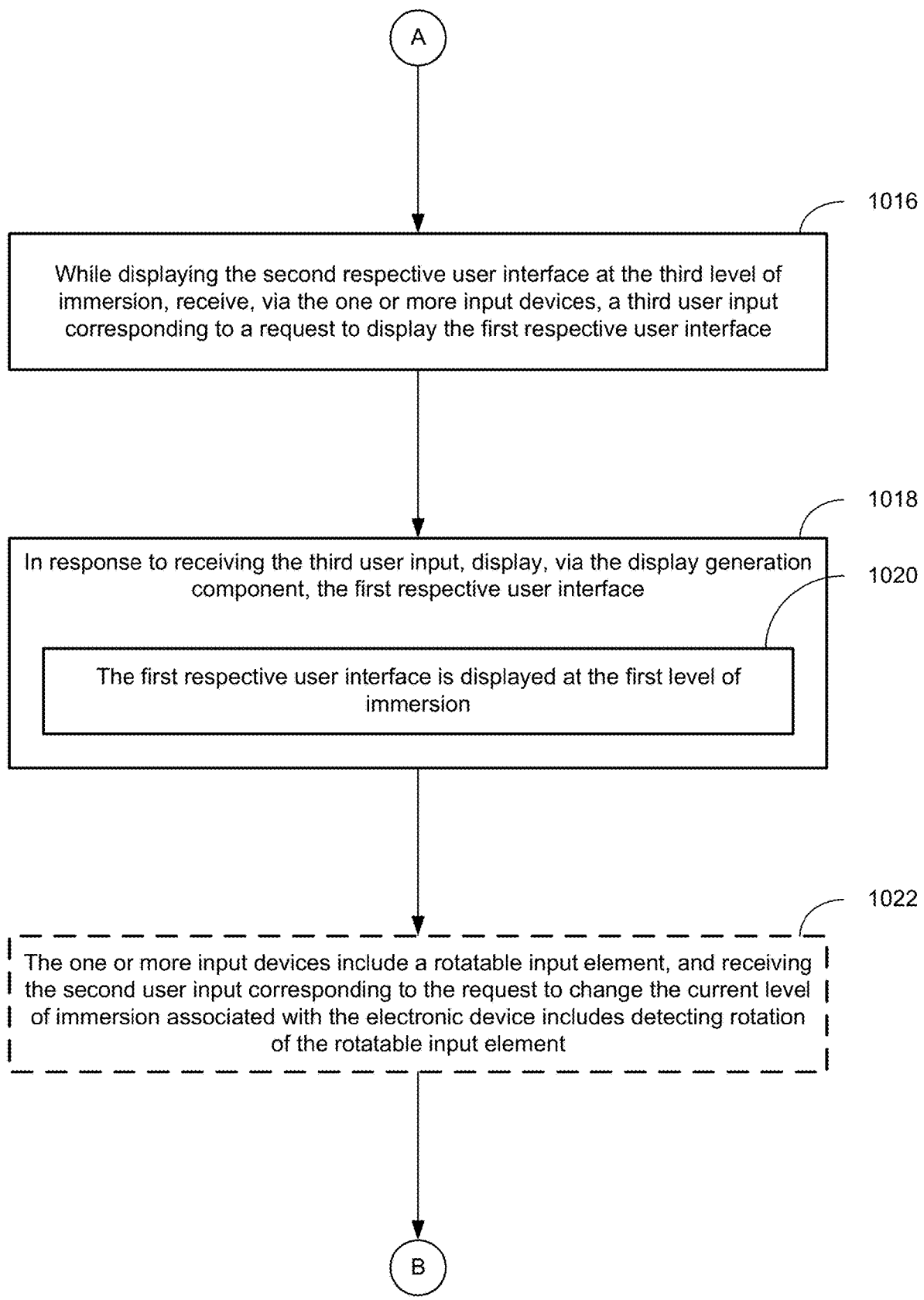
Figure 10C:
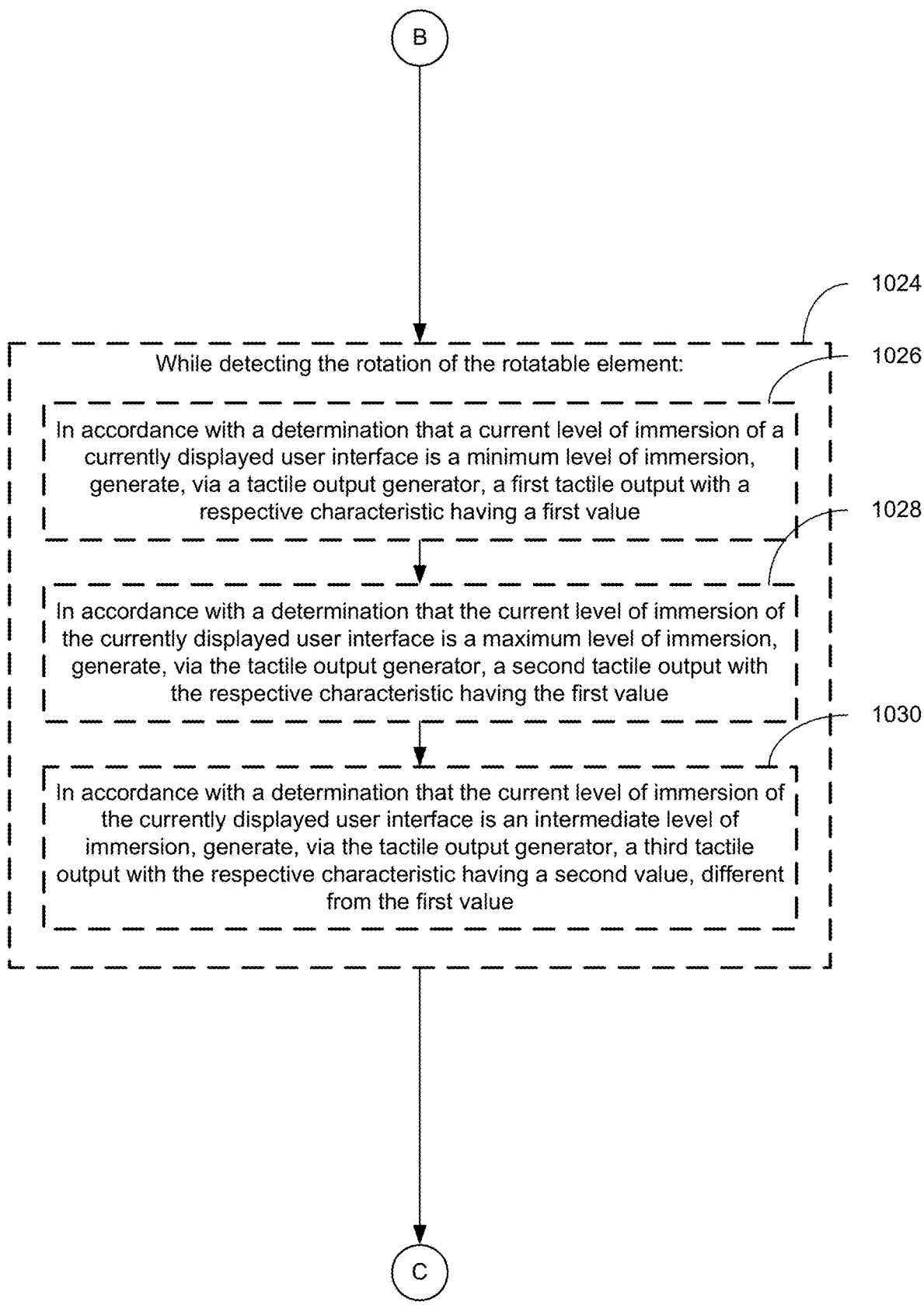
Figure 10D:
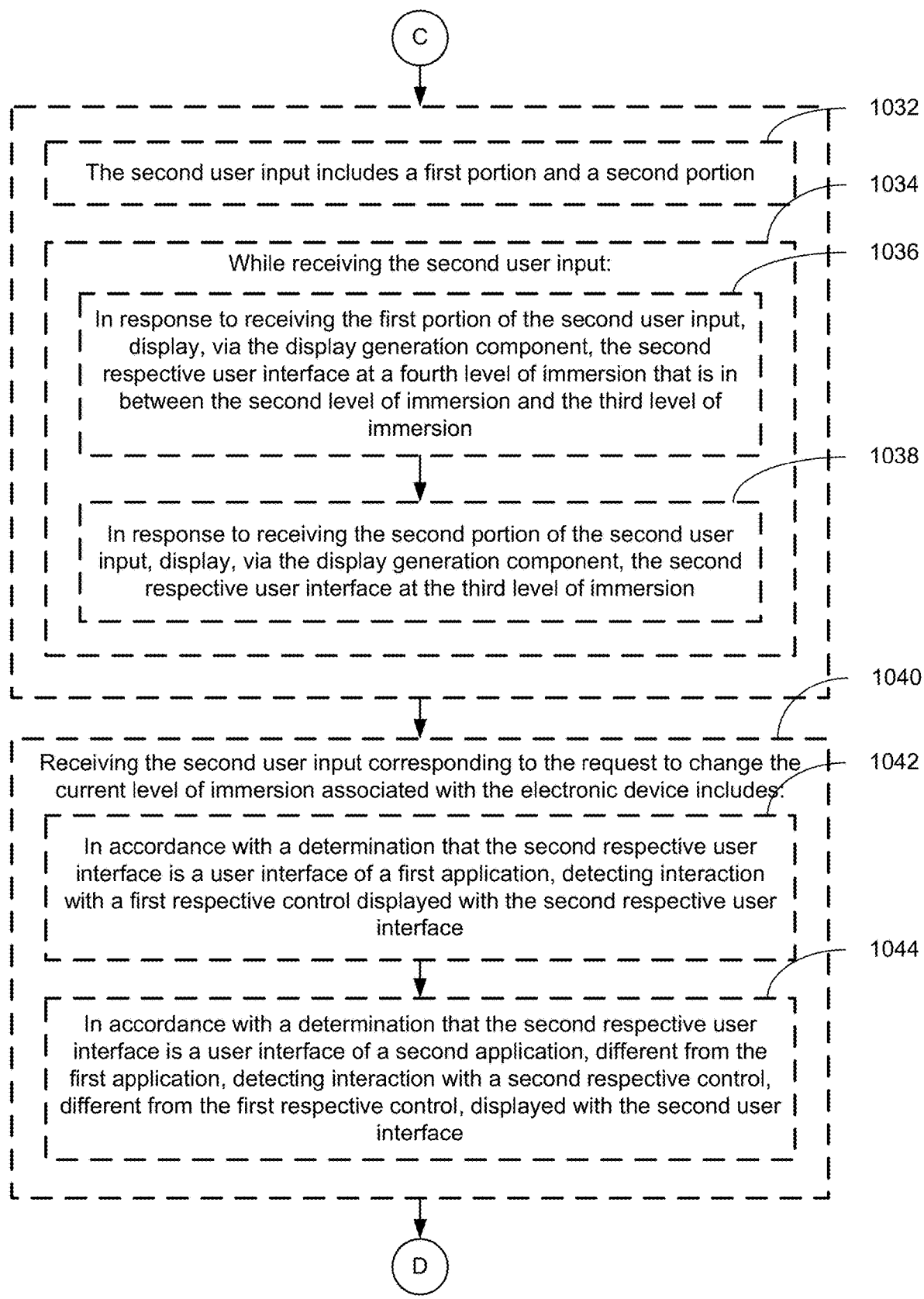
Figure 10E:
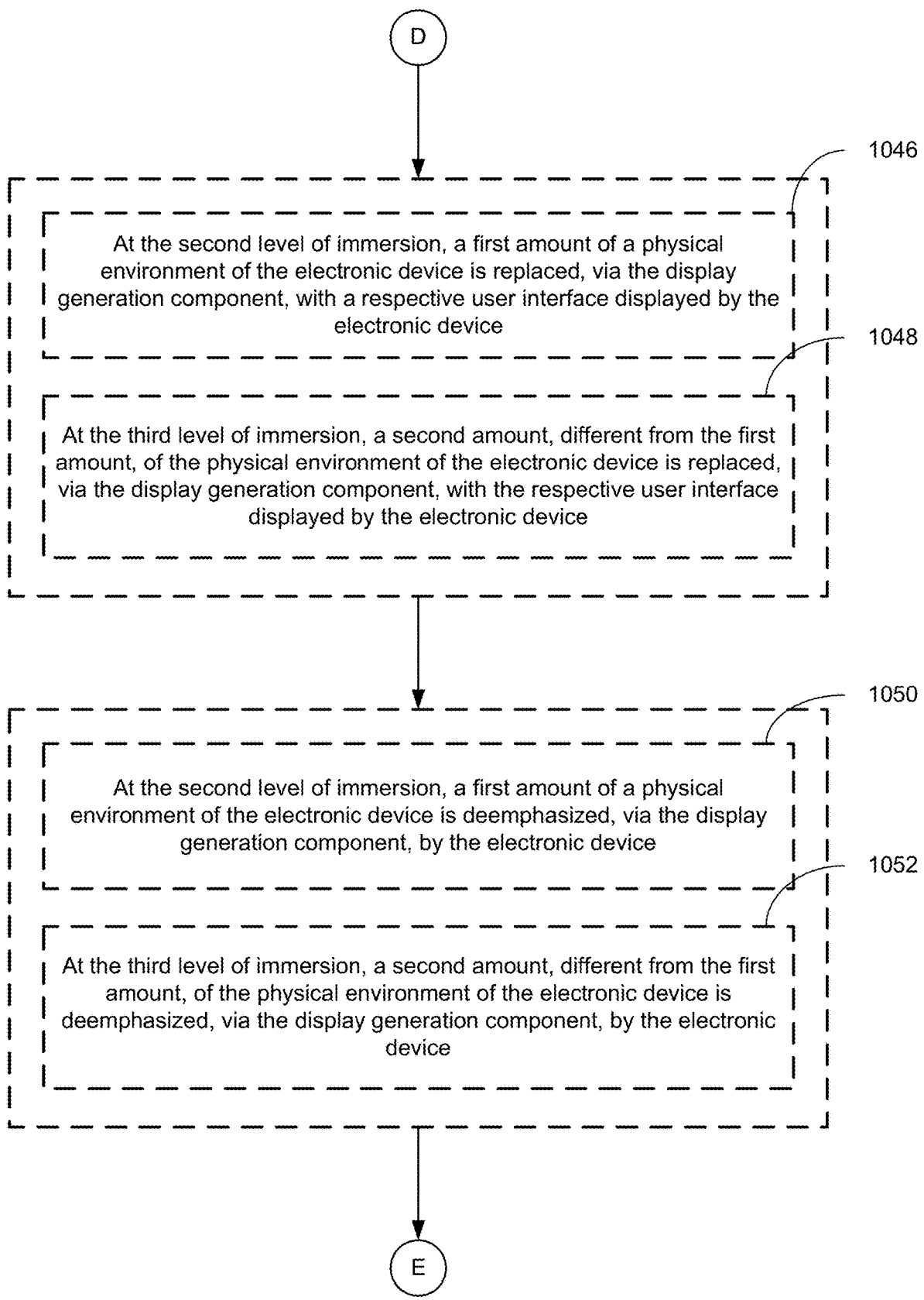
Figure 10F:
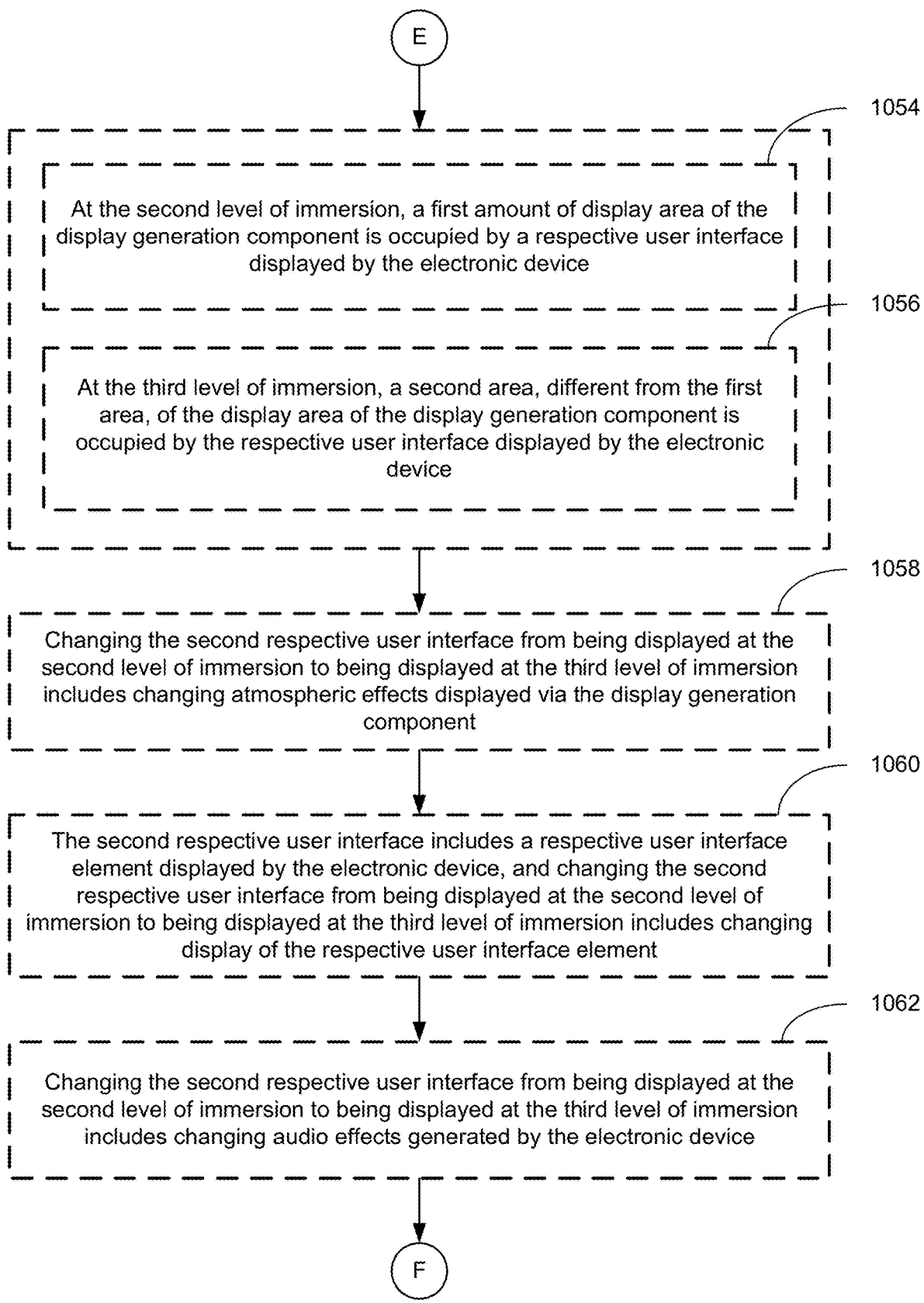
Figure 10G:
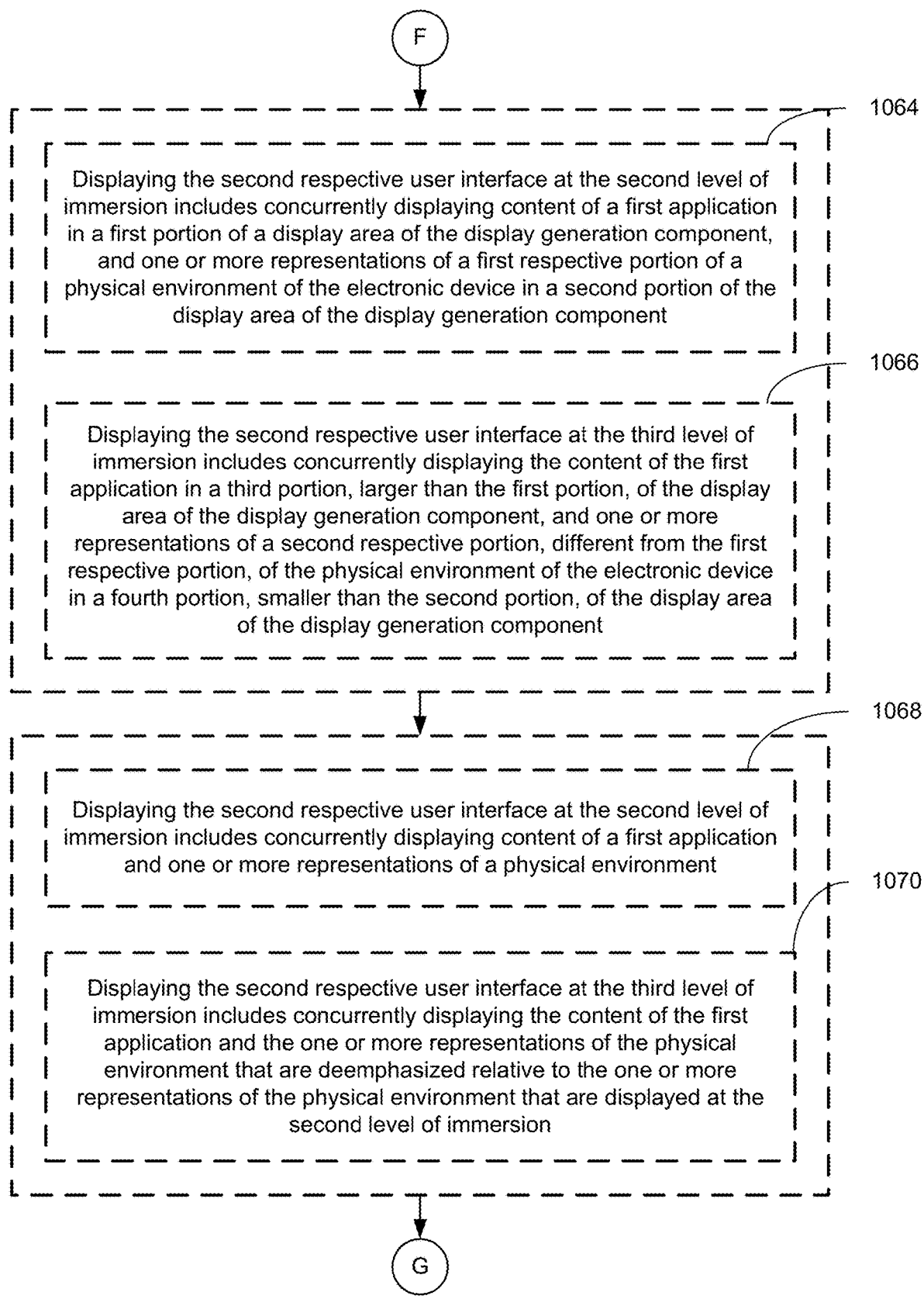
Figure 10H:
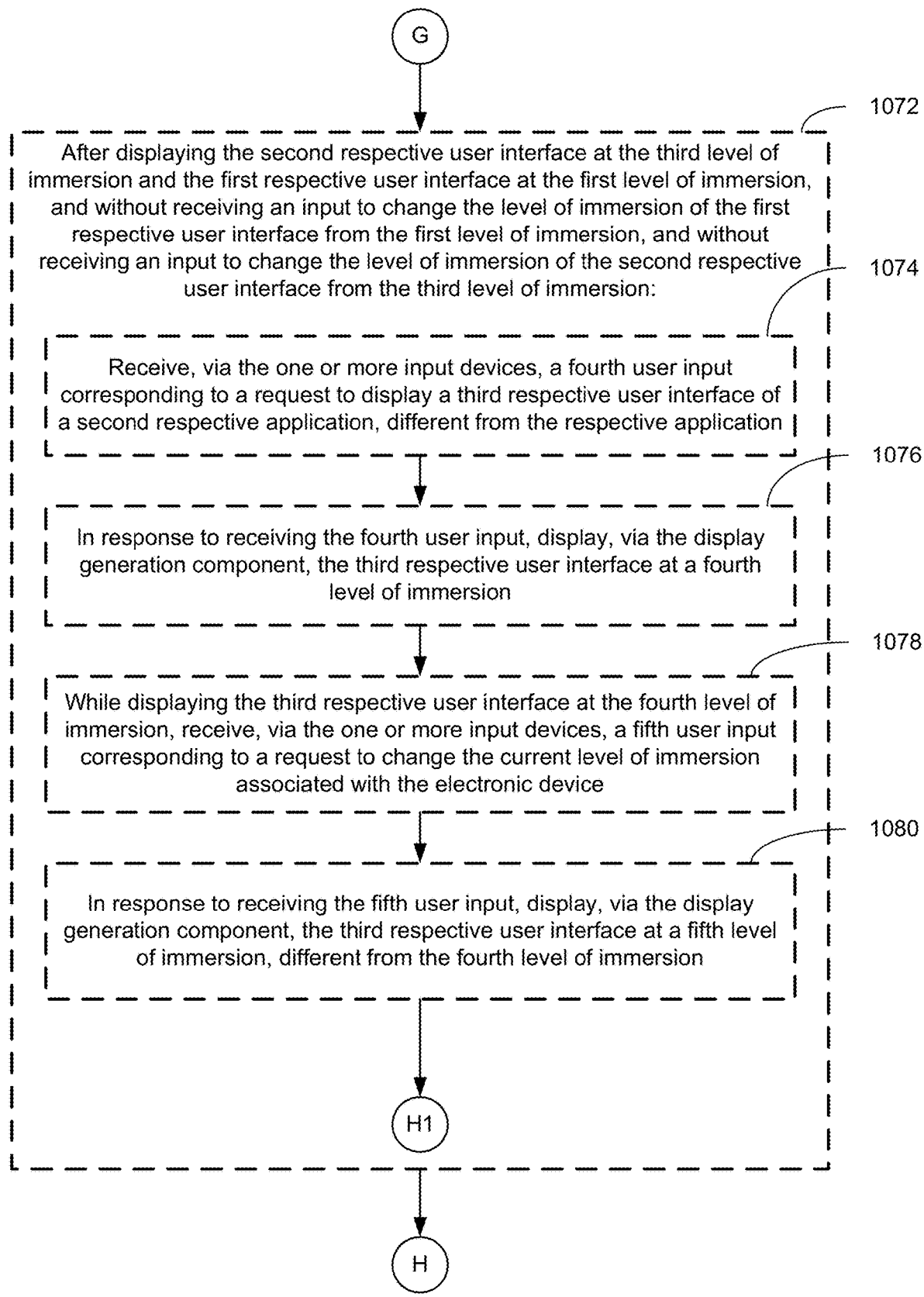
Figure 10I:
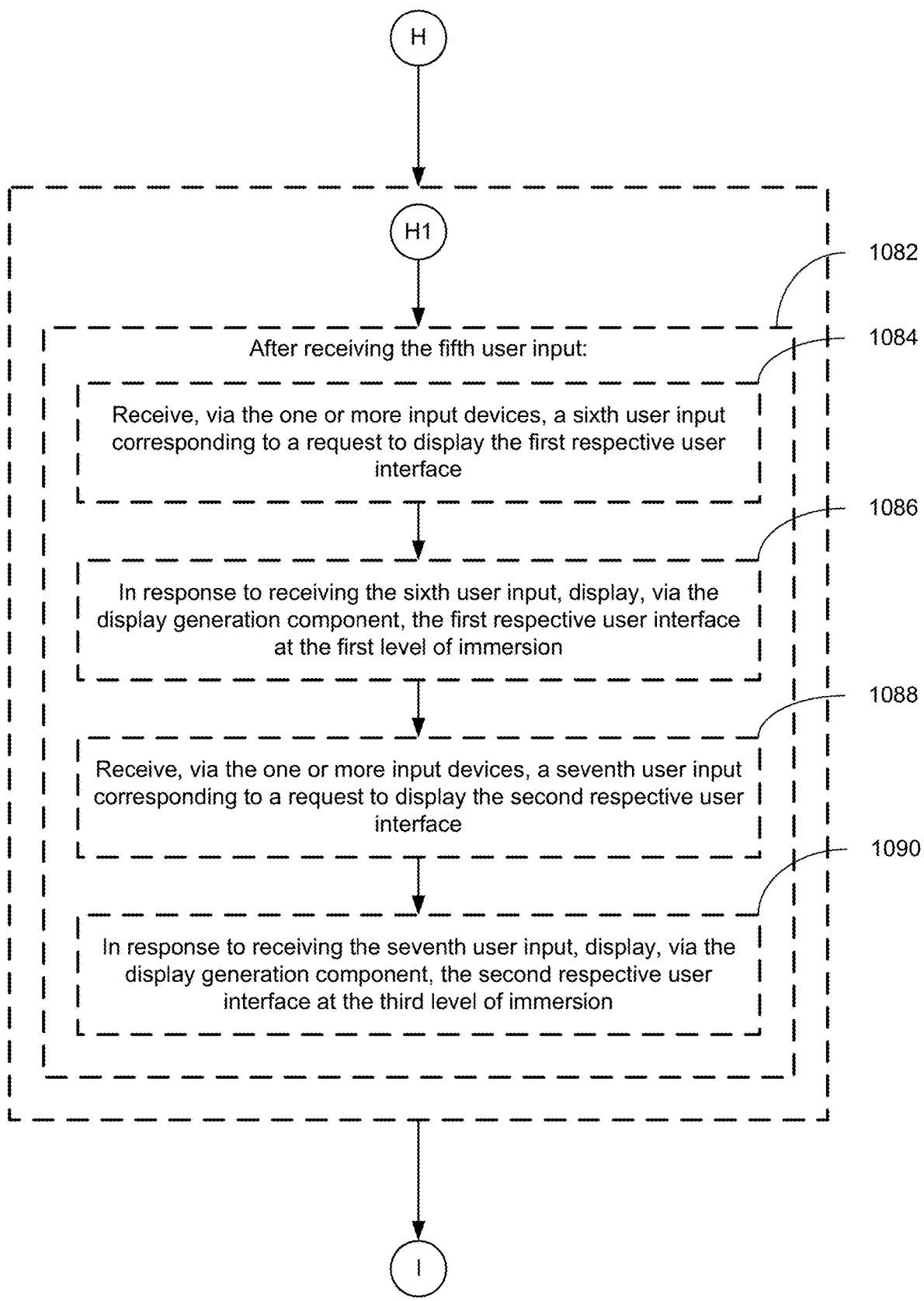
Figure 10J:
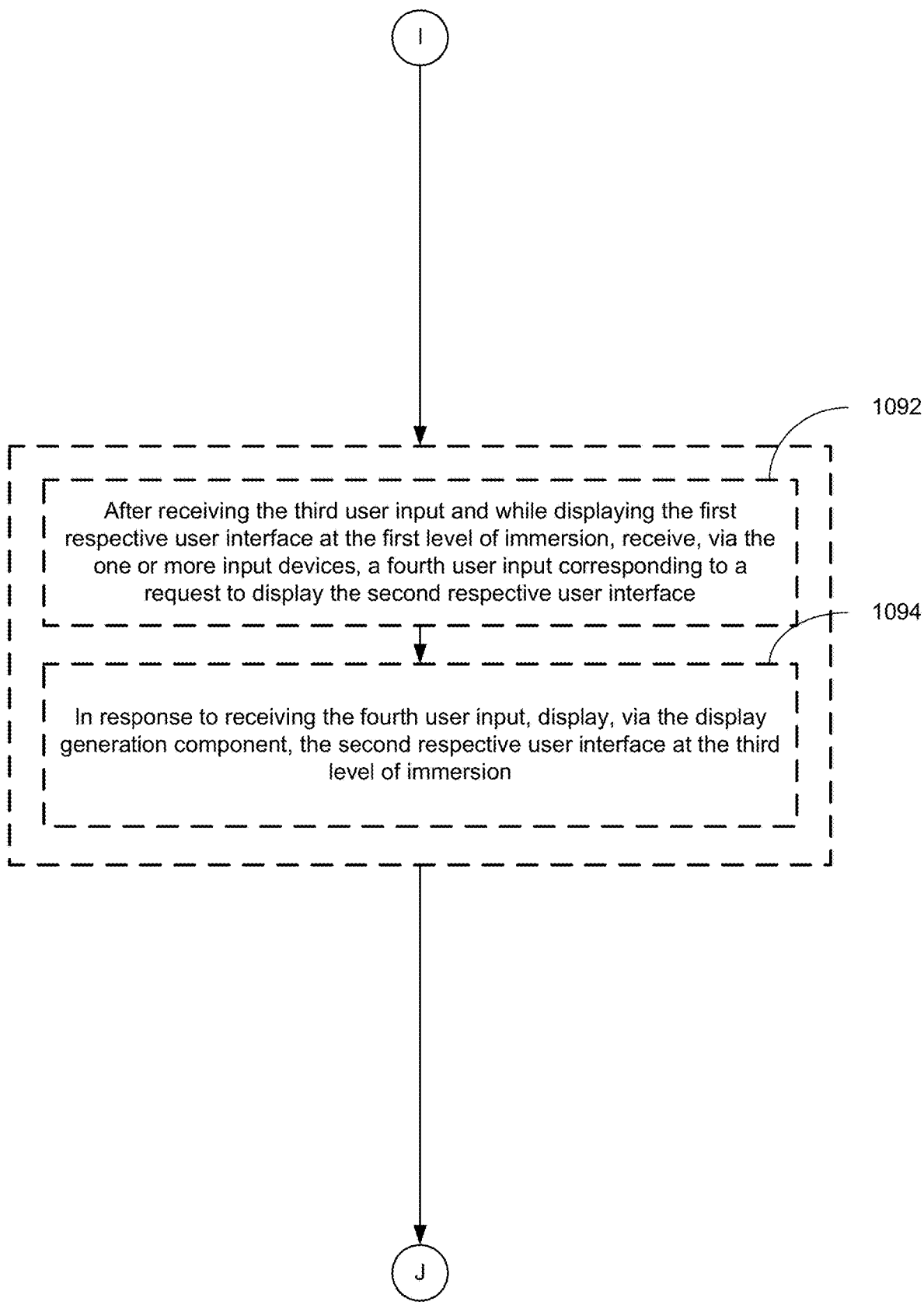
Figure 10K:
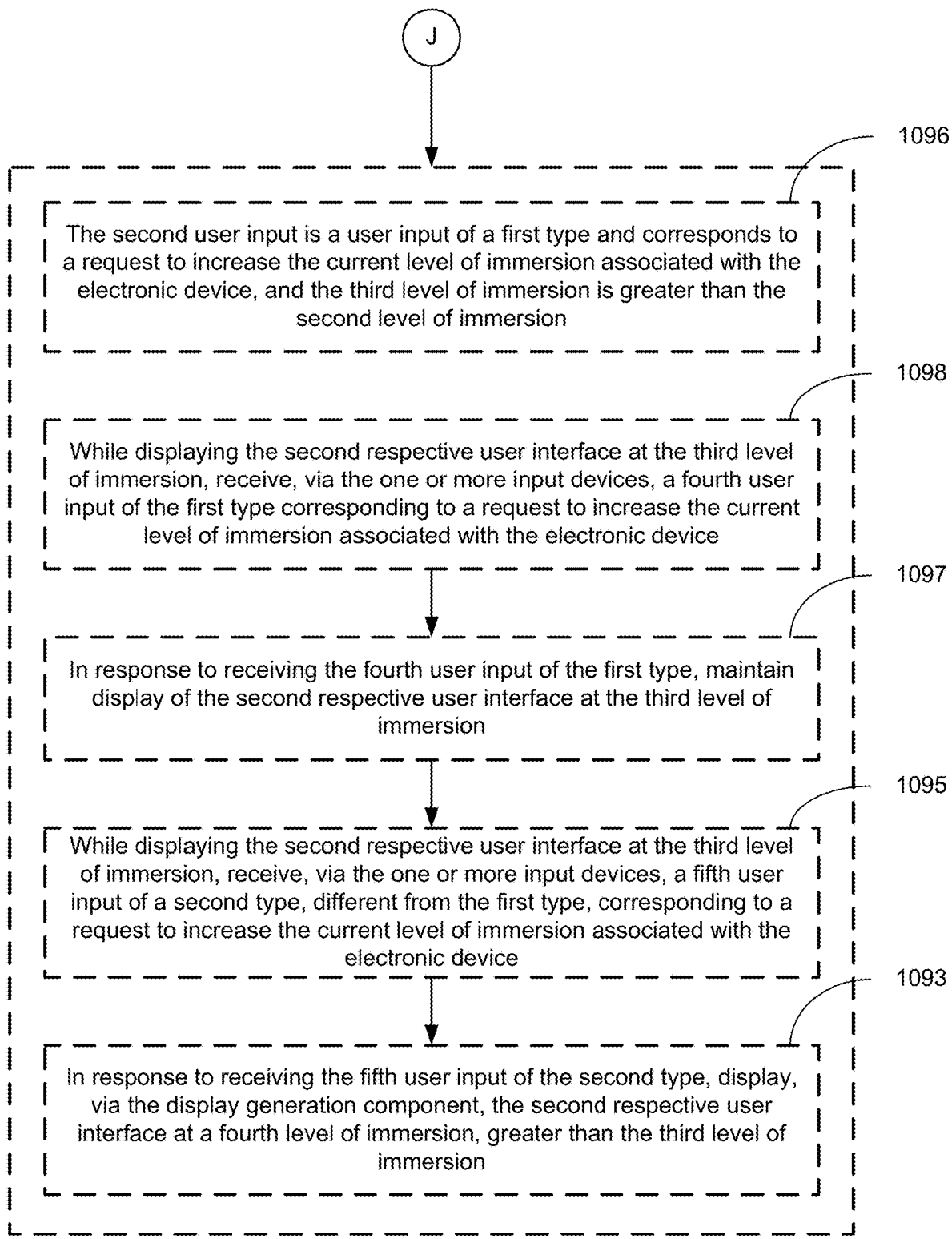

FIGS. 9A-9C illustrate examples of setting levels of immersion for operating system user interfaces as compared with application user interfaces.

FIG. 9A illustrates an electronic device 101 displaying, via a display generation component (e.g., display generation component 120 of FIG. 1), a three-dimensional environment 901 in a user interface. As described above with reference to FIGS. 1-6, the electronic device 101 optionally includes a display generation component (e.g., a touch screen) and a plurality of image sensors (e.g., image sensors 314 of FIG. 3). The image sensors optionally include one or more of a visible light camera, an infrared camera, a depth sensor, or any other sensor the electronic device 101 would be able to use to capture one or more images of a user or a part of the user while the user interacts with the electronic device 101. In some embodiments, the user interfaces shown below could also be implemented on a head-mounted display that includes a display generation component that displays the user interface to the user and sensors to detect the physical environment and/or movements of the user's hands (e.g., external sensors facing outwards from the user), and/or gaze of the user (e.g., internal sensors facing inwards towards the face of the user).

As shown in FIG. 9A, device 101 captures one or more images of the physical environment 900 around device 101 (e.g., operating environment 100), including one or more objects in the physical environment 900 around device 101. In some embodiments, device 101 displays representations of the physical environment in three-dimensional environment 901. For example, three-dimensional environment 901 includes a representation 902b of a tree (e.g., corresponding to tree 902a in physical environment 900) and a representation 904b of a person (e.g., corresponding to person 904a in physical environment 900). In some embodiments, device 101 also displays one or more virtual objects (e.g., objects that are not in the physical environment 900) in the three-dimensional environment 901. For example, in FIG. 9A, device 101 is displaying virtual object 910 (e.g., an ornament) on representation 902b of a tree, virtual object 906 (e.g., a hat) on representation 904b of a person, and representation 908 of the sun. In some embodiments, representation 908 of the sun is displayed and treated as a light source in the three-dimensional environment 901, and the lighting effects resulting from representation 908 of the sun are applied, by device 101, to representations of physical objects and/or virtual objects displayed in three-dimensional environment 901.

In FIG. 9A, device 101 is also displaying a user interface 912 of the operating system of the device 101. User interface 912 is optionally an application browsing user interface of the operating system of the device 101 from which one or more applications that are accessible on device 101 can be displayed/launched. In some embodiments, user interface 912 is any other user interface of the operating system of the device 101 (e.g., as compared with being a user interface of an application on device 101). In FIG. 9A, user interface 912 includes icons corresponding to different applications that are accessible on device 101 (e.g., an icon for App A, an icon for App B, an icon for App C, and an icon for App D), which are selectable to display the respective selected application via the display generation component 120 of device 101. In some embodiments, user interface 912 is displayed at a location within three-dimensional environment 901 such that it overlays one or more representations of physical objects and/or virtual objects in three-dimensional environment 901 (e.g., overlaying and in front of part of representation 904b of the person, corresponding to person 904a in physical environment 900). In some embodiments, user interface 912 is located within three-dimensional environment 901 such that one or more virtual objects are in front of and overlay part of user interface 912 and/or one or more representations of physical objects are in front of and overlay part of user interface 912.

In some embodiments, device 101 displays three-dimensional environment 901 and/or user interfaces displayed via display generation component 120 at a particular level of immersion. In FIG. 9A, device 101 is displaying three-dimensional environment 901 at a particular level of immersion 918 (e.g., indicated on immersion scale 916, the left-most side of which corresponds to no immersion, and the right-mode side of which corresponds to maximum immersion) at which representations 902b and 904b of physical objects are visible via display generation component 120. In some embodiments, a level of immersion includes an associated degree to which the content displayed by the electronic device obscures background content (e.g., content other than the user interface 912) around/behind the user interface 912, optionally including the number of items of background content displayed and the visual characteristics (e.g., colors, contrast, opacity) with which the background content is displayed. In some embodiments, the background content is included in a background over which the user interface 912 is displayed. In some embodiments, the background content includes additional user interfaces (e.g., user interfaces generated by the device 101 corresponding to applications, system user interfaces, etc.), virtual objects (e.g., files, representations of other users, etc. generated by the device 101) not associated with or included in the user interface 912, and/or real objects (e.g., pass-through objects representing real objects in the physical environment of the electronic device 101 that are displayed by the device such that they are visible via the display generation component). In some embodiments, at a first (e.g., low) level of immersion, the background, virtual and/or real objects are displayed in an unobscured manner. For example, a respective user interface with a low level of immersion is optionally displayed concurrently with the background content, which is optionally displayed with full brightness, color, and/or translucency. In some embodiments, at a second (e.g., higher) level of immersion, the background, virtual and/or real objects are displayed in an obscured manner (e.g., dimmed, blurred, removed from display, etc.). For example, a respective user interface with a high level of immersion is displayed without concurrently displaying the background content (e.g., in a full screen or fully immersive mode). As another example, a user interface displayed with a medium level of immersion is displayed concurrently with darkened, blurred, or otherwise de-emphasized background content. In some embodiments, the visual characteristics of the background objects vary among the background objects. For example, at a particular immersion level, one or more first background objects are visually de-emphasized (e.g., dimmed, blurred, displayed with increased transparency) more than one or more second background objects, and one or more third background objects cease to be displayed. Additional details about levels of immersion are described herein, including with reference to methods 1200, 1400 and 1600.

In FIG. 9A, an input is received on input element 920 of device 101. Input element 920 is optionally a mechanical input element that can be manipulated to change the level of immersion of the user interface(s) currently-displayed by device 101, such as a slider element or a rotational input element, where the amount and direction (e.g., increase or decrease) of the change in immersion is based on the magnitude and direction of the manipulation of the input element 920 (e.g., the direction and/or magnitude of the movement of input element 920, or the direction and/or magnitude of the rotation of a rotatable input element). In some embodiments, device 101 and/or input element 920 generate tactile feedback as the level of immersion is changes (e.g., minor tactile outputs for each increases or decreases stage of immersion, and different major tactile outputs upon reaching minimum or maximum immersion).

In FIG. 9A, the input received on input element 920 is an input to slide the input element 920 upward to increase the level of immersion of the currently displayed user interface(s) by an amount based on the amount of movement of element 920 upward. In response to the input in FIG. 9A, device 101 increases the level of immersion at which operating system user interface 912 is displayed to an intermediate level of immersion, as shown in FIG. 9B and immersion scale 916. In particular, in some embodiments, increasing the level of immersion at which user interface 912 is displayed causes device 101 to display user interface at a larger size via display generation component 120, as shown in FIG. 9B. Further, as described previously, additionally or alternatively, the content displayed surrounding and/or behind user interface 912 (e.g., representations of physical objects 902b and 904b, and virtual objects 910 and 906) is darkened and/or blurred in FIG. 9B, while user interface 912 is not darkened or blurred. In some embodiments, increasing the level of immersion at which the currently-displayed user interface(s) is displayed additionally or alternatively increases atmospheric visual and/or audio effects associated with virtual or physical objects displayed via display generation component 120. For example, in FIG. 9B, the rays of light being emitted from representation 908 of the sun have been lengthened (e.g., corresponding to more virtual light being emitted from representation 908), and ornament 910 on representation 902b of the tree has begun to shine as a result. Additional or alternative changes in atmospheric lighting, visual, audio, etc. effects in conjunction with changes in levels of immersion are similarly contemplated.

As previously mentioned, in some embodiments, the levels of immersion at which different user interfaces are displayed are optionally set independently from one another. For example, changes in the level of immersion at which operating system user interfaces are displayed optionally do not change the level of immersion at which application user interfaces are displayed, and in some embodiments, changes in the level of immersion at which the user interface of a first application is displayed do not change the level of immersion at which the user interface of a second application is displayed. Thus, in some embodiments, in response to an input to switch from displaying one user interface to displaying another user interface, device 101 optionally displays the switched-to user interface at the level of immersion at which that user interface was last displayed, independent of any changes of immersion that were applied to the currently-displayed user interface.

For example, in FIG. 9B, device 101 detects an input selecting the icon corresponding to App C in user interface 912. In response, device 101 displays user interface 934 of App C, as shown in FIG. 9C. App C is optionally an application that is accessible via (e.g., installed on) device 101, and is optionally any type of application (e.g., a content viewing application, a word processing application, etc.). App C is optionally different from the operating system of device 101, and thus user interface 934 is optionally not a user interface of the operating system of device 101, but rather a user interface of App C.

As shown in FIG. 9C, in response to the input to display App C, device 101 is displaying user interface 934 at a level of immersion 932 that is higher than the level of immersion 918 at which device 101 was displaying user interface 912 in FIG. 9B (e.g., as indicated by immersion scale 930 for App C). This is optionally because, as previously described, the levels of immersion set for applications are optionally independent of the level of immersion set for the operating system of device 101. Therefore, it is optionally the case that the higher level of immersion at which device 101 is displaying user interface 934 of App C in FIG. 9C is the level of immersion at which user interface 934 was last displayed by device 101. If user interface 934 had last been displayed at a lower level of immersion than the level of immersion 918 for user interface 912 shown in FIG. 9B, device 101 would have optionally displayed user interface 934 in FIG. 9C at that lower level of immersion rather than at the higher level of immersion shown in FIG. 9C. Also shown in FIG. 9C is the increased size of user interface 934 on display generation component 120 (as compared with the size of user interface 912 in FIG. 9B) and the increased darkening and/or blurring of the content outside of/surrounding user interface 934 (as compared with the darkening and/or blurring of the content outside of/surrounding user interface 912 in FIG. 9B)—these changes in display characteristics are optionally some of the changes that occur in response to increased immersion, as previously described. Additional or alternative changes in display characteristics, such as those previously described, are also contemplated.

As previously described, changes in immersion at which a user interface in one application is displayed optionally do not change the level of immersion at which user interfaces of other applications and/or user interfaces of the operating system are displayed. For example, if device 101 detects an input to change the level of immersion of user interface 934 of App C in FIG. 9C (e.g., via input element 920), device 101 would change the level of immersion at which user interface 934 is displayed in accordance with that input, as previously described. After changing the level of immersion at which user interface 934 is displayed, in response to an input to redisplay user interface 912 (e.g., an input to cease display of user interface 934), device would optionally return to the display of FIG. 9B in which user interface 912 is displayed at level of immersion 918, which is the level of immersion at which user interface 912 was last displayed, and is independent from the changed level of immersion at which user interface 934 was displayed when the input to redisplay user interface 912 was detected.

In some embodiments, applications (e.g., App C) include controls in their user interfaces for changing the level of immersion at which those applications are displayed. For example, in some embodiments, user interface 934 of App C includes controls for increasing or decreasing the level of immersion at which user interface 934 is displayed, and the immersion at which App C is displayed is changed by device 101 in response to interaction with those controls additionally or alternatively to interaction with input element 920. Further, in some embodiments, immersion above a threshold (e.g. maximum immersion) for an operating system user interface is reachable in response to inputs detected at input element 920. However, in some embodiments, immersion above that threshold for an application user interface is not reachable in response to inputs detected at input element 920—in some embodiments, the immersion at which an application user interface is displayed can only reach the threshold immersion using the input element, and once at that threshold, a different type of input is required to increase the immersion at which the application user interface is displayed beyond that threshold. For example, in FIG. 9C, the level of immersion 932 at which user interface 934 is displayed is optionally the highest immersion that can be reached for user interface 934 via inputs at input element 920. To increase immersion past the level of immersion 932, device 101 optionally requires an input selecting a user interface element shown in user interface 934. For example, in FIG. 9C, user interface 934 includes user interface element 950 that is selectable to increase the immersion at which user interface 934 is displayed past level of immersion 932 (e.g., a user input selecting user interface element 950 optionally results in device 101 displaying user interface 934 at maximum immersion, or full screen, where no content surrounding user interface 934 is displayed by device 101). In some embodiments, user interface 934 only includes element 950 once the level of immersion at which user interface 934 is displayed has reached the threshold level of immersion previously described. In some embodiments, user interface 934 includes element 950 irrespective of whether the level of immersion at which user interface 934 is displayed has reached the threshold level of immersion previously described FIGS. 10A-10K is a flowchart illustrating a method 1000 of defining levels of immersion for different user interfaces independently of one another in accordance with some embodiments. In some embodiments, the method 1000 is performed at a computer system (e.g., computer system 101 in FIG. 1 such as a tablet, smartphone, wearable computer, or head mounted device) including a display generation component (e.g., display generation component 120 in FIGS. 1, 3, and 4) (e.g., a heads-up display, a display, a touchscreen, a projector, etc.) and one or more cameras (e.g., a camera (e.g., color sensors, infrared sensors, and other depth-sensing cameras) that points downward at a user's hand or a camera that points forward from the user's head). In some embodiments, the method 1000 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 1000 are, optionally, combined and/or the order of some operations is, optionally, changed.

In the method 1000, in some embodiments, an electronic device (e.g., computer system 101 in FIG. 1) in communication with a display generation component and one or more input devices (e.g., a mobile device (e.g., a tablet, a smartphone, a media player, or a wearable device), or a computer) displays (1002) a first respective user interface of an operating system of the electronic device, such as user interface 912 in FIG. 9B. In some embodiments, the electronic device is a mobile device (e.g., a tablet, a smartphone, a media player, or a wearable device), or a computer. In some embodiments, the display generation component is a display integrated with the electronic device (optionally a touch screen display), external display such as a monitor, projector, television, or a hardware component (optionally integrated or external) for projecting a user interface or causing a user interface to be visible to one or more users, etc. In some embodiments, the electronic device is in communication with one or more input devices that include an electronic device or component capable of receiving a user input (e.g., capturing a user input, detecting a user input, etc.) and transmitting information associated with the user input to the electronic device. Examples of input devices include a touch screen, mouse (e.g., external), trackpad (optionally integrated or external), touchpad (optionally integrated or external), remote control device (e.g., external), another mobile device (e.g., separate from the electronic device), a handheld device (e.g., external), a controller (e.g., external), a camera, a depth sensor, a motion sensor (e.g., a hand tracking device, a hand motion sensor), a physical mechanical input element included in the electronic device (e.g., a button, a rotating mechanical element, a switch, etc.) and/or an eye tracking device, etc.

In some embodiments, the first respective user interface is a user interface generated by and/or displayed by the operating system of the electronic device, rather than by an application (e.g., installed) on the electronic device. For example, the first respective user interface is optionally an application browsing and/or launching user interface that is a system user interface, and optionally includes a plurality of selectable representations of different applications that when selected cause the electronic device to display a user interface of the selected application (e.g., launch the selected application). In some embodiments, the first respective user interface is displayed within a computer-generated reality (CGR) environment such as a virtual reality (VR) environment, a mixed reality (MR) environment, or an augmented reality (AR) environment, etc. that is generated, displayed, or otherwise caused to be viewable by the electronic device.

In some embodiments, the first respective user interface is displayed at a first level of immersion (1004), such as level of immersion 918 in FIG. 9B (e.g., in some embodiments, a level of immersion includes an associated degree to which the content displayed by the electronic device obscures background content (e.g., content other than the first respective user interface) around/behind the first respective user interface, optionally including the number of items of background content displayed and the visual characteristics (e.g., colors, contrast, opacity) with which the background content is displayed, and/or the angular range of the content displayed via the display generation component (e.g., 60 degrees of content displayed at low immersion, 120 degrees of content displayed at medium immersion, 180 degrees of content displayed at high immersion), and/or the proportion of the field of view displayed via the display generation consumed by the content displayed by the electronic device (e.g., 33% of the field of view consumed by content displayed by the electronic device at low immersion, 66% of the field of view consumed by content displayed by the electronic device at medium immersion, 100% of the field of view consumed by content displayed by the electronic device at high immersion)). In some embodiments, the background content is included in a background over which the first respective user interface is displayed. In some embodiments, the background content includes additional user interfaces (e.g., user interfaces generated by the device corresponding to applications other than the application of the first respective user interface, system user interfaces), virtual objects (e.g., files, representations of other users, etc. generated by the device) not associated with or included in the first respective user interface, and/or real objects (e.g., pass-through objects representing real objects in the physical environment of the electronic device that are displayed by the device such that they are visible via the display generation component and/or a visible via a transparent or translucent display generation component because the electronic device does not obscure/prevent visibility of them through the display generation component). In some embodiments, at a first (e.g., low) level of immersion, the background, virtual and/or real objects are displayed in an unobscured manner. For example, a respective user interface with a low level of immersion is optionally displayed concurrently with the background content, which is optionally displayed with full brightness, color, and/or translucency. In some embodiments, in a respective user interface displayed with no (or very low) immersion, no (or very few) virtual user interface element are displayed, and only (or mostly only) the background content is optionally displayed via the display generation component. In some embodiments, at a second (e.g., higher) level of immersion, the background, virtual and/or real objects are displayed in an obscured manner (e.g., dimmed, blurred, removed from display, etc.). For example, a respective user interface with a high level of immersion is displayed without concurrently displaying the background content (e.g., in a full screen or fully immersive mode). As another example, a user interface displayed with a medium level of immersion is displayed concurrently with darkened, blurred, or otherwise de-emphasized background content. In some embodiments, the visual characteristics of the background objects vary among the background objects. For example, at a particular immersion level, one or more first background objects are visually de-emphasized (e.g., dimmed, blurred, displayed with increased transparency) more than one or more second background objects, and one or more third background objects cease to be displayed. Additional details about levels of immersion are described herein, including with reference to methods 1200, 1400 and 1600.

In some embodiments, while displaying the first respective user interface at the first level of immersion, the electronic device receives (1006), via the one or more input devices, a first user input corresponding to a request to display a second respective user interface of a respective application, such as the input on the icon for App C in FIG. 9B (e.g., detecting selection of the application icon for the respective application in the application browsing user interface). In some embodiments, the first user input is a voice input for displaying the respective application, without selecting any icon for the respective application, whether or not displayed in the first respective user interface. In some embodiments, in response to receiving the first user input, the electronic device displays (1008), via the display generation component, the second respective user interface of the respective application, such as user interface 934 shown in FIG. 9C (e.g., in some embodiments, the second respective user interface is displayed overlaid on the first respective user interface, both of which optionally continue to be displayed over the background and/or within the three-dimensional environment. In some embodiments, displaying the second respective user interface includes ceasing display of the first respective user interface such that the second respective user interface (but not the first respective user interface) continues to be displayed over the background and/or within the three-dimensional environment), wherein the second respective user interface of the respective application is displayed at a second level of immersion (1010), such as level of immersion 932 shown in FIG. 9C (e.g., a level of immersion that is independent of the level of immersion of the operating system user interface). Therefore, in some embodiments, the level of immersion of operating system user interfaces does not affect the level of immersion of application user interfaces. In some embodiments, the second level of immersion at which the second respective user interface is displayed is the level of immersion with which the second respective user interface was last displayed (prior to the current display of the second respective user interface). In some embodiments, the level of immersion of operating system user interfaces do affect the level of immersion of application user interfaces (e.g., if the system user interface is set at a first level of immersion, subsequently displaying an application user interface includes displaying the application user interface at that same first level of immersion, even if the application user interface was last displayed at a different level of immersion).

In some embodiments, while displaying the second respective user interface at the second level of immersion, the electronic device receives (1012), via the one or more input devices, a second user input corresponding to a request to change a current level of immersion associated with the electronic device, such as an input on input element 920 in FIG. 9C (e.g., a voice input, a hand gesture, a selection of a displayed user interface element and/or detection of an input (e.g., rotational input) at a mechanical input element included in the electronic device that corresponds to a request to increase or decrease the level of immersion of the currently-displayed user interface. In some embodiments, in response to receiving the second user input, the electronic device displays (1014), via the display generation component, the second respective user interface at a third level of immersion, different from the second level of immersion (e.g., increasing or decreasing the level of immersion of the second respective user interface in accordance with the second user input).

In some embodiments, while displaying the second respective user interface at the third level of immersion, the electronic device receives (1016), via the one or more input devices, a third user input corresponding to a request to display the first respective user interface, such as an input to cease display of user interface 934 in FIG. 9C (e.g., without an explicit user input corresponding to a request to change a level of immersion of the user interface) (e.g., an input to cease displaying the second respective user interface, an input to navigate backwards in a navigational hierarchy of the electronic device, an input to redisplay the application browsing user interface, etc.). In some embodiments, in response to receiving the third user input, the electronic device displays (1018), via the display generation component, the first respective user interface, wherein the first respective user interface is displayed at the first level of immersion (1020), such as user interface 912 at level of immersion 918 in FIG. 9B (e.g., the same level of immersion that the first respective user interface had when the second respective user interface was displayed in response to the first user input). Thus, in some embodiments, the level of immersion of the first respective user interface did not change as a result of the change of the level of immersion of the second respective user interface). Therefore, in some embodiments, changes to levels of immersion of user interfaces of applications optionally do not cause corresponding changes to the levels of immersion of system user interfaces. In some embodiments, changes to the levels of immersion of system user interfaces do not cause changes to the levels of immersion of user interfaces of applications. In some embodiments, changes to levels of immersion of user interfaces of applications optionally do cause corresponding changes to the levels of immersion of system user interfaces (e.g., the levels of immersion increase/decrease together) and/or vice versa. In some embodiments, the level of immersion of an operating system user interface is changeable via a mechanical input element included in the electronic device, but the level of immersion of an application user interface is not changeable via that mechanical input element—in some embodiments, the level of immersion of an application user interface is changeable via controls displayed via the display generation component. The above-described manner of maintaining the level of immersion of system user interfaces despite changes in levels of immersion of application user interfaces provides a flexible architecture in which levels of immersion can be independently defined and/or changed for different user interfaces, which simplifies the interaction between the user and the electronic device and enhances the operability of the electronic device and makes the user-device interface more efficient (e.g., by avoiding erroneous immersion level changes in another user interface as a result of an immersion level change at the current user interface), which additionally reduces power usage and improves battery life of the electronic device by enabling the user to use the electronic device more quickly and efficiently, while reducing errors in usage.

In some embodiments, the one or more input devices include a rotatable input element, and receiving the second user input corresponding to the request to change the current level of immersion associated with the electronic device includes detecting rotation of the rotatable input element (1022), such as described with reference to input element 920. For example, the electronic device includes or is in communication with a mechanical input element that rotates in response to rotational user input provided to it, and in some embodiments is able to be depressed in response to depression user input provided to it. In some embodiments, rotational input of the mechanical input element corresponds to an input to change the current level of immersion of the user interface(s) currently displayed by the electronic device, via the display generation component. In some embodiments, the direction of the rotation (e.g., clockwise or counterclockwise) defines whether the input is a request to increase (e.g., clockwise) or decrease (e.g., counterclockwise) the level of immersion of the displayed user interface(s). In some embodiments, the magnitude of the rotation defines the amount by which the level of immersion of the displayed user interface(s) is changed. The above-described manner of changing the level of immersion of the displayed user interface(s) provides a quick and efficient manner of changing the level of immersion of the displayed user interface(s), which simplifies the interaction between the user and the electronic device and enhances the operability of the electronic device and makes the user-device interface more efficient (e.g., by avoiding the need to display user interface elements for changing the level of immersion), which additionally reduces power usage and improves battery life of the electronic device by enabling the user to use the electronic device more quickly and efficiently, while reducing errors in usage.

In some embodiments, while detecting the rotation of the rotatable element (1024), in accordance with a determination that a current level of immersion of a currently displayed user interface is a minimum level of immersion, the electronic device generates (1026), via a tactile output generator (e.g., coupled to the rotatable input element, and/or coupled to the housing of the device to which the rotatable input element is optionally coupled, and/or etc.), a first tactile output with a respective characteristic having a first value, such as described with reference to FIGS. 9A-9C (e.g., if the displayed user interface(s) have reached a minimum level of immersion (e.g., no immersion) in response to rotational input detected at the rotational input element, the electronic device optionally generates a first type of tactile output (e.g., a major tactile output) at the rotational input element to indicate that a minimum of the range of available levels of immersion for the displayed user interface(s) has been reached). The first type of tactile output optionally has a first magnitude, a first texture, a first frequency and/or etc. In some embodiments, the electronic device generates the tactile output at the housing of the electronic device (e.g., rather than directly at/to the rotatable input element).

In some embodiments, in accordance with a determination that the current level of immersion of the currently displayed user interface is a maximum level of immersion, the electronic device generates (1028), via the tactile output generator, a second tactile output with the respective characteristic having the first value, such as described with reference to FIGS. 9A-9C (e.g., if the displayed user interface(s) have reached a maximum level of immersion (e.g., complete immersion) in response to rotational input detected at the rotational input element, the electronic device optionally generates the first type of tactile output (e.g., a major tactile output) at the rotational input element to indicate that a maximum of the range of available levels of immersion for the displayed user interface(s) has been reached). The first type of tactile output optionally has the first magnitude, the first texture, the first frequency and/or etc. In some embodiments, the electronic device generates the tactile output at the housing of the electronic device (e.g., rather than directly at/to the rotatable input element).

In some embodiments, in accordance with a determination that the current level of immersion of the currently displayed user interface is an intermediate level of immersion, the electronic device generates (1030), via the tactile output generator, a third tactile output with the respective characteristic having a second value, different from the first value, such as described with reference to FIGS. 9A-9C. For example, if the displayed user interface(s) have reached predefined intermediate levels of immersion (e.g., has moved from one stage of immersion to the next stage of immersion) in response to rotational input detected at the rotational input element, the electronic device optionally generates a second type of tactile output (e.g., a minor tactile output) at the rotational input element to indicate that a predefined level of the range of available levels of immersion for the displayed user interface(s) has been reached. The second type of tactile output optionally has a second magnitude, a second texture, a second frequency and/or etc. In some embodiments, the electronic device generates the tactile output at the housing of the electronic device (e.g., rather than directly at/to the rotatable input element). In some embodiments, different applications and/or the operating system have different minimum, maximum, and/or predefined intermediate levels of immersion for their respective user interfaces; therefore, in some embodiments, the above-described tactile outputs are optionally generated at different levels of immersion depending on which user interface is currently being adjusted. In some embodiments, the electronic device is able to display user interface(s) at (e.g., one of) multiple stages of immersion (e.g., 2 to 1000 stages of immersion). In some embodiments, the stages of immersion progress monotonically towards more immersion (e.g., from no immersion to maximum immersion). As described herein, as the electronic device moves from one stage of immersion to the next stage of immersion, the electronic device optionally changes the display characteristics of one or more portions of the displayed user interface(s). For example, as immersion increases, the electronic device performs one or more of reducing an amount of the physical environment that is displayed in the user interface, blurring and/or decreasing a brightness or saturation of the physical environment that is displayed in the user interface, increasing an amount of the field of view of the display generation component that is occupied by one or more virtual objects, un-blurring and/or increasing a brightness or saturation of one or more virtual objects, or any of the other effects described herein with reference to methods 1000, 1200, 1400 or 1600. In some embodiments, the electronic device optionally makes opposite changes as it progresses from one stage of immersion to the previous stage of immersion in decreasing order. In some embodiments, different stages of immersion result in different changes in characteristics to what the electronic device displays. For example, in one set of stages of immersion (e.g., lower level stages of immersion), the electronic device first moves through stages of increasing blurring or obscuring portions of the physical environment that are displayed via the display generation component as it moves through the first set of stages of immersion; in a subsequent second set of stages of immersion, the electronic device optionally moves through stages of darkening (e.g., the blurred) portions of the physical environment displayed via the display generation component as it moves through the second set of stages of immersion; and in a subsequent third set of stages of immersion, the electronic device optionally moves through stages of replacing (e.g., the blurred and/or darkened) portions of the physical environment displayed via the display generation component with virtual objects as it moves through the third set of stages of immersion. In some embodiments, the electronic device optionally makes opposite changes as it progresses through the sets of stages of immersion in decreasing order. The above-described manner of generating tactile outputs provides a quick and efficient manner of indicating the current level of immersion of the displayed user interface(s), which simplifies the interaction between the user and the electronic device and enhances the operability of the electronic device and makes the user-device interface more efficient (e.g., by avoiding the need to display user interface elements for indicating the level of immersion), which additionally reduces power usage and improves battery life of the electronic device by enabling the user to use the electronic device more quickly and efficiently, while reducing errors in usage.

In some embodiments, the second user input includes a first portion and a second portion (1032) (e.g., of a total clockwise rotation of 360 degrees, a first clockwise rotation of 180 degrees followed by a second clockwise rotation of 180 degrees). In some embodiments, while receiving the second user input (1034), in response to receiving the first portion of the second user input, the electronic device displays (1036), via the display generation component, the second respective user interface at a fourth level of immersion that is in between the second level of immersion and the third level of immersion, such as described with reference to FIGS. 9A-9C (e.g., increasing the level of immersion as the rotatable input element rotates and/or proportionally to the amount of rotation of the rotatable input element in the first portion of the second user input). In some embodiments, in response to receiving the second portion of the second user input, the electronic device displays (1038), via the display generation component, the second respective user interface at the third level of immersion, such as described with reference to FIGS. 9A-9C (e.g., increasing the level of immersion further as the rotatable input element rotates and/or proportionally to the amount of rotation of the rotatable input element in the first portion of the second user input). Therefore, in some embodiments, the electronic device gradually changes the level of immersion of the display user interface(s) as the rotatable input element is rotated and/or in proportion to and/or in accordance with the rotation of the rotatable input element (e.g., based on the magnitude and/or direction of the user input). The above-described manner of changing the level of immersion provides real-time feedback to the user while changing the level of immersion, which simplifies the interaction between the user and the electronic device and enhances the operability of the electronic device and makes the user-device interface more efficient (e.g., by avoiding transitioning to an incorrect level of immersion, which avoids the need for further user input to reverse some or all of the change in the level of immersion), which additionally reduces power usage and improves battery life of the electronic device by enabling the user to use the electronic device more quickly and efficiently, while reducing errors in usage.

In some embodiments, receiving the second user input corresponding to the request to change the current level of immersion associated with the electronic device includes (1040), in accordance with a determination that the second respective user interface is a user interface of a first application, detecting interaction with a first respective control displayed with the second respective user interface (1042), and in accordance with a determination that the second respective user interface is a user interface of a second application, different from the first application, detecting interaction with a second respective control, different from the first respective control, displayed with the second user interface (1044), such as described with reference to FIGS. 9A-9C. For example, in some embodiments, different applications display and/or have different controls for changing the level of immersion of the user interfaces of the applications. For example, a user interface of a first application optionally has controls for changing the level of immersion of the user interface by steps of 5 stages of immersion (e.g., up/down controls for stepping up/down the stages of immersion by increments of 5 from 0 to 100). A user interface of a second application optionally has controls for changing the level of immersion of the user interface by steps of 1 stage of immersion (e.g., a displayed dial that is rotatable in response to user input to step up/down the stages of immersion by 1 stage from 0 to 100 in accordance with the rotation of the displayed dial). In some embodiments, some applications and/or user interfaces display controls for changing the level of immersion (e.g., so the level of immersion can be changed via interaction with the displayed controls and optionally cannot be changed via rotation of the rotatable input element or optionally can also be changed via rotation of the rotatable input element), and some applications and/or user interfaces do not display controls for changing the level of immersion (e.g., the level of immersion can only be changed via rotation of the rotatable input element). For example, in some embodiments, the level of immersion of an operating system user interface is optionally changeable via rotation of the rotatable input element (e.g., and not via displayed user interface controls) whereas the level of immersion of an application running on the electronic device is optionally changeable via rotation of the rotatable input element and/or via displayed user interface controls. The above-described manner of having application-based immersion controls provides means for changing immersion that are well-matched to the displayed application and/or user interface, which simplifies the interaction between the user and the electronic device and enhances the operability of the electronic device and makes the user-device interface more efficient (e.g., by avoiding inputs for changing the level of immersion for a user interface that is not well-matched to the user interface, which avoids the need for further user input to correct such input), which additionally reduces power usage and improves battery life of the electronic device by enabling the user to use the electronic device more quickly and efficiently, while reducing errors in usage.

In some embodiments, at the second level of immersion, a first amount of a physical environment of the electronic device is replaced, via the display generation component, with a respective user interface displayed by the electronic device (1046), such as shown in FIGS. 9A-9B, and at the third level of immersion, a second amount, different from the first amount, of the physical environment of the electronic device is replaced, via the display generation component, with the respective user interface displayed by the electronic device (1048), such as shown in FIGS. 9B-9C. For example, in some embodiments, the electronic device is displaying content/user interface(s) in addition to displaying representation(s) of the physical environment of the electronic device (e.g., objects in the physical environment, surfaces in the physical environment, etc.), such as described with reference to methods 1200, 1400 and 1600. In some embodiments, the representation(s) of the physical environment are passed-through via the display generation component, as previously described. In some embodiments, at lower levels of immersion, more of the representation(s) of the physical environment are passed through via the display generation component while the electronic device is displaying content/user interface(s) via the display generation component. In some embodiments, at higher levels of immersion, fewer of the representation(s) of the physical environment are passed through via the display generation component while the electronic device is displaying content/user interface(s) via the display generation component. For example, at a first level of immersion, the electronic device optionally passes through 80% of the representation(s) of the physical environment (e.g., representations of physical objects) via the display generation component, whereas at a second, higher level of immersion, the electronic device optionally passes through 50% of the representation(s) of the physical environment (e.g., representations of physical objects) via the display generation component. In some embodiments, lower and higher levels of immersion optionally cause more or fewer, respectively, of the representation(s) of the physical environment to be passed through via the display generation component. In some embodiments, at higher levels of immersion, more of the representation(s) of the physical environment are replaced by content/user interface(s) displayed by the electronic device (e.g., because the content/user interface(s) occupy a larger portion of the display area of the display generation component), and at lower levels of immersion, fewer of the representation(s) of the physical environment are replaced by content/user interface(s) displayed by the electronic device (e.g., because the content/user interface(s) occupy a smaller portion of the display area of the display generation component). The above-described manner of varying the amount of pass-through content (e.g., that is replaced by the electronic device) reduces interference of the physical environment with the user interface(s) displayed by the electronic device as the level of immersion is increased, which simplifies the interaction between the user and the electronic device and enhances the operability of the electronic device and makes the user-device interface more efficient (e.g., by avoiding distraction caused by the passing through of the physical environment at higher levels of immersion), which additionally reduces power usage and improves battery life of the electronic device by enabling the user to use the electronic device more quickly and efficiently, while reducing errors in usage.

In some embodiments, at the second level of immersion, a first amount of a physical environment of the electronic device is deemphasized, via the display generation component, by the electronic device (1050), such as shown in FIGS. 9A-9B, and at the third level of immersion, a second amount, different from the first amount, of the physical environment of the electronic device is deemphasized, via the display generation component, by the electronic device (1052), such as shown in FIGS. 9B-9C. For example, in some embodiments, the electronic device is displaying content/user interface(s) in addition to displaying representation(s) of the physical environment of the electronic device (e.g., objects in the physical environment, surfaces in the physical environment, etc.), such as described with reference to methods 1200, 1400 and 1600. In some embodiments, the representation(s) of the physical environment are passed-through via the display generation component, as previously described. In some embodiments, at lower levels of immersion, the representation(s) of the physical environment are displayed at a first level of emphasis (e.g., in color, bright, not blurred, etc.) via the display generation component while the electronic device is displaying content/user interface(s) via the display generation component. In some embodiments, at higher levels of immersion, the representation(s) of the physical environment are displayed at a second level, lower than the first level, of emphasis (e.g., with less saturated colors or grayscale, less bright, more blurred, etc.) via the display generation component while the electronic device is displaying content/user interface(s) via the display generation component. For example, at a first level of immersion, the electronic device optionally passes through 80% of the color, brightness, etc. of representation(s) of the physical environment (e.g., representations of physical objects) via the display generation component, whereas at a second, higher level of immersion, the electronic device optionally passes through 50% of the color, brightness, etc. of representation(s) of the physical environment (e.g., representations of physical objects) via the display generation component. In some embodiments, lower and higher levels of immersion optionally cause less or more, respectively, de-emphasis of the representation(s) of the physical environment passed through via the display generation component. The above-described manner of varying the emphasis of pass-through content reduces interference of the physical environment with the user interface(s) displayed by the electronic device as the level of immersion is increased, which simplifies the interaction between the user and the electronic device and enhances the operability of the electronic device and makes the user-device interface more efficient (e.g., by avoiding distraction caused by the passing through of the physical environment at higher levels of immersion), which additionally reduces power usage and improves battery life of the electronic device by enabling the user to use the electronic device more quickly and efficiently, while reducing errors in usage.

In some embodiments, at the second level of immersion, a first amount of display area of the display generation component is occupied by a respective user interface displayed by the electronic device (1054), and at the third level of immersion, a second area, different from the first area, of the display area of the display generation component is occupied by the respective user interface displayed by the electronic device (1056), such as the area of user interface 912 shown from FIGS. 9A-9B. In some embodiments, at no immersion, the content/user interface(s) displayed by the electronic device occupy no portion of the display space of the display generation component, and optionally the entirety of the display space of the display generation component is occupied by representation(s) of the physical environment of the electronic device (e.g., objects in the physical environment, surfaces in the physical environment, etc.), such as described with reference to methods 1200, 1400 and 1600. In some embodiments, the representation(s) of the physical environment are passed-through via the display generation component, as previously described. In some embodiments, at complete immersion, the content/user interface(s) displayed by the electronic device occupy the entirety of the display space of the display generation component, and optionally none of the display space of the display generation component is occupied by representation(s) of the physical environment of the electronic device (e.g., objects in the physical environment, surfaces in the physical environment, etc.), such as described with reference to methods 1200, 1400 and 1600.

In some embodiments, as the level of immersion increases from no/low immersion to complete/high immersion, more and more of the display space of the display generation component is occupied by content/user interface(s) displayed by the electronic device, and less and less of the display space of the display generation component is occupied by representation(s) of the physical environment of the electronic device, and vice versa. The above-described manner of varying the amount of the display space occupied by content displayed by the electronic device and representation(s) of the physical environment of the electronic device reduces interference of the physical environment with the user interface(s) displayed by the electronic device as the level of immersion is increased, which simplifies the interaction between the user and the electronic device and enhances the operability of the electronic device and makes the user-device interface more efficient (e.g., by avoiding distraction caused by the passing through of the physical environment at higher levels of immersion), which additionally reduces power usage and improves battery life of the electronic device by enabling the user to use the electronic device more quickly and efficiently, while reducing errors in usage.

In some embodiments, changing the second respective user interface from being displayed at the second level of immersion to being displayed at the third level of immersion includes changing atmospheric effects displayed via the display generation component (1058), such as shown in the transition from FIG. 9A to 9B on objects 908 and 910. For example, in some embodiments, the electronic device displays representation(s) of the physical environment of the electronic device (e.g., objects in the physical environment, surfaces in the physical environment, etc.), such as described with reference to methods 1200, 1400 and 1600. In some embodiments, the representation(s) of the physical environment are passed-through via the display generation component, as previously described. In some embodiments, the electronic device modifies the display of those representation(s) of the physical environment of the device to display those representations with one or more visual effects that correspond to atmospheric effects generated by the electronic device. For example, in some embodiments, the atmospheric effect is a simulated effect of lighting/sound/ etc. of dusk during a day. In some embodiments, at low/no immersion, the representation(s) of the physical environment are displayed via the display generation component as if being displayed in broad daylight (e.g., in the case that this is the case at the electronic device, such as noon on a sunny day while outside). In some embodiments, when the level of immersion is increased, the electronic device modifies display of the representation(s) of the physical environment to reduce the brightness of the sunlight displayed via the display generation component, including reducing the brightness with which various objects, including potentially the sun or physical objects on which the sunlight is incident, are displayed via the display generation component to mimic the look/atmosphere of the physical environment had the current time of day been dusk rather than noon. In some embodiments, changing such atmospheric effects includes adding a different, virtual, light source to the three-dimensional environment (e.g., the moon, or the sun as it would emit light right as, or right after, it sets) and displaying the representation(s) of the physical environment with the appearance they would have if they were illuminated by that new light source. In some embodiments, at maximum immersion, the noon-time lighting/atmosphere/look/etc. of the representation(s) of the physical environment are completely replaced by the dusk-time lighting/atmosphere/look/ etc. of the representation(s) of the physical environment. The above-described manner of varying the atmospheric effects with which the physical environment is displayed increases the level with which the user is drawn into a virtual experience as the level of immersion is increased, which simplifies the interaction between the user and the electronic device and enhances the operability of the electronic device and makes the user-device interface more efficient (e.g., by avoiding distraction caused by the physical environment at higher levels of immersion), which additionally reduces power usage and improves battery life of the electronic device by enabling the user to use the electronic device more quickly and efficiently, while reducing errors in usage.

In some embodiments, the second respective user interface includes a respective user interface element displayed by the electronic device, and changing the second respective user interface from being displayed at the second level of immersion to being displayed at the third level of immersion includes changing display of the respective user interface element (1060), such as the change in display of objects 906, 908 and/or 910 in the transition from FIG. 9A to 9B. As previously described, and as described with reference to methods 1200, 1400 and 1600, in some embodiments the electronic device displays one or more virtual objects via the display generation component. In some embodiments, the virtual object(s) is a user interface/content of an application, for example. In some embodiments, the virtual object is a virtual object that is displayed with some relationship to a representation of a physical object in the physical environment of the electronic device (e.g., a virtual vase displayed on a representation of a physical table). In some embodiments, the virtual object is a virtual object that is displayed without a relationship to a representation of a physical object (e.g., a virtual drawing drawn by the user in spec). In some embodiments, changing the level of immersion optionally causes the electronic device to change the display of such virtual objects via the display generation component. For example, in some embodiments, increasing the level of immersion optionally causes the virtual object(s) to be enlarged (e.g., displayed with more display space via the display generation component), displayed with more emphasis (e.g., different colors, different shading, different (e.g., more) lighting, more brightness, more clarity, less translucency, etc.), displayed closer to the viewpoint of the user, etc. In some embodiments, decreasing the level of immersion optionally causes the virtual object(s) to be reduced in size (e.g., displayed with less display space via the display generation component), displayed with less emphasis (e.g., different colors, different shading, different (e.g., less) lighting, less brightness, less clarity, more translucency, etc.), displayed further from the viewpoint of the user, etc. The above-described manner of varying the display of virtual objects increases the user's engagement with the virtual objects as the level of immersion is increased, which simplifies the interaction between the user and the electronic device and enhances the operability of the electronic device and makes the user-device interface more efficient (e.g., by avoiding distraction caused by other objects, such as physical objects, at higher levels of immersion), which additionally reduces power usage and improves battery life of the electronic device by enabling the user to use the electronic device more quickly and efficiently, while reducing errors in usage.

In some embodiments, changing the second respective user interface from being displayed at the second level of immersion to being displayed at the third level of immersion includes changing audio effects generated by the electronic device (1062). In some embodiments, the electronic device generates audio for playback via one or more speakers or audio output devices (e.g., headphones) in communication with the electronic device while displaying content/user interface(s) (e.g., atmospheric sound effects, sounds corresponding to (e.g., generated as being emitted from) virtual objects (e.g., content of an application), sounds corresponding to (e.g., generated as being emitted from) physical objects in the physical environment of the electronic device, etc.). In some embodiments, changing the level of immersion optionally changes the audio generated by the electronic device. For example, in some embodiments, increasing the level of immersion optionally causes the sounds corresponding to physical objects to be deemphasized (e.g., reduced in volume, clarity, expansiveness, etc.) and/or sounds corresponding to virtual objects to be emphasized (e.g., increased in volume, clarity, expansiveness). In some embodiments, increasing the level of immersion optionally causes atmospheric sound effects (e.g., sounds corresponding to atmospheric effects described above) to be emphasized (e.g., increased in volume, clarity, expansiveness) and/or sounds corresponding to physical objects to be deemphasized (e.g., reduced in volume, clarity, expansiveness, etc.). In some embodiments, at high (e.g., maximum) immersion, sounds corresponding to physical objects are not generated or reduced to a low level (e.g., minimum level), and sounds corresponding to virtual objects are increased to a high level (e.g., maximum level); in some embodiments, at low (e.g., minimum) immersion, sounds corresponding to physical objects are increased to a high level (e.g., maximum level), and sounds corresponding to virtual objects are not generated or reduced to a low level (e.g., minimum level). The above-described manner of varying audio effects based on immersion reduces interference of the physical environment with the user interface(s) displayed by the electronic device as the level of immersion is increased, which simplifies the interaction between the user and the electronic device and enhances the operability of the electronic device and makes the user-device interface more efficient (e.g., by avoiding distraction caused by audio corresponding to the physical environment at higher levels of immersion), which additionally reduces power usage and improves battery life of the electronic device by enabling the user to use the electronic device more quickly and efficiently, while reducing errors in usage.

In some embodiments, displaying the second respective user interface at the second level of immersion includes concurrently displaying content of a first application in a first portion of a display area of the display generation component, and one or more representations of a first respective portion of a physical environment of the electronic device in a second portion of the display area of the display generation component (1064), such as described with reference to user interface 934 in FIG. 9C and as shown with respect to user interface 912 in FIGS. 9A-9B (e.g., in some embodiments, the electronic device is displaying content/user interface(s) in addition to displaying representation(s) of the physical environment of the electronic device (e.g., objects in the physical environment, surfaces in the physical environment, etc.), such as described with reference to methods 1200, 1400 and 1600). In some embodiments, the representation(s) of the physical environment are passed-through via the display generation component, as previously described. In some embodiments, at lower levels of immersion, the content/user interface(s) occupy less of the field of view of the display generation component (e.g., none or a minority of the field of view) and the representation(s) of the physical environment occupy more of the field of view of the display generation component (e.g., all or a majority of the field of view). In some embodiments, displaying the second respective user interface at the third level of immersion includes concurrently displaying the content of the first application in a third portion, larger than the first portion, of the display area of the display generation component, and one or more representations of a second respective portion, different from the first respective portion, of the physical environment of the electronic device in a fourth portion, smaller than the second portion, of the display area of the display generation component (1066), such as described with reference to user interface 934 in FIG. 9C and as shown with respect to user interface 912 in FIGS. 9A-9B. In some embodiments, as the level of immersion is increased, the content/user interface(s) occupy more and more of the field of view of the display generation component (e.g., all or a majority of the field of view) and the representation(s) of the physical environment occupy less and less of the field of view of the display generation component (e.g., none or a minority of the field of view). In some embodiments, the visual characteristics with which the representation(s) of the physical environment are displayed (e.g., brightness, clarity, color, etc.) are optionally not changed as the level of immersion changes, but rather the amount of the display space occupied by those representation(s) of the physical environment changes. Thus, in some embodiments, changing the level of immersion changes the amount of the field of view of the display generation component that is occupied by content/user interface(s) displayed by the electronic device. The above-described manner of varying the amount of the display space/field of view occupied by content displayed by the electronic device and representation(s) of the physical environment of the electronic device reduces interference of the physical environment with the user interface(s) displayed by the electronic device as the level of immersion is increased, which simplifies the interaction between the user and the electronic device and enhances the operability of the electronic device and makes the user-device interface more efficient (e.g., by avoiding distraction caused by the passing through of the physical environment at higher levels of immersion), which additionally reduces power usage and improves battery life of the electronic device by enabling the user to use the electronic device more quickly and efficiently, while reducing errors in usage.

In some embodiments, displaying the second respective user interface at the second level of immersion includes concurrently displaying content of a first application (e.g., playback of a video, display of a photo, etc.) and one or more representations of a physical environment (1068), such as shown in FIGS. 9A-9C (e.g., in some embodiments, the electronic device is displaying content/user interface(s) in addition to displaying representation(s) of the physical environment of the electronic device (e.g., objects in the physical environment, surfaces in the physical environment, etc.), such as described with reference to methods 1200, 1400 and 1600. In some embodiments, the representation(s) of the physical environment are passed-through via the display generation component, as previously described.). In some embodiments, displaying the second respective user interface at the third level of immersion includes concurrently displaying the content of the first application and the one or more representations of the physical environment that are deemphasized relative to the one or more representations of the physical environment that are displayed at the second level of immersion (1070), such as described with reference to user interface 934 in FIG. 9C and as shown with respect to user interface 912 in FIGS. 9A-9B. In some embodiments, at lower levels of immersion, the representation(s) of the physical environment are displayed at a first level of emphasis (e.g., in color, bright, not blurred, etc.) via the display generation component while the electronic device is displaying content/user interface(s) via the display generation component. In some embodiments, as the level of immersion is increased, the representation(s) of the physical environment are displayed at second levels, lower than the first level, of emphasis (e.g., with less saturated colors or grayscale, less bright, more blurred, etc.) via the display generation component while the electronic device is displaying content/user interface(s) via the display generation component. For example, at a first level of immersion, the electronic device optionally passes through 80% of the color, brightness, etc. of representation(s) of the physical environment (e.g., representations of physical objects) via the display generation component, whereas at a second, higher level of immersion, the electronic device optionally passes through 50% of the color, brightness, etc. of representation(s) of the physical environment (e.g., representations of physical objects) via the display generation component. In some embodiments, lower and higher levels of immersion optionally cause less or more, respectively, de-emphasis of the representation(s) of the physical environment passed through via the display generation component. In some embodiments, increasing the level of immersion causes increased emphasis of the content of the first application, and decreasing the level of immersion causes decreased emphasis of the content of the first application. In some embodiments, increasing or decreasing the level of immersion does not cause the content of the first application to occupy a greater or smaller, respectively, portion of the display space of the display generation component (and thus optionally does not cause the representation(s) of the physical environment to occupy a greater or smaller, respectively, portion of the display space of the display generation component). In some embodiments, increasing or decreasing the level of immersion does cause the content of the first application to occupy a greater or smaller, respectively, portion of the display space of the display generation component (and thus optionally does cause the representation(s) of the physical environment to occupy a smaller or greater, respectively, portion of the display space of the display generation component). The above-described manner of varying the emphasis of pass-through content reduces interference of the physical environment with the user interface(s) displayed by the electronic device as the level of immersion is increased, which simplifies the interaction between the user and the electronic device and enhances the operability of the electronic device and makes the user-device interface more efficient (e.g., by avoiding distraction caused by the passing through of the physical environment at higher levels of immersion), which additionally reduces power usage and improves battery life of the electronic device by enabling the user to use the electronic device more quickly and efficiently, while reducing errors in usage.

In some embodiments, after displaying the second respective user interface at the third level of immersion and the first respective user interface at the first level of immersion, and without receiving an input to change the level of immersion of the first respective user interface from the first level of immersion, and without receiving an input to change the level of immersion of the second respective user interface from the third level of immersion (1072) (e.g., the last level of immersion at which the second respective user interface was displayed was the third level of immersion, and the last level of immersion at which the first respective user interface was displayed was the first level of immersion, and no input has been received after displaying those user interfaces at those levels of immersion to change those levels of immersion), the electronic device receives (1074), via the one or more input devices, a fourth user input corresponding to a request to display a third respective user interface of a second respective application, different from the respective application (e.g., the input is received while displaying the second respective user interface at the third level of immersion, the first respective user interface at the first level of immersion, or a different user interface at a different level of immersion). In some embodiments, the fourth user input includes detecting selection of the application icon for the second respective application in an application browsing user interface. In some embodiments, the second user input is a voice input for displaying the second respective application, without selecting any icon for the second respective application.

In some embodiments, in response to receiving the fourth user input (1076), the electronic device displays, via the display generation component, the third respective user interface at a fourth level of immersion (e.g., in some embodiments, the third respective user interface is displayed overlaid on the user interface that was displayed when the fourth user input was received, both of which optionally continue to be displayed over the background and/or within the three-dimensional environment). In some embodiments, displaying the third respective user interface includes ceasing display of the user interface that was displayed when the fourth user input was received. In some embodiments, the fourth level of immersion is independent of the level of immersion of the operating system user interface and/or the user interface of the respective application. Therefore, in some embodiments, the level of immersion of operating system user interfaces and/or applications does not affect the level of immersion of other application user interfaces (e.g., each application has its own, independent level of immersion). In some embodiments, the fourth level of immersion at which the third respective user interface is displayed is the level of immersion with which the third respective user interface was last displayed (prior to the current display of the third respective user interface). In some embodiments, the level of immersion of operating system user interfaces do affect the level of immersion of application user interfaces (e.g., if the system user interface is set at a first level of immersion, subsequently displaying an application user interface includes displaying the application user interface at that same first level of immersion, even if the application user interface was last displayed at a different level of immersion).

In some embodiments, while displaying the third respective user interface at the fourth level of immersion, the electronic device receives, via the one or more input devices, a fifth user input corresponding to a request to change the current level of immersion associated with the electronic device (1078), such as an input at input element 920 (e.g., a voice input, a hand gesture, a selection of a displayed user interface element and/or detection of an input (e.g., rotational input) at a mechanical input element included in the electronic device that corresponds to a request to increase or decrease the level of immersion of the currently-displayed user interface). In some embodiments, in response to receiving the fifth user input, the electronic device displays (1080), via the display generation component, the third respective user interface at a fifth level of immersion, different from the fourth level of immersion (e.g., increasing or decreasing the level of immersion of the third respective user interface in accordance with the fifth user input). In some embodiments, after receiving the fifth user input (1082), the electronic device receives (1084), via the one or more input devices, a sixth user input corresponding to a request to display the first respective user interface (e.g., a request to redisplay the first respective user interface after receiving the input to change the level of immersion of the third respective user interface). In some embodiments, in response to receiving the sixth user input, the electronic device displays (1086), via the display generation component, the first respective user interface at the first level of immersion, such as the level of immersion shown in FIG. 9A (e.g., displaying the first respective user interface at the level of immersion with which the first respective user interface was last displayed). In some embodiments, the electronic device receives (1088), via the one or more input devices, a seventh user input corresponding to a request to display the second respective user interface (e.g., a request to redisplay the second respective user interface after receiving the input to change the level of immersion of the third respective user interface). In some embodiments, in response to receiving the seventh user input, the electronic device displays (1090), via the display generation component, the second respective user interface at the third level of immersion, such as the level of immersion shown in FIG. 9C (e.g., displaying the second respective user interface at the level of immersion with which the second respective user interface was last displayed). Thus, in some embodiments, changing the level of immersion of a user interface of a first application does not affect the levels of immersion of user interfaces of other applications and/or the operating system of the electronic device. The above-described manner of setting immersion independently for different applications provides a flexible architecture in which levels of immersion can be independently defined and/or changed for different user interfaces, which simplifies the interaction between the user and the electronic device and enhances the operability of the electronic device and makes the user-device interface more efficient (e.g., by avoiding erroneous immersion level changes in another user interface as a result of an immersion level change at the current user interface), which additionally reduces power usage and improves battery life of the electronic device by enabling the user to use the electronic device more quickly and efficiently, while reducing errors in usage.

In some embodiments, after receiving the third user input and while displaying the first respective user interface at the first level of immersion, the electronic device receives (1092), via the one or more input devices, a fourth user input corresponding to a request to display the second respective user interface (e.g., an input to redisplay the respective application after having ceased display of the respective application to display a user interface of the operating system, such as an application browsing user interface). In some embodiments, the fourth user input is received while displaying the application browsing user interface (e.g., selection of an icon corresponding to the respective application). In some embodiments, in response to receiving the fourth user input, the electronic device displays (1094), via the display generation component, the second respective user interface at the third level of immersion, such as the level of immersion shown in FIG. 9C (e.g., the level of immersion at which the second respective user interface was last displayed). For example, in some embodiments, after exiting to the operating system, redisplaying the respective application causes the respective application to be displayed at the level of immersion at which the respective application was last displayed, irrespective of any changes in the level of immersion of the operating system user interface. The above-described manner of maintaining immersion for a previously-exited application provides a flexible architecture in which levels of immersion can be independently defined and/or maintained for different user interfaces, which simplifies the interaction between the user and the electronic device and enhances the operability of the electronic device and makes the user-device interface more efficient (e.g., by avoiding erroneous immersion level changes in another user interface as a result of an immersion level change at the current user interface), which additionally reduces power usage and improves battery life of the electronic device by enabling the user to use the electronic device more quickly and efficiently, while reducing errors in usage.

In some embodiments, the second user input is a user input of a first type and corresponds to a request to increase the current level of immersion associated with the electronic device, and the third level of immersion is greater than the second level of immersion (1096) (e.g., a clockwise rotation of a rotatable input element of the electronic device for increasing the level of immersion of the currently display user interface while displaying the user interface of an application (e.g., rather than a user interface of the operating system of the electronic device)). In some embodiments, while displaying the second respective user interface at the third level of immersion, the electronic device receives (1098), via the one or more input devices, a fourth user input of the first type corresponding to a request to increase the current level of immersion associated with the electronic device, such as an input at input element 920 (e.g., a further clockwise rotation of a rotatable input element of the electronic device for increasing the level of immersion of the currently display user interface while displaying the user interface of the respective application). In some embodiments, in response to receiving the fourth user input of the first type, the electronic device maintains display (1097) of the second respective user interface at the third level of immersion, such as described with reference to user interface 934 in FIG. 9C (e.g., the third level of immersion is optionally the highest level of immersion that can be reached via rotation of the rotatable input element while displaying the user interface of an application). In some embodiments, at the third level of immersion, the user interface of the respective application does not occupy an entirety of the field of view of the display generation component and/or is still displayed with at least some representation(s) of the physical environment of the electronic device. In some embodiments, a higher level of immersion than the third level of immersion is attainable, but cannot be attained using an input of the first type. In some embodiments, the higher level of immersion is able to be attained using the input of the first type (e.g., rotation of the rotatable input element), but only for user interfaces of the operating system of the electronic device, and not for user interfaces of applications.

In some embodiments, while displaying the second respective user interface at the third level of immersion, the electronic device receives (1095), via the one or more input devices, a fifth user input of a second type, different from the first type, corresponding to a request to increase the current level of immersion associated with the electronic device, such as selection of element 950 in FIG. 9C (e.g., selection of a user interface element displayed by the respective application in the second respective user interface for increasing the level of immersion of the respective application. For example, selection of a "full screen" user interface element in the second respective user interface). In some embodiments, in response to receiving the fifth user input of the second type, the electronic device displays (1093), via the display generation component, the second respective user interface at a fourth level of immersion, greater than the third level of immersion, such as described with reference to user interface 934 in FIG. 9C (e.g., full immersion or full screen display of the respective application). Thus, in some embodiments, full immersion, or at least levels of immersion above the third level of immersion, are not attainable via inputs of the first type when displaying a user interface of an application (e.g., as opposed to a user interface of the operating system). In some embodiments, a different type of input (e.g., selection of a user interface element) is required to exceed the third level of immersion for an application user interface. The above-described manner of requiring a different type of input to attain high levels of immersion for an application ensures that high immersion for applications cannot be reached without additional indication that a user wishes to achieve such high levels of immersion, which simplifies the interaction between the user and the electronic device and enhances the operability of the electronic device and makes the user-device interface more efficient (e.g., by avoiding accidentally reaching high levels of immersion for application whose behavior at high levels of immersion may be unknown or unpredictable), which additionally reduces power usage and improves battery life of the electronic device by enabling the user to use the electronic device more quickly and efficiently, while reducing errors in usage.

Figure 11A:
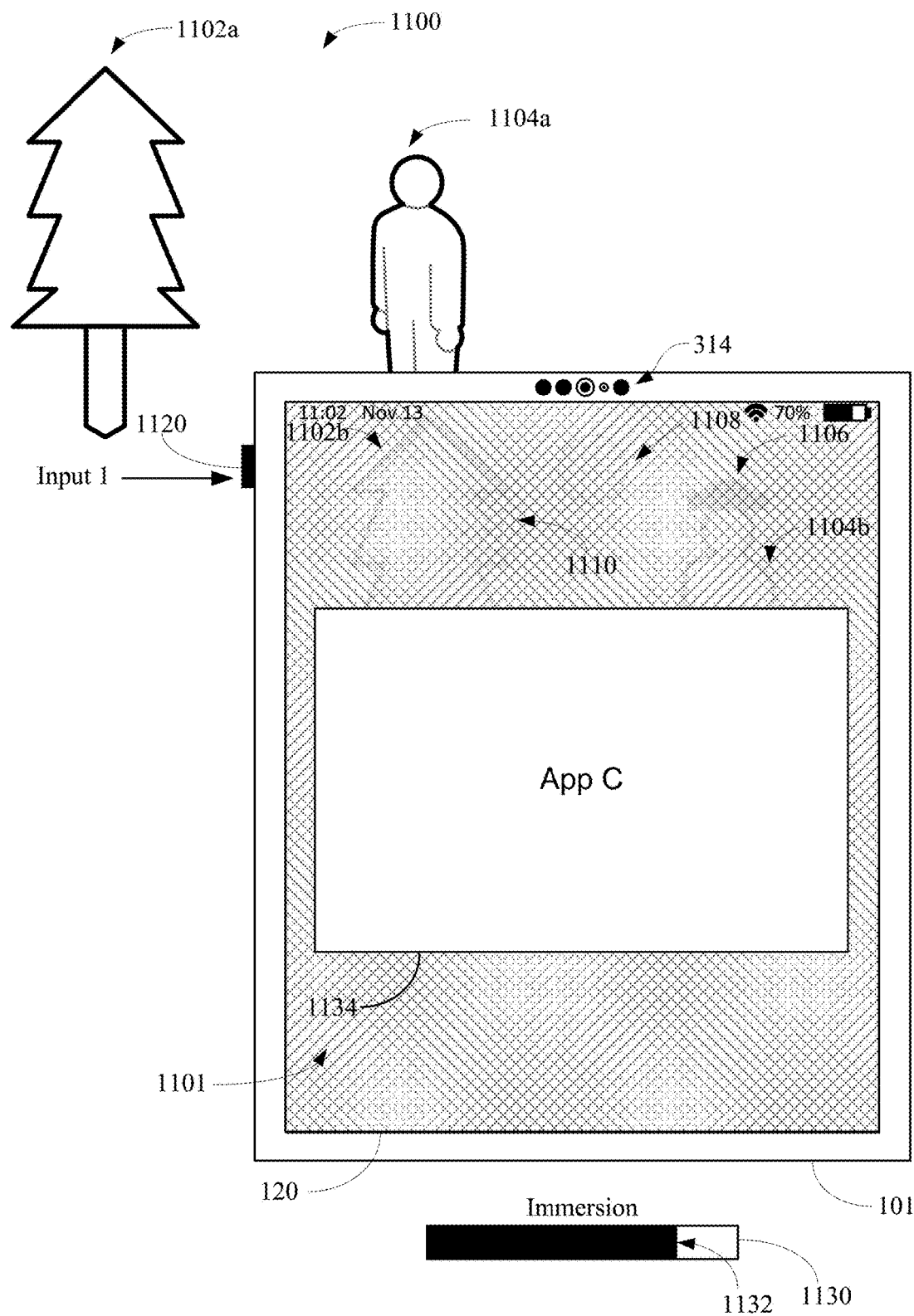
FIGS. 11A-11B illustrate examples of resuming display of a user interface at a previously-displayed level of immersion after (e.g., temporarily) reducing the level of immersion associated with the user interface in accordance with some embodiments.
Figure 11B:
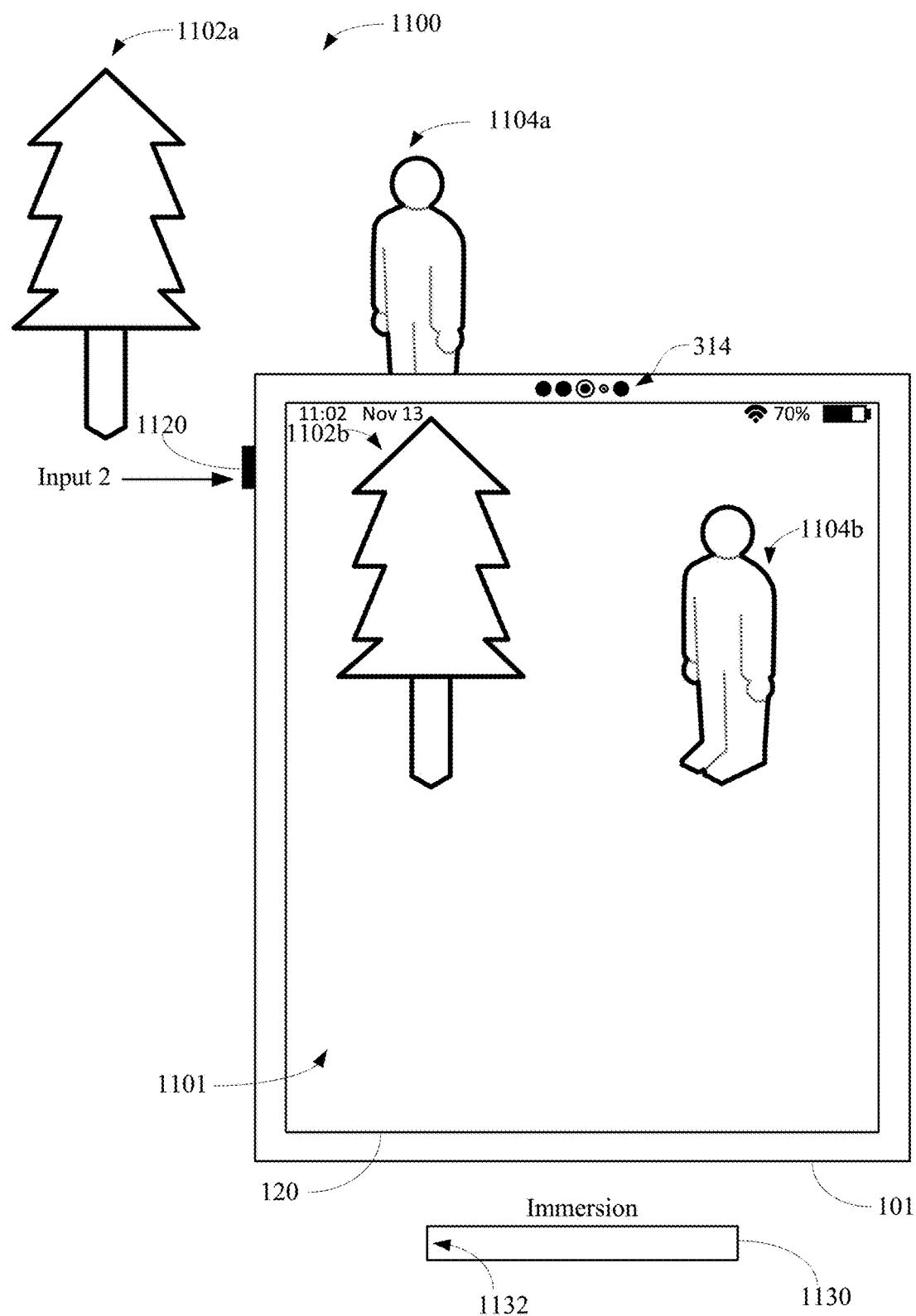
Figure 12A:
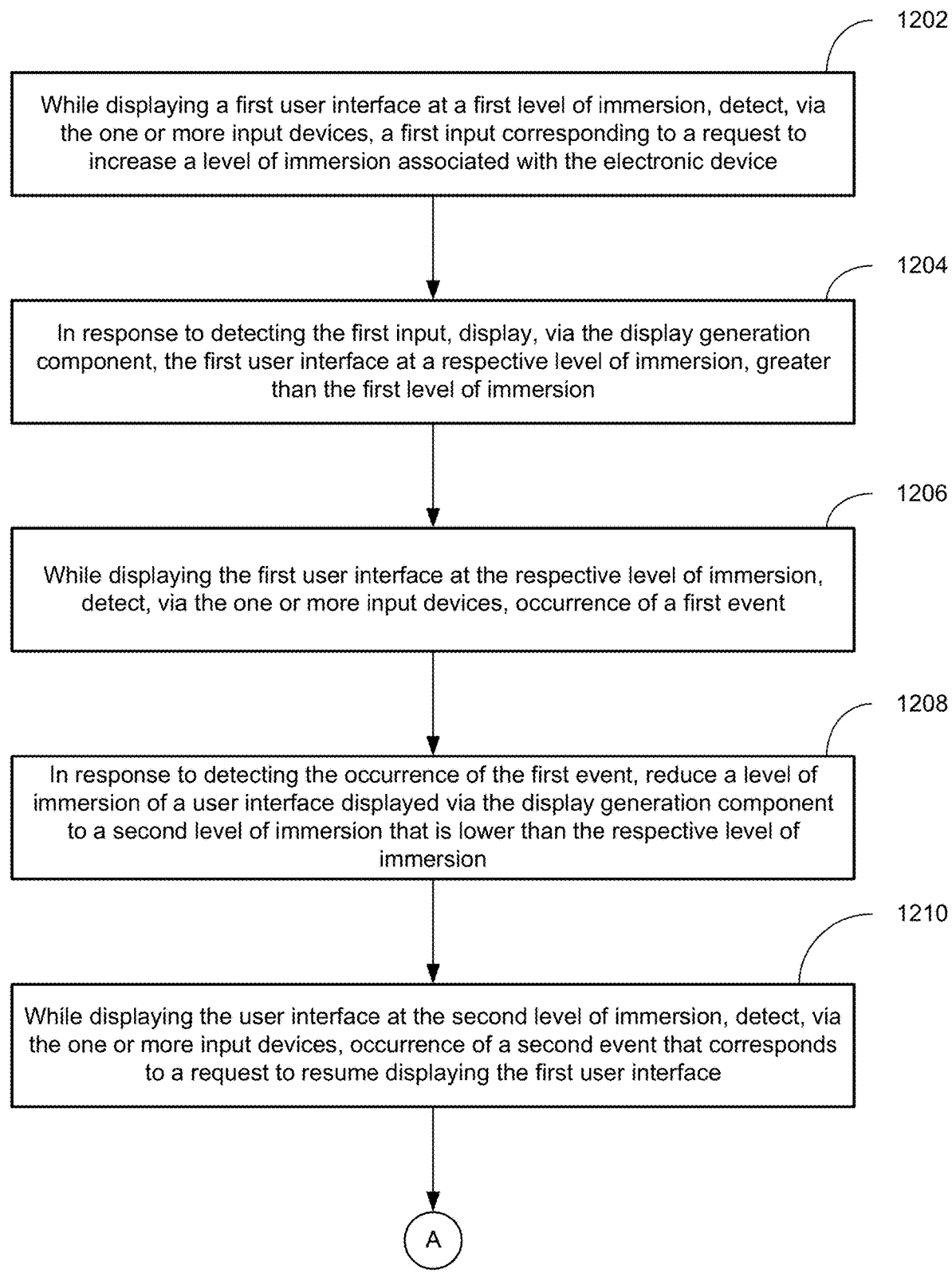
FIGS. 12A-12D is a flowchart illustrating a method of resuming display of a user interface at a previously-displayed level of immersion after (e.g., temporarily) reducing the level of immersion associated with the user interface in accordance with some embodiments.
Figure 12B:
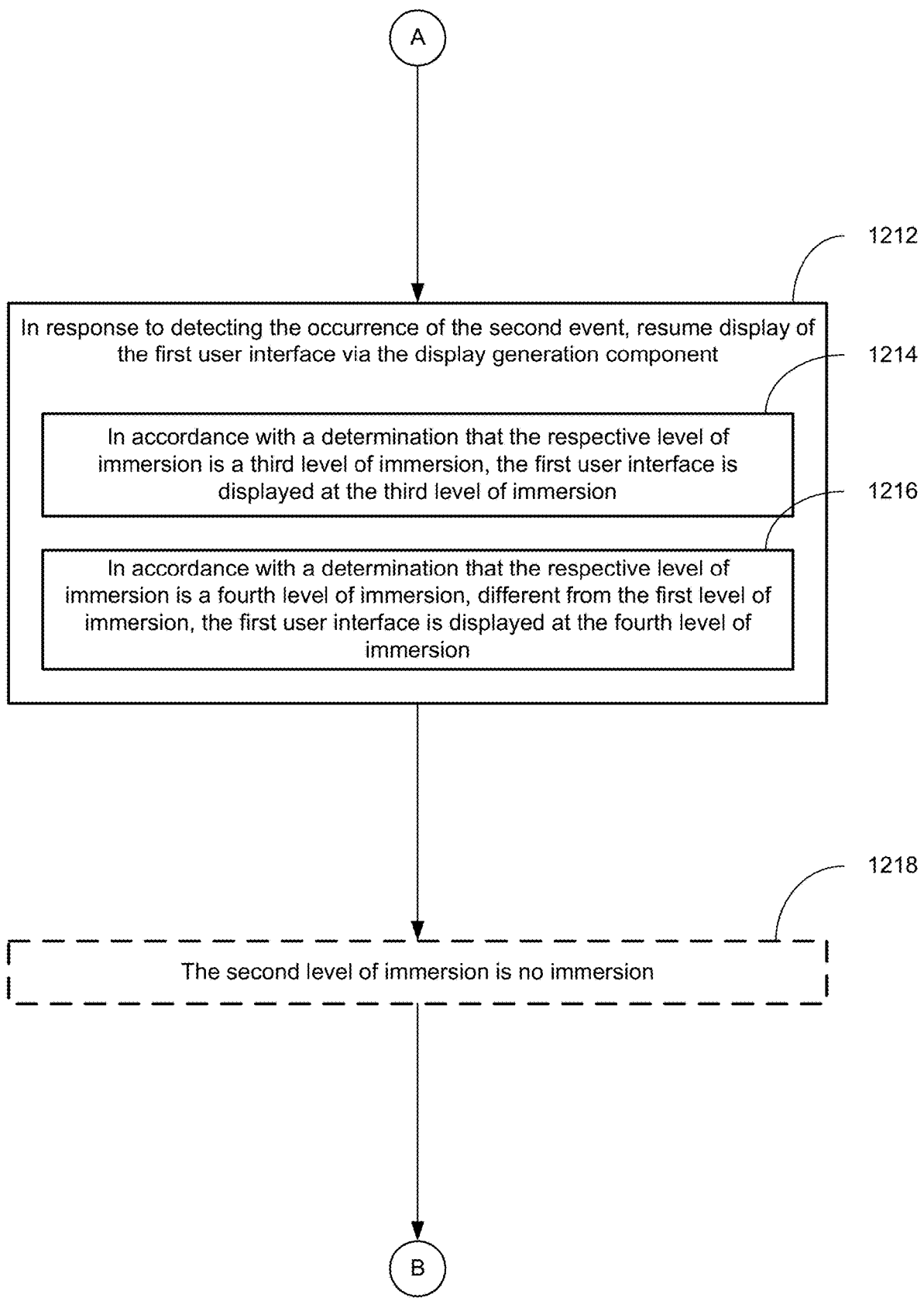
Figure 12C:
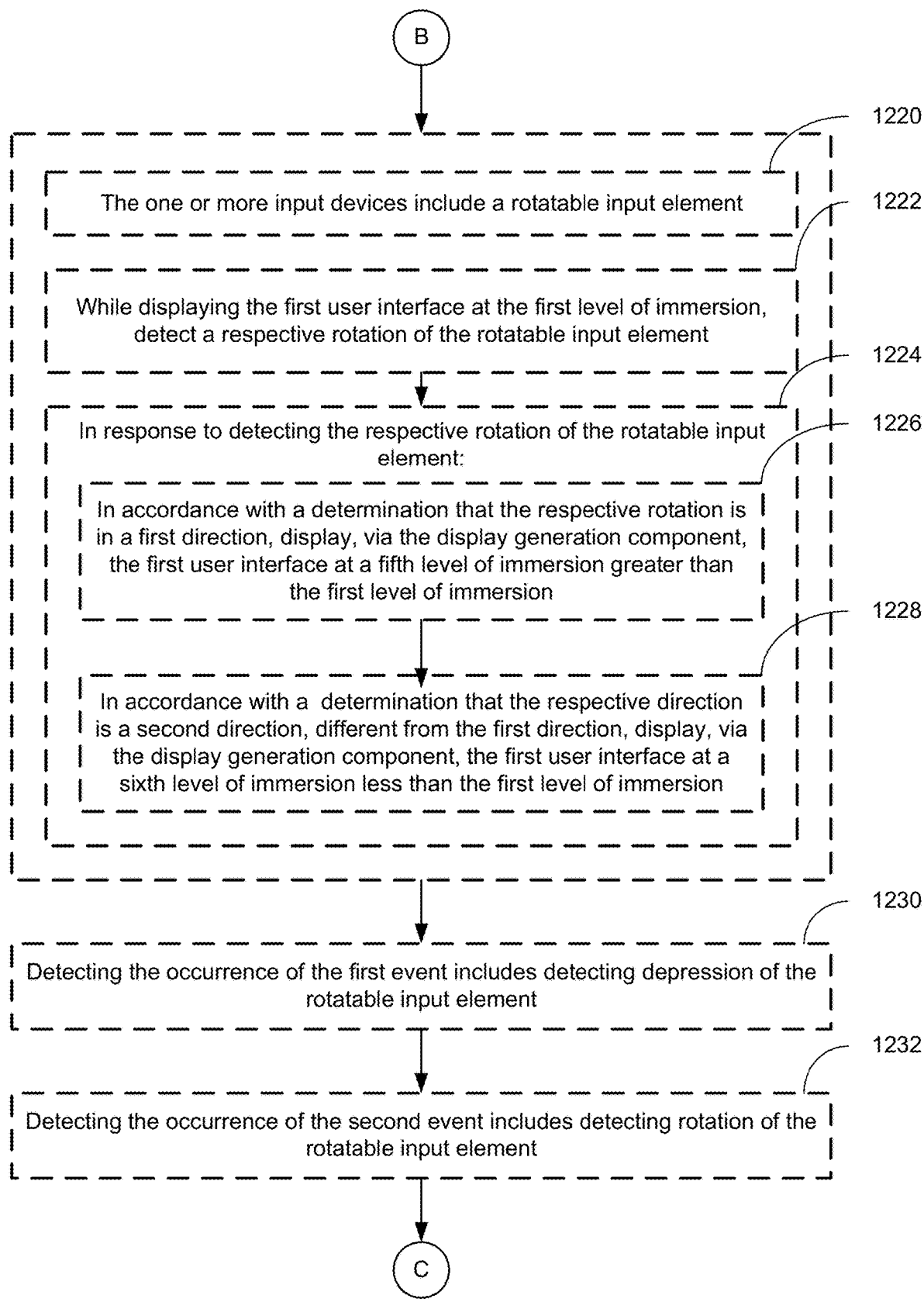
Figure 12D:
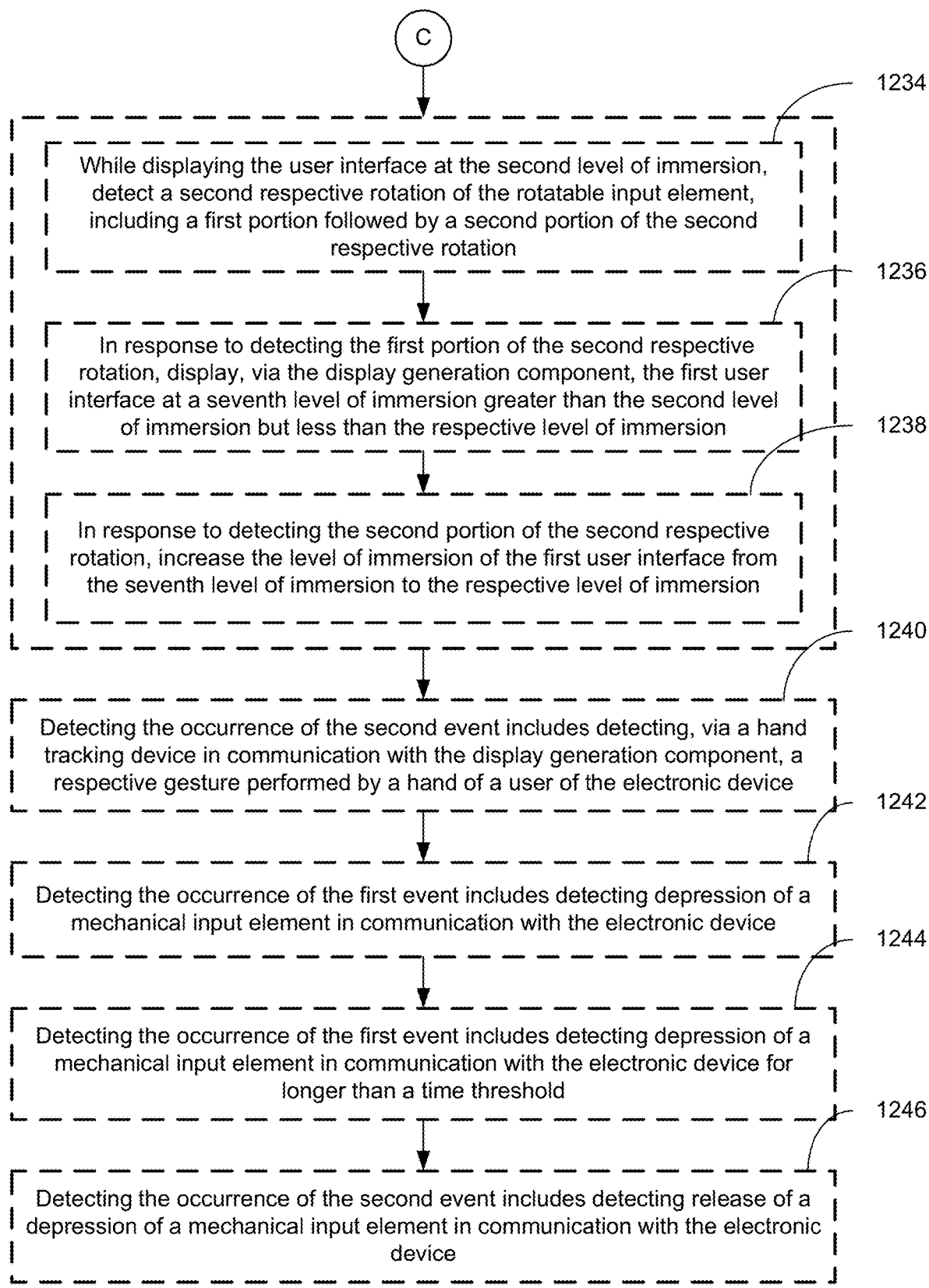

FIGS. 11A-11B illustrate examples of reducing a level of immersion at which a user interface is displayed by the electronic device, and subsequently resuming display of that user interface from that level of immersion in certain scenarios in accordance with some embodiments.

FIG. 11A illustrates an electronic device 101 displaying, via a display generation component (e.g., display generation component 120 of FIG. 1), a three-dimensional environment 1101 in a user interface. As described above with reference to FIGS. 1-6, the electronic device 101 optionally includes a display generation component (e.g., a touch screen) and a plurality of image sensors (e.g., image sensors 314 of FIG. 3). The image sensors optionally include one or more of a visible light camera, an infrared camera, a depth sensor, or any other sensor the electronic device 101 would be able to use to capture one or more images of a user or a part of the user while the user interacts with the electronic device 101. In some embodiments, the user interfaces shown below could also be implemented on a head-mounted display that includes a display generation component that displays the user interface to the user and sensors to detect the physical environment and/or movements of the user's hands (e.g., external sensors facing outwards from the user), and/or gaze of the user (e.g., internal sensors facing inwards towards the face of the user).

As shown in FIG. 11A, device 101 captures one or more images of the physical environment 1100 around device 101 (e.g., operating environment 100), including one or more objects in the physical environment 1100 around device 101. In some embodiments, device 101 displays representations of the physical environment in three-dimensional environment 1101. For example, three-dimensional environment 1101 includes a representation 1102b of a tree (e.g., corresponding to tree 1102a in physical environment 1100) and a representation 1104b of a person (e.g., corresponding to person 1104a in physical environment 1100). In some embodiments, device 101 also displays one or more virtual objects (e.g., objects that are not in the physical environment 1100) in the three-dimensional environment 901. For example, in FIG. 1A, device 101 is displaying virtual object 1110 (e.g., an ornament) on representation 1102b of a tree, virtual object 1106 (e.g., a hat) on representation 1104b of a person, and representation 1108 of the sun. In some embodiments, representation 1108 of the sun is displayed and treated as a light source in the three-dimensional environment 1101, and the lighting effects resulting from representation 1108 of the sun are applied, by device 101, to representations of physical objects and/or virtual objects displayed in three-dimensional environment 1101.

In FIG. 11A, device 101 is also displaying a user interface 1134 of an application (e.g., App C). User interface 1134 is optionally any user interface displayed by device 101 (e.g., an operating system user interface, a user interface of a content (e.g., music, movies, videos, photos, etc.) browsing and/or viewing application, etc.). In some embodiments, user interface 1134 is displayed at a location within three-dimensional environment 1101 such that it overlays one or more representations of physical objects and/or virtual objects in three-dimensional environment 1101 (e.g., overlaying and in front of part of representation 1104b of the person, corresponding to person 1104a in physical environment 1100). In some embodiments, user interface 1134 is located within three-dimensional environment 1101 such that one or more virtual objects are in front of and overlay part of user interface 1112 and/or one or more representations of physical objects are in front of and overlay part of user interface 1112.

In some embodiments, device 101 displays three-dimensional environment 1101 and/or user interfaces displayed via display generation component 120 at a particular level of immersion. For example, in FIG. 11A, device 101 is displayed user interface 1134 at a level of immersion 1132 that is relatively high on immersion scale 1130. For example, the display of FIG. 11A is optionally a result of device 101 detecting an input to increase the level of immersion of user interface 1134 to the level of immersion 1132 using input element 1120 of device 101, such as described with reference to FIG. 9A. As such, in some embodiments, content surrounding user interface 1134 displayed by display generation component 120 (e.g., representations of the physical environment 1100 and/or objects in the physical environment 1100, virtual objects, etc.) is relatively highly obscured (e.g., as described in more detail with reference to method 1000). In some embodiments, details relating to displaying user interface 1134 at a relatively high level of immersion 1132 are as described with reference to method 1000.

Similar to as described with reference to FIG. 9A, input element 1120 is optionally a mechanical input element that can be manipulated to change the level of immersion of the user interface(s) currently-displayed by device 101, such as a slider element or a rotational input element, where the amount and direction (e.g., increase or decrease) of the change in immersion is based on the magnitude and direction of the manipulation of the input element 1120 (e.g., the direction and/or magnitude of the movement of input element 1120, or the direction and/or magnitude of the rotation of a rotatable input element). In some embodiments, device 101 and/or input element 1120 generate tactile feedback as the level of immersion is changes (e.g., minor tactile outputs for each increases or decreases stage of immersion, and different major tactile outputs upon reaching minimum or maximum immersion). In some embodiments, input element 1120 is also depressible and/or is pressure sensitive (e.g., in addition to being movable and/or rotatable) such that providing a press input on input element (e.g., button click, pressure higher than a pressure threshold, etc.) is detectable as an input by device 101.

In some embodiments, in response to detecting a depression of input element 1120, device 101 reduces the level of immersion at which the currently displayed user interface(s) is displayed to a predetermined level of immersion (e.g., a minimum or relatively low level of immersion), and in response to detecting a release of the depression of input element 1120, device 101 resumes displaying the user interface(s) at the level of immersion at which it was displayed when the depression input was detected. In some embodiments, device 101 requires that the depression of input element 1120 be for longer than a time threshold (e.g., 0.1, 0.5, 1, 5, 10 seconds) before transitioning to the low level of immersion. For example, in FIG. 11A, device 101 detects depression of input element 1120 ("Input 1"). In response, device reduces the level of immersion 1132 to a predetermined relatively low level of immersion (e.g., no immersion), as shown in FIG. 11B. As shown in FIG. 11B, device 101 has ceased displaying all virtual objects in three-dimensional environment 1101 (e.g., including user interface 1134, and virtual objects 1110, 1108 and 1106), and has ceased obscuring display of (e.g., has ceased darkening, blurring or otherwise deemphasizing) representations 1102b and 1104b of objects in physical environment 1100 and/or portions of physical environment 1100 itself. Additional or alternative details relating to display characteristics of virtual objects and/or the physical environment 1100 when transitioning to a low or no level of immersion are optionally as described with reference to method 1000. Thus, in some embodiments, depression of input element 1120 causes device 101 to fully display physical environment 1100 in three-dimensional environment 1101 and/or fully cease display of any virtual objects in three-dimensional environment

1101. In this way, a user of device 101 is able to quickly and easily transition to viewing physical environment 1100 in an unobscured manner.

As previously mentioned, in some embodiments, in response to detecting release of input element 1120, device 101 optionally returns to the previous level of immersion at which it was displaying user interface(s) when depression of input element 1120 was detected. For example, in FIG. 11B, device 101 detects release of input element 1120 ("Input 2"). In response, device returns to the level of immersion 1132 shown in FIG. 11A. In some embodiments, additionally or alternatively to returning to the previous level of immersion in response to detecting release of input element 1120, device 101 returns to the previous level of immersion in response to detecting movement of input element 1120 (e.g., the same type of input for gradually changing the level of immersion as described with reference to FIG. 9A) corresponding to a request to increase the current level of immersion. In some embodiments, in response to such input, device 101 immediately resumes displaying user interface 1134 at the previous level of immersion (e.g., even if the amount of movement of input element 1120 would not otherwise be sufficient to increase the level of immersion from the level in FIG. 11B to the previous level of immersion in FIG. 11A), or in some embodiments, device 101 gradually increases the level of immersion (e.g., in accordance with the continued movement of input element 1120) until the movement of input element 1120 is sufficient to reach the previous level of immersion in FIG. 11A. Other inputs for resuming display of user interface 1134 at the previous level of immersion are also contemplated, such as a particular hand gesture detected by device 101, a particular gaze-based gesture detected by (e.g., sensors 314 of) device 101, etc.

FIGS. 12A-12D is a flowchart illustrating a method 1200 of resuming display of a user interface at a previously-displayed level of immersion after (e.g., temporarily) reducing the level of immersion associated with the user interface in accordance with some embodiments. In some embodiments, the method 1200 is performed at a computer system (e.g., computer system 101 in FIG. 1 such as a tablet, smartphone, wearable computer, or head mounted device) including a display generation component (e.g., display generation component 120 in FIGS. 1, 3, and 4) (e.g., a heads-up display, a display, a touchscreen, a projector, etc.) and one or more cameras (e.g., a camera (e.g., color sensors, infrared sensors, and other depth-sensing cameras) that points downward at a user's hand or a camera that points forward from the user's head). In some embodiments, the method 1200 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 1200 are, optionally, combined and/or the order of some operations is, optionally, changed.

In the method 1200, in some embodiments, an electronic device (e.g., computer system 101 in FIG. 1) in communication with a display generation component and one or more input devices (e.g., a mobile device (e.g., a tablet, a smartphone, a media player, or a wearable device), or a computer), while displaying a first user interface at a first level of immersion, the electronic device detects (1202), via the one or more input devices, a first input corresponding to a request to increase a level of immersion associated with the electronic device, such as an input on element 920 described with reference to FIG. 9A. In some embodiments, the electronic device is a mobile device (e.g., a tablet, a smartphone, a media player, or a wearable device), or a computer. In some embodiments, the display generation component is a display integrated with the electronic device (optionally a touch screen display), external display such as a monitor, projector, television, or a hardware component (optionally integrated or external) for projecting a user interface or causing a user interface to be visible to one or more users, etc. In some embodiments, the electronic device is in communication with one or more input devices that include an electronic device or component capable of receiving a user input (e.g., capturing a user input, detecting a user input, etc.) and transmitting information associated with the user input to the electronic device. Examples of input devices include a touch screen, mouse (e.g., external), trackpad (optionally integrated or external), touchpad (optionally integrated or external), remote control device (e.g., external), another mobile device (e.g., separate from the electronic device), a handheld device (e.g., external), a controller (e.g., external), a camera, a depth sensor, a motion sensor (e.g., a hand tracking device, a hand motion sensor), a physical mechanical input element included in the electronic device (e.g., a button, a rotating mechanical element, a switch, etc.) and/or an eye tracking device, etc.

In some embodiments, the first level of immersion of the first user interface optionally has one or more of the characteristics of levels of immersion described with reference to methods 1000, 1400 and 1600. The first input is optionally a user input detected via the one or more input devices, such as a voice input, a hand gesture, a selection of a displayed user interface element and/or detection of an input (e.g., rotational input) at a mechanical input element included in the electronic device that corresponds to a request to increase or decrease the level of immersion of the currently-displayed user interface. In some embodiments, the first user interface is displayed within a three-dimensional environment displayed by the electronic device via the display generation component, such as a computer-generated reality (CGR) environment such as a virtual reality (VR) environment, a mixed reality (MR) environment, or an augmented reality (AR) environment. In some embodiments, in response to detecting the first input, the electronic device displays (1204), via the display generation component, the first user interface at a respective level of immersion, greater than the first level of immersion, such as displaying user interface 1134 at the level of immersion 1132 in FIG. 11A (e.g., increasing the level of immersion of the first user interface in accordance with the first input).

In some embodiments, while displaying the first user interface at the respective level of immersion, the electronic device detects (1206), via the one or more input devices, occurrence of a first event, such as detecting input 1 on input element 1120 in FIG. 11A (e.g., detecting an input corresponding to a request to drop down to a respective predefined level of immersion of the electronic device that is lower than the first level of immersion (e.g., the lowest level of immersion for the electronic device such as no immersion or minimal immersion)). For example, the input is optionally the pressing down (rather than rotation) of the mechanical input element that was rotated to increase (or decrease) the level of immersion of the first user interface. In some embodiments, the first event is detecting a characteristic associated with the physical environment of the electronic device, such as described with reference to methods 1400 and/or 1600. In some embodiments, the event is detection of any quantity and/or input for decreasing the level of immersion at the electronic device (e.g., of the currently-displayed user interface(s)) such that one or more portions of the physical environment that were previously not visible via the display generation component (e.g., because the display generation component was displaying content that blocks or otherwise obscures those portions of the physical environment) become visible via the display generation component (e.g., because the display generation component no longer displays content that blocks or otherwise obscures those portions of the physical environment). Thus, the first event optionally corresponds to an event that allows physical objects/environments to pass through, and be displayed, via the display generation component.

In some embodiments, in response to detecting the occurrence of the first event, the electronic device reduces (1208) a level of immersion of a user interface displayed via the display generation component to a second level of immersion that is lower than the respective level of immersion, such as the level of immersion 1132 shown in FIG. 11B (e.g., in some embodiments, the second level of immersion is no immersion (e.g., the physical environment is not obscured at all from being passed through via the display generation component)). In some embodiments, the second level of immersion is simply lower than the respective level of immersion such that the physical environment is at least not fully obscured from being passed through via the display generation component. In some embodiments, the first user interface is ceased to be displayed when the user interface displayed by the display generation component is displayed at the second level of immersion. In some embodiments, representation(s) of the physical environment of the electronic device are displayed via the display generation component (e.g., when they were not displayed when the first user interface was displayed at the first level or immersion and/or the respective level of immersion) when the user interface displayed by the display generation component is displayed at the second level of immersion. In some embodiments, the first user interface continues to be displayed via the display generation component, but at a lower level of immersion.

In some embodiments, while displaying the user interface at the second level of immersion, the electronic device detects (1210), via the one or more input devices, occurrence of a second event that corresponds to a request to resume displaying the first user interface, such as detecting input 2 at input element 1120 in FIG. 11B (e.g., wherein the second event does not indicate a particular level of immersion for the electronic device). For example, if the first event is detection of depression of the mechanical input element, the second event is optionally detection of release of the mechanical input element. If the first event is detection of a characteristic associated with the physical environment of the electronic device, the second event is optionally detection that that the characteristic is no longer in effect in the physical environment of the electronic device (e.g., the sound that corresponds to the first event has stopped). In some embodiments, the second event is not an input corresponding to a request to increase the level of immersion of the electronic device to a particular level of immersion. For example, the second event is optionally not detection of rotation of the mechanical input element that was previously detected to increase (or decrease) the level of immersion of the electronic device in accordance with the rotation of the mechanical input element.

In some embodiments, in response to detecting the occurrence of the second event, the electronic device resumes (1212) display of the first user interface via the display generation component, such as reverting back to the display of user interface 1134 in FIG. 11A. In some embodiments, in accordance with a determination that the respective level of immersion is a third level of immersion, the first user interface is displayed at the third level of immersion (1214), and in accordance with a determination that the respective level of immersion is a fourth level of immersion, different from the first level of immersion, the first user interface is displayed at the fourth level of immersion (1216). Therefore, in some embodiments, the electronic device returns to displaying the first user interface at the level of immersion at which the first user interface was being displayed when the first event was detected, without detecting an input that indicates such level of immersion. In some embodiments, the electronic device stores/records the level of immersion that was in effect when the first event was detected, and resumes at that level of immersion when the second event is detected. The above-described manner of resuming display of the first user interface at the level of immersion that was in effect when the first event was detected provides a quick and efficient manner of returning to a previously in-effect level of immersion, which simplifies the interaction between the user and the electronic device and enhances the operability of the electronic device and makes the user-device interface more efficient (e.g., by not requiring user input defining the particular level of immersion to which to return, which also avoids erroneous user inputs that define erroneous levels of immersion to which to return), which additionally reduces power usage and improves battery life of the electronic device by enabling the user to use the electronic device more quickly and efficiently, while reducing errors in usage.

In some embodiments, the second level of immersion is no immersion (1218), such as shown in FIG. 11B. For example, detecting the occurrence of the first event causes the electronic device to transition to the lowest or minimal level of immersion in which most or all of the physical environment of the electronic device is visible via the display generation component, and little or no virtual elements (e.g., user interfaces generated by the electronic device, virtual object generated by the electronic device, etc.) are displayed via the display generation component. The above-described manner of displaying the physical environment of the electronic device, free of virtual elements or objects, provides a quick and efficient way of providing environmental awareness to the user, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, the one or more input devices include a rotatable input element (1220), such as described with reference to FIGS. 11A-11B (e.g., a rotatable input element included on/in the electronic device or on another device in communication with the electronic device. In some embodiments, the rotatable input element is rotatable via user input). In some embodiments, while displaying the first user interface at the first level of immersion, the electronic device detects (1222) a respective rotation of the rotatable input element (e.g., a clockwise or counter-clockwise rotation of the rotatable input element by a user). In some embodiments, in response to detecting the respective rotation of the rotatable input element (1224), in accordance with a determination that the respective rotation is in a first direction (e.g., clockwise rotation), the electronic device displays (1226), via the display generation component, the first user interface at a fifth level of immersion greater than the first level of immersion, such as described with reference to FIGS. 11A-11B (e.g., rotating the rotatable input element in the first direction increases the level of immersion of the user interface(s) displayed via the display generation component. Increasing the level of immersion optionally has one or more of the characteristics described with reference to method 1000.). In some embodiments, in accordance with a determination that the respective direction is a second direction (e.g., counter-clockwise rotation), different from the first direction, the electronic device displays (1228), via the display generation component, the first user interface at a sixth level of immersion less than the first level of immersion, such as described with reference to FIGS. 11A-11B (e.g., rotating the rotatable input element in the second direction decreases the level of immersion of the user interface(s) displayed via the display generation component. Decreasing the level of immersion optionally has one or more of the characteristics described with reference to method 1000). The above-described manner of adjusting the level of immersion of the electronic device provides a quick and efficient way of doing so, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, detecting the occurrence of the first event includes detecting depression of the rotatable input element (1230), such as input 1 on input element 1120 in FIG. 11A. For example, in some embodiments, the rotatable input element is rotatable to provide rotation-based inputs to the electronic device, and is also depressible to provide depression and/or release-based inputs to the electronic device. In some embodiments, detecting depression of the rotatable input element optionally causes the electronic device to display user interface(s) at the lowest or minimal level of immersion. The above-described manner of responding to depression of the rotatable input element provides a quick and efficient way of providing a low immersion experience, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, detecting the occurrence of the second event includes detecting rotation of the rotatable input element (1232), such as described with reference to FIGS. 11A-11B. In some embodiments, after transitioning to the second level of immersion, detecting any amount of rotation of the rotatable input element causes the electronic device to transition back to the respective level of immersion, even if different from the amount of rotation normally needed to increase the level of immersion from the second level of immersion to the respective level of immersion. In some embodiments, the amount of rotation normally needed to increase the level of immersion from the second level of immersion to the respective level of immersion is optionally the amount of rotation needed when the electronic device transitions to the second level of immersion not via detection of the first event, but rather via detection of a different type of input—such as rotation of the rotatable input element—to gradually decrease the level of immersion to the second level of immersion. For example, if the second level of immersion is a level of 0 on a scale of 0-10, and the respective level of immersion is a level of 7, and the amount of rotation detected is an amount that would otherwise increase the level of immersion by 3 (e.g., from 1 to 4, or from 2 to 5, etc.), if the electronic device transitioned to the second level of immersion via detection of the first event, the amount of rotation detected optionally resumes the first user interface at the immersion level of 7 (e.g., the level of immersion does not gradually increase from the second level of immersion in accordance with an amount of rotation of the rotatable input element). However, if the electronic device had transitioned to the second level of immersion not via detection of the first event (e.g., rather, via detection of rotation of the rotatable element to decrease the level of immersion to the second level of immersion), the amount of rotation detected optionally displays the first user interface at the immersion level of 3 rather than at the immersion level of 7. After the initial amount of rotation that causes the first user interface to be displayed at the respective level of immersion, further rotation (clockwise or counterclockwise) to increase or decrease the level of immersion optionally causes increase or decrease of immersion from the respective level of immersion. The above-described manner of resuming the previous level of immersion of the device provides a quick and efficient way of returning to the level of immersion previously in effect, while using the same input method normally used to change the level of immersion of the device, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, while displaying the user interface at the second level of immersion, the electronic device detects (1234) a second respective rotation of the rotatable input element, including a first portion followed by a second portion of the second respective rotation (e.g., detecting a first part of a clockwise rotation of the rotatable input element followed by a continued second part of the clockwise rotation of the rotatable input element). In some embodiments, (e.g., while detecting the second respective rotation of the rotatable input element) in response to detecting the first portion of the second respective rotation, the electronic device displays (1236), via the display generation component, the first user interface at a seventh level of immersion greater than the second level of immersion but less than the respective level of immersion (e.g., gradually increasing the level of immersion from the second level of immersion in accordance with an amount of rotation of the rotatable input element during the first portion of the second respective rotation). In some embodiments, (e.g., while detecting the second respective rotation of the rotatable input element) in response to detecting the second portion of the second respective rotation, the electronic device increases (1238) the level of immersion of the first user interface from the seventh level of immersion to the respective level of immersion. For example, continuing to increase the level of immersion in accordance with a continued amount of rotation of the rotatable input element during the second portion of the second respective rotation. If the second respective rotation includes a total amount of rotation sufficient to increase the level of immersion from the second level of immersion to the respective level of immersion, then the first user interface is optionally displayed at the respective level of immersion. If the total amount of rotation of the second respective rotation corresponds to a level of immersion other than the respective level of immersion, the first user interface is optionally displayed at that other level of immersion. The above-described manner of gradually returning to the previous level of immersion of the device provides consistent response to the rotation of the rotatable input element, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, detecting the occurrence of the second event includes detecting, via a hand tracking device in communication with the display generation component, a respective gesture performed by a hand of a user of the electronic device (1240) (e.g., a particular pinch gesture between two or more fingers of the hand of the user, such as the thumb and forefinger of the user. In some embodiments, the gesture includes a particular movement and/or rotation of the hand while maintaining the pinch gesture of the hand. In some embodiments, if a different gesture other than the respective gesture is detected as being performed by the hand of the user, the electronic device optionally does not resume display of the first user interface at the respective level of immersion. In some embodiments, the respective hand gesture is different from the first event that caused the electronic device to transition to the second level of immersion). The above-described manner of resuming the previous level of immersion of the device provides a quick and efficient way of returning to the level of immersion previously in effect while avoiding accidental return to such immersion, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, detecting the occurrence of the first event includes detecting depression of a mechanical input element in communication with the electronic device (1242), similar to input 1 on input element 1120 in FIG. 11A. In some embodiments, the mechanical input element is a button included in/on the electronic device or on another device in communication with the electronic device. In some embodiments, the mechanical input element can only be pressed or released (e.g., not rotated). In some embodiments, the mechanical input element can be pressed or released in addition to being rotated (e.g., to change the level of immersion of user interface(s) displayed by the electronic device, as described with reference to method 1000). In some embodiments, the first event is depression of the mechanical input element, and does not include subsequent release of the mechanical input element. In some embodiments, the first event includes depression and subsequent release of the mechanical input element. In some embodiments, the mechanical input element is pressure sensitive, and detecting depression of the mechanical input element includes detecting a force or pressure on the input element greater than a threshold force or pressure (e.g., as opposed to detecting actual movement-based depression of a button), and detecting release of the mechanical input element includes detecting a force or pressure less than the threshold force or pressure (or no force or pressure). The above-described manner of responding to depression of an input element provides a quick and efficient way of providing a low immersion experience, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, detecting the occurrence of the first event includes detecting depression of a mechanical input element in communication with the electronic device for longer than a time threshold (1244), similar to input 1 on input element 1120 in FIG. 11A. In some embodiments, the mechanical input element is a button included in/on the electronic device or on another device in communication with the electronic device. In some embodiments, the mechanical input element can only be pressed or released (e.g., not rotated). In some embodiments, the mechanical input element can be pressed or released in addition to being rotated (e.g., to change the level of immersion of user interface(s) displayed by the electronic device, as described with reference to method 1000). In some embodiments, the first event is depression of the mechanical input element for longer than the time threshold (e.g., 0.1, 0.5, 1, 2, 5, 10 seconds), and does not include subsequent release of the mechanical input element. In some embodiments, the first event includes depression and subsequent release of the mechanical input element. In some embodiments, depression and release of the mechanical input element before the mechanical input element has been depressed for the time threshold does not correspond to the first event, and does not cause the electronic device to transition to the second level of immersion. In some embodiments, the mechanical input element is pressure sensitive, and detecting depression of the mechanical input element includes detecting a force or pressure on the input element greater than a threshold force or pressure (e.g., as opposed to detecting actual movement-based depression of a button), and detecting release of the mechanical input element includes detecting a force or pressure less than the threshold force or pressure (or no force or pressure). The above-described manner of responding to depression of the input element provides a quick and efficient way of providing a low immersion experience while avoiding accidental transition to that low immersion experience, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, detecting the occurrence of the second event includes detecting release of a depression of a mechanical input element in communication with the electronic device (1246), such as input 2 detected at input element 1120 in FIG. 11B. In some embodiments, the mechanical input element is a button included in/on the electronic device or on another device in communication with the electronic device. In some embodiments, the mechanical input element can only be pressed or released (e.g., not rotated). In some embodiments, the mechanical input element can be pressed or released in addition to being rotated (e.g., to change the level of immersion of user interface(s) displayed by the electronic device, as described with reference to method 1000). In some embodiments, the electronic device transitions from the first user interface at the first level of immersion to the second level of immersion in response to detecting depression of the mechanical input element, and transitions back from the second level of immersion to the first user interface at the first level of immersion in response to detecting subsequent release of the mechanical input element. In some embodiments, the mechanical input element is pressure sensitive, and detecting depression of the mechanical input element includes detecting a force or pressure on the input element greater than a threshold force or pressure (e.g., as opposed to detecting actual movement-based depression of a button), and detecting release of the mechanical input element includes detecting a force or pressure less than the threshold force or pressure (or no force or pressure). Using a mechanical input element that rotates and is depressible to perform corresponding functions reduces the number of controls on the electronic device and reduces the complexity of manufacturing the device. Further, the above-described manner of responding to release of the input element provides a quick and efficient way of returning to the level of immersion previously in effect, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

Figure 13A:
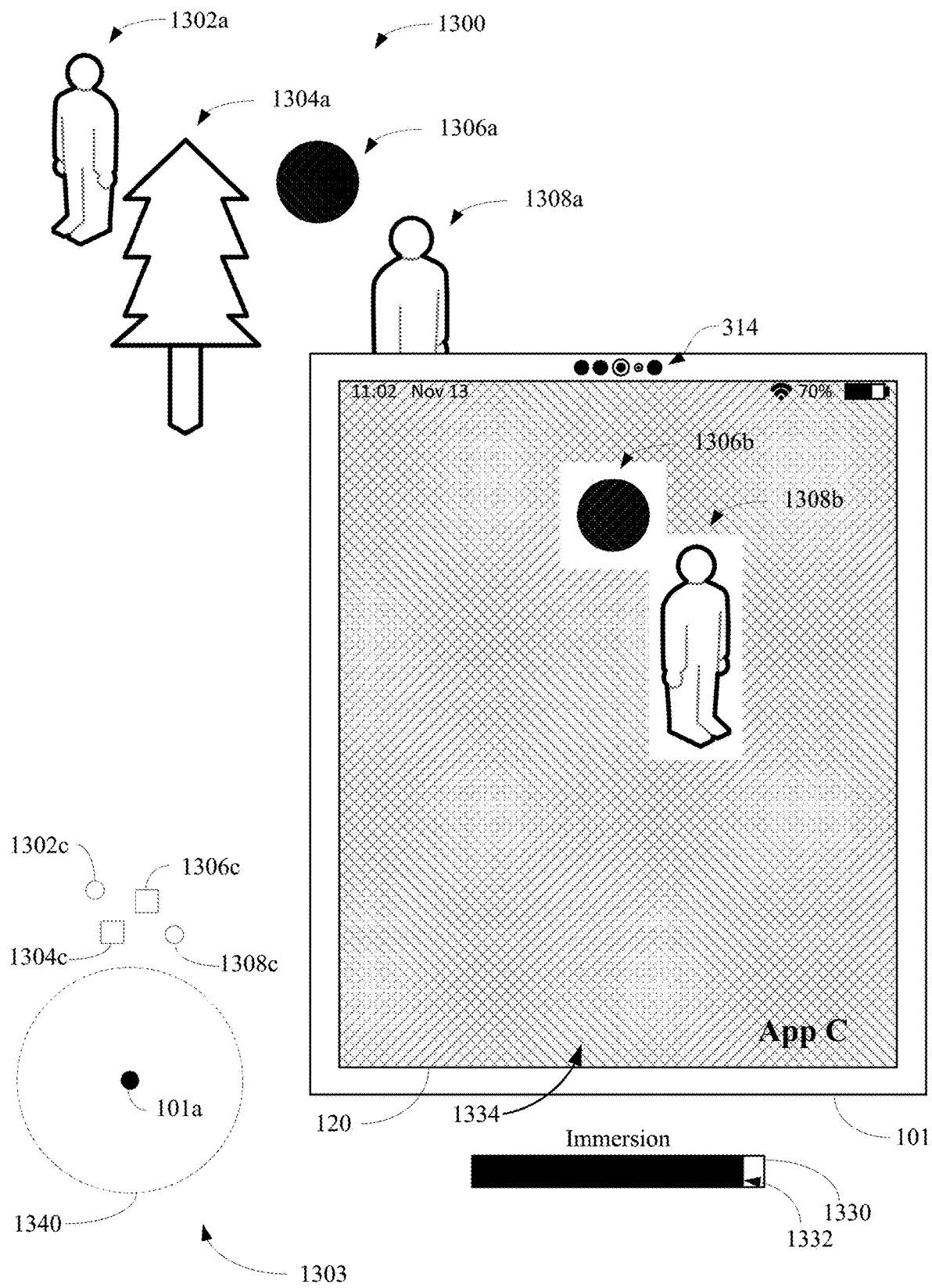
FIGS. 13A-13C illustrate examples of allowing objects, people, and/or portions of an environment to be visible through a user interface displayed by the electronic device in accordance with some embodiments.
Figure 13B:
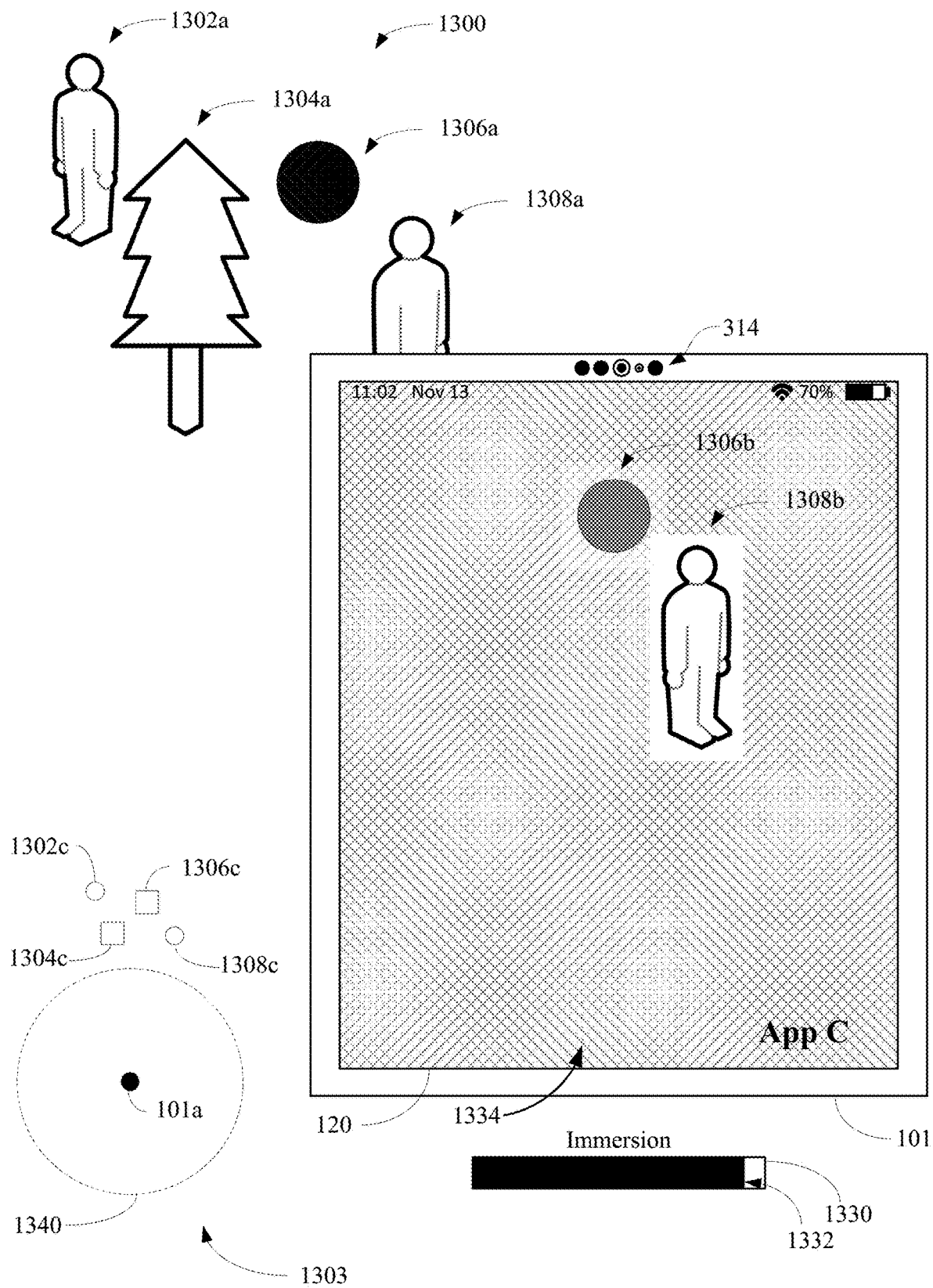
Figure 13C:
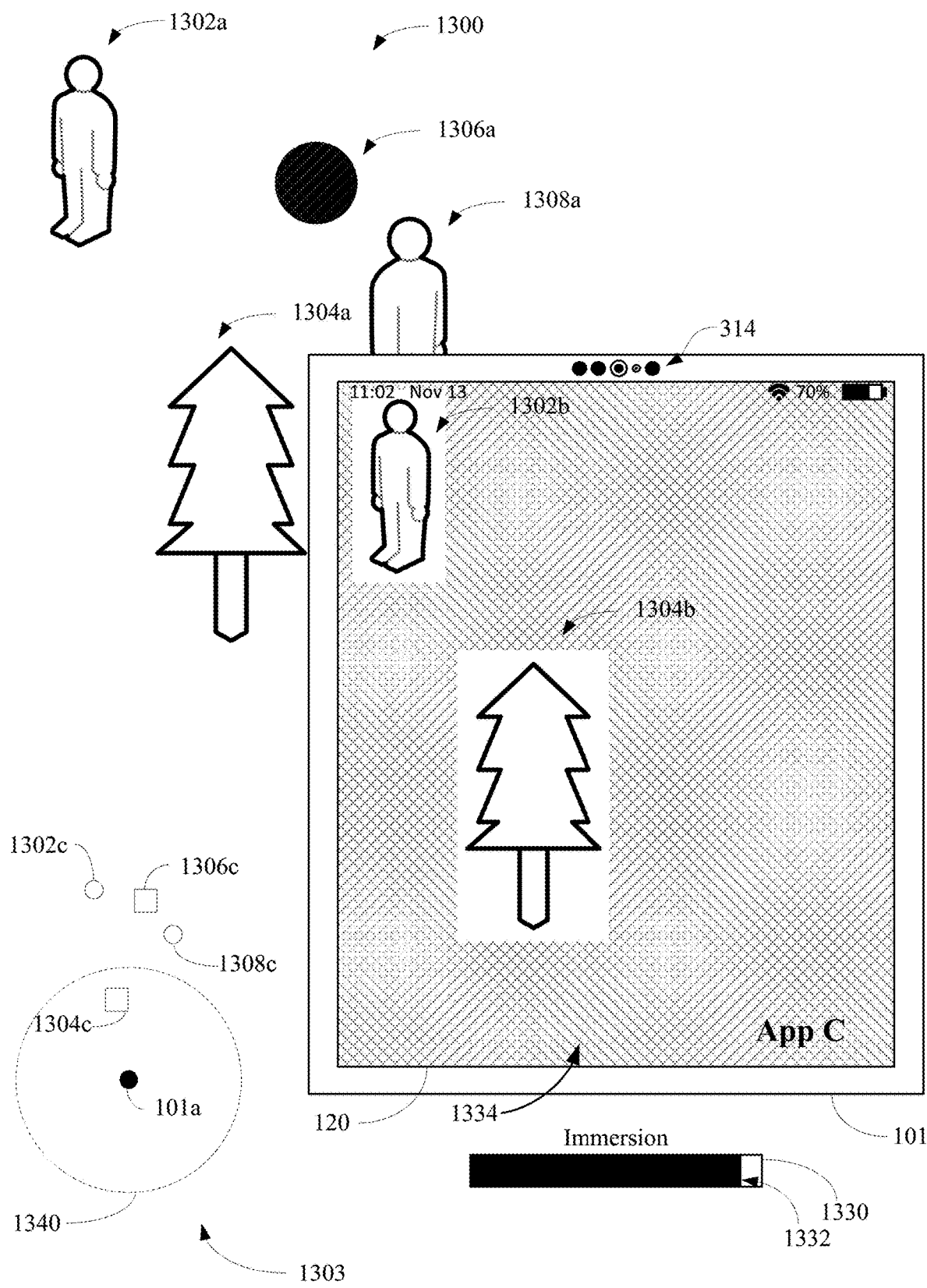
Figure 14A:
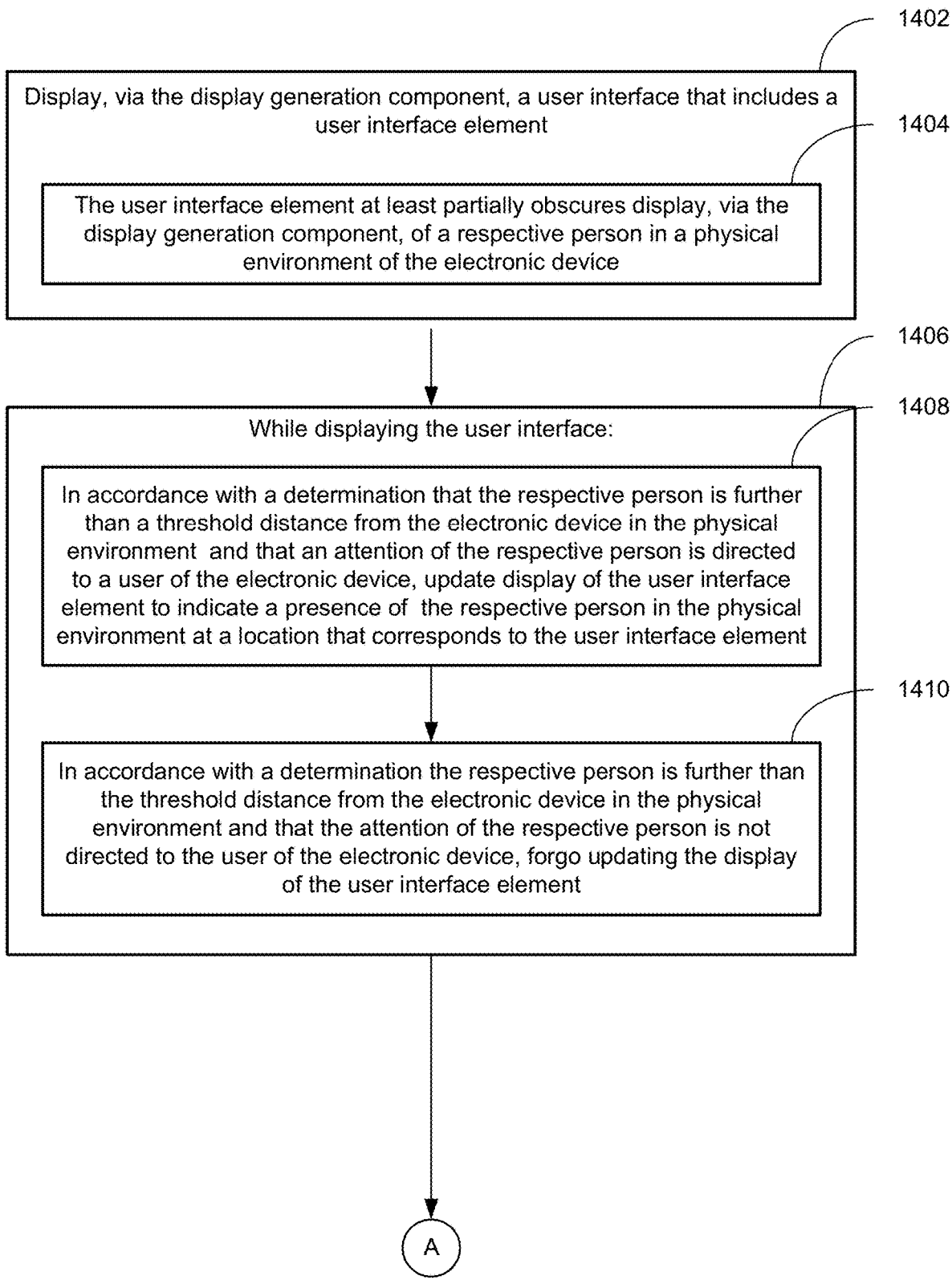
FIGS. 14A-14F is a flowchart illustrating a method of allowing objects, people, and/or portions of an environment to be visible through a user interface displayed by the electronic device in accordance with some embodiments.
Figure 14B:
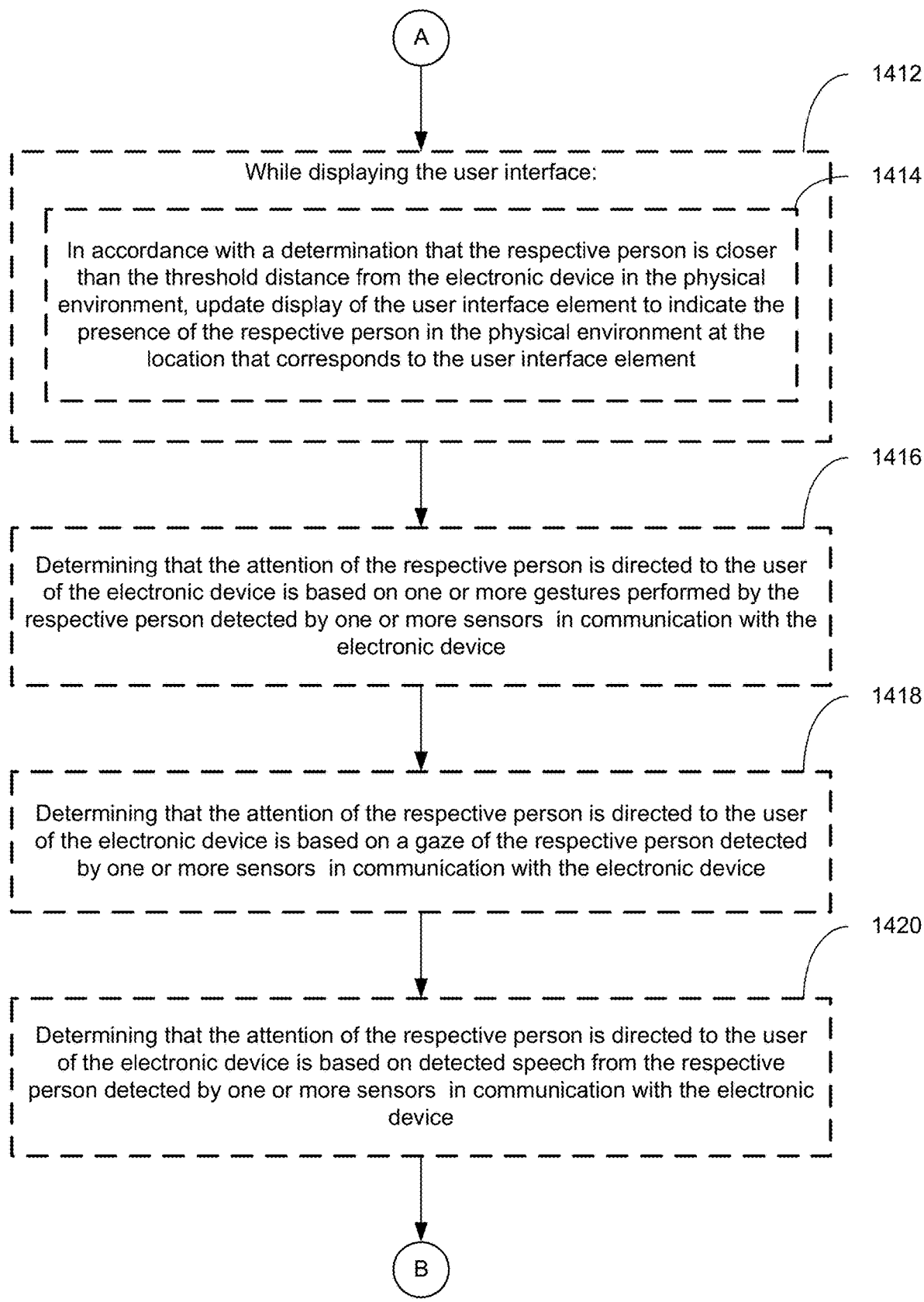
Figure 14C:
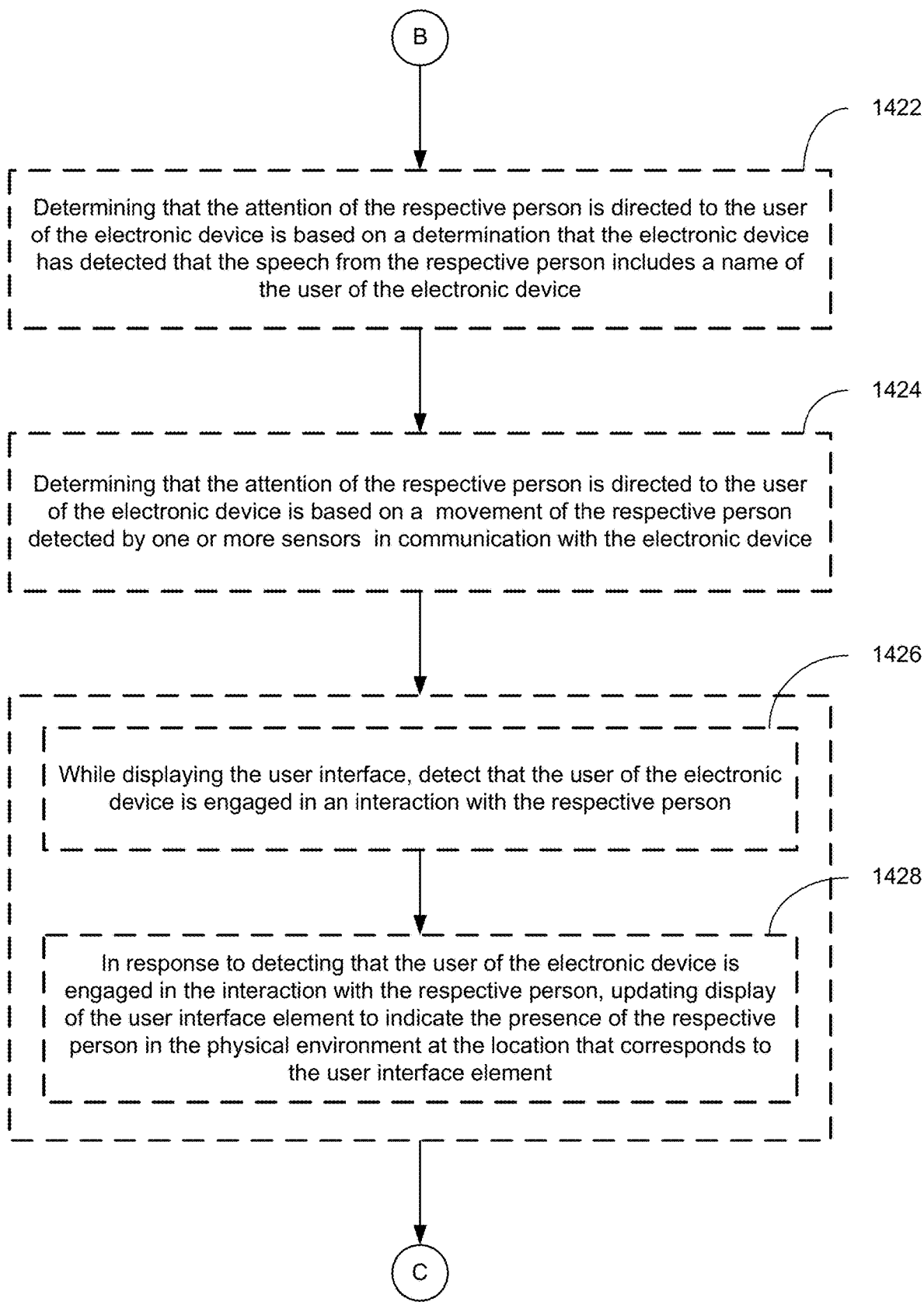
Figure 14D:
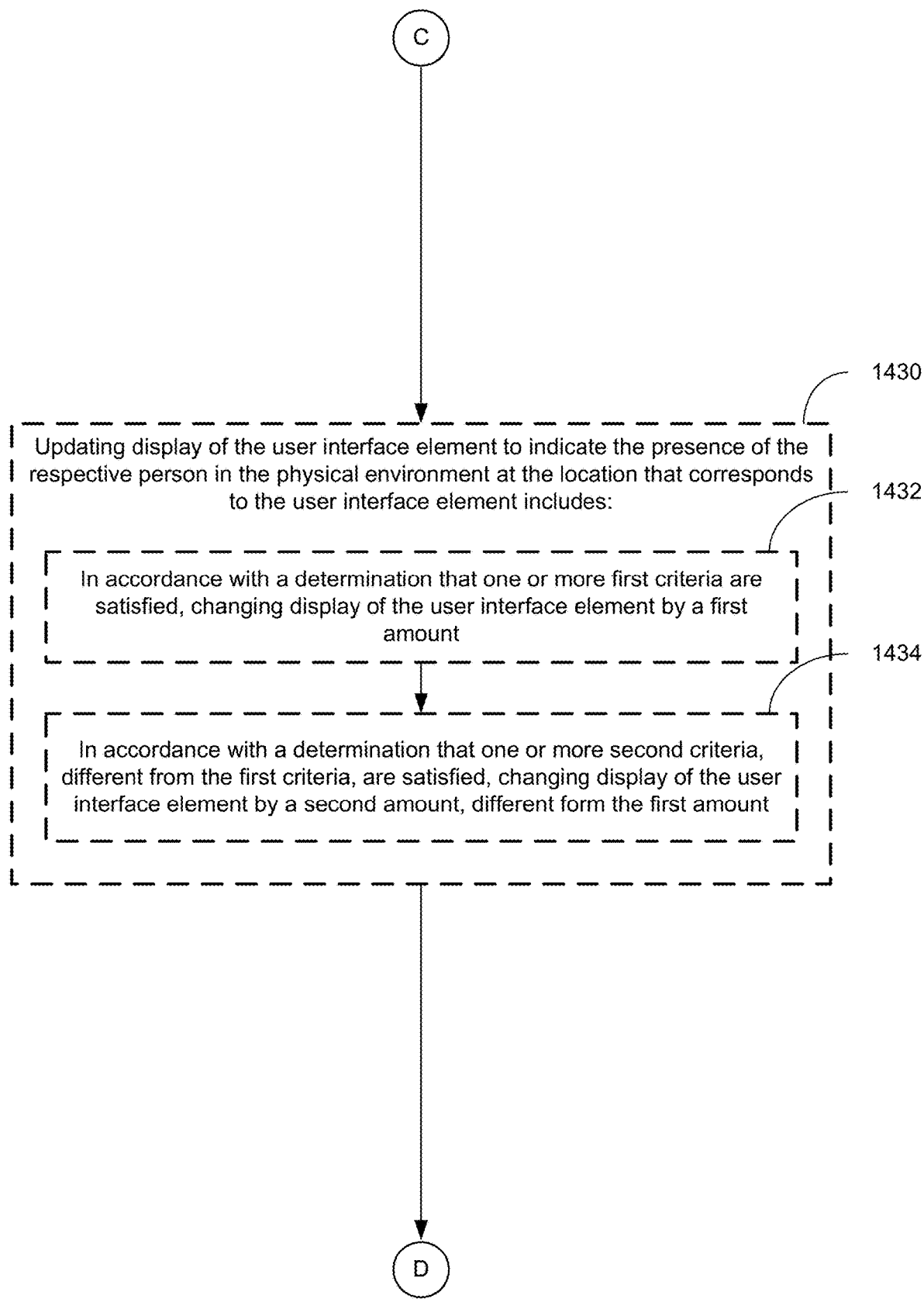
Figure 14E:
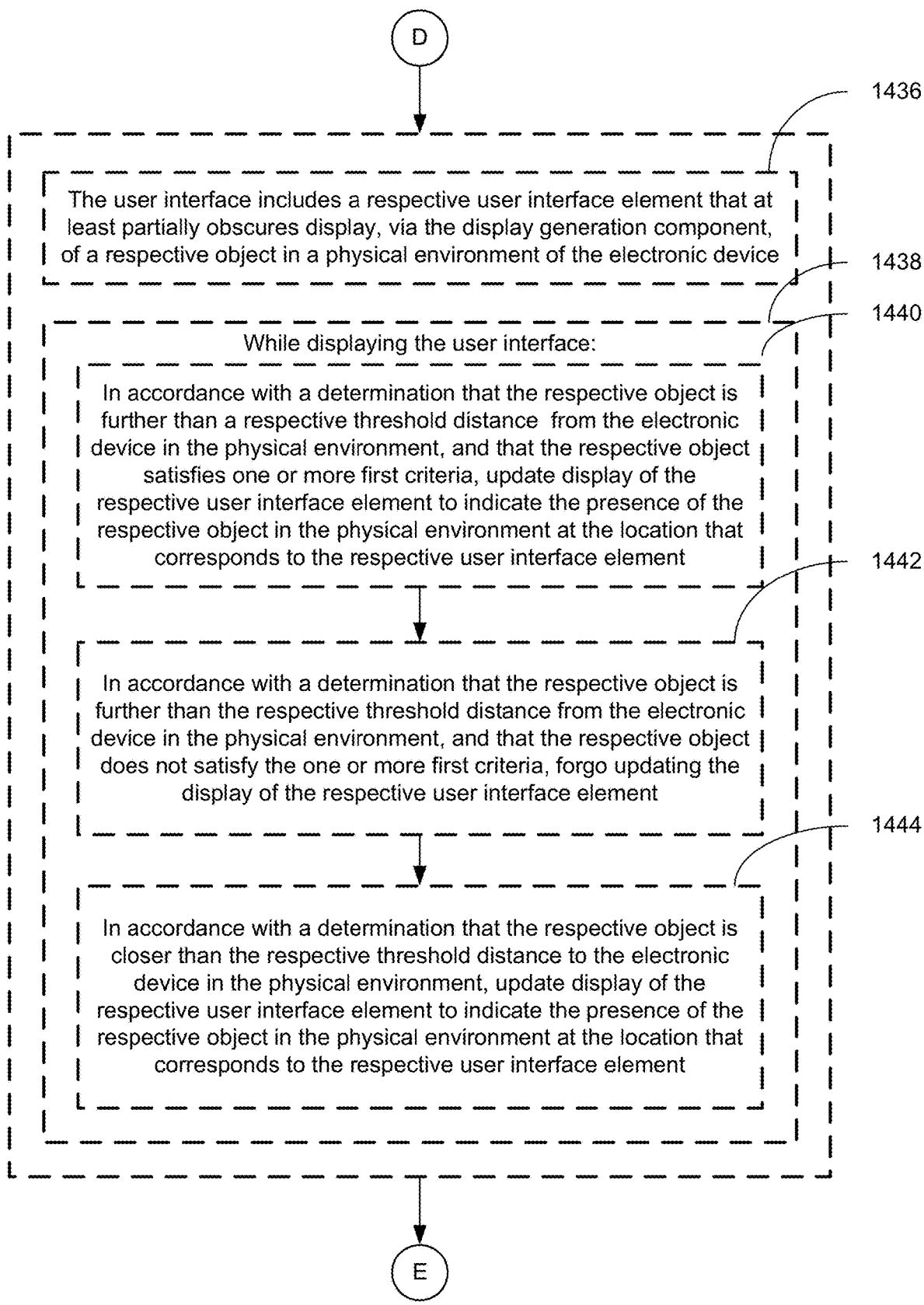
Figure 14F:
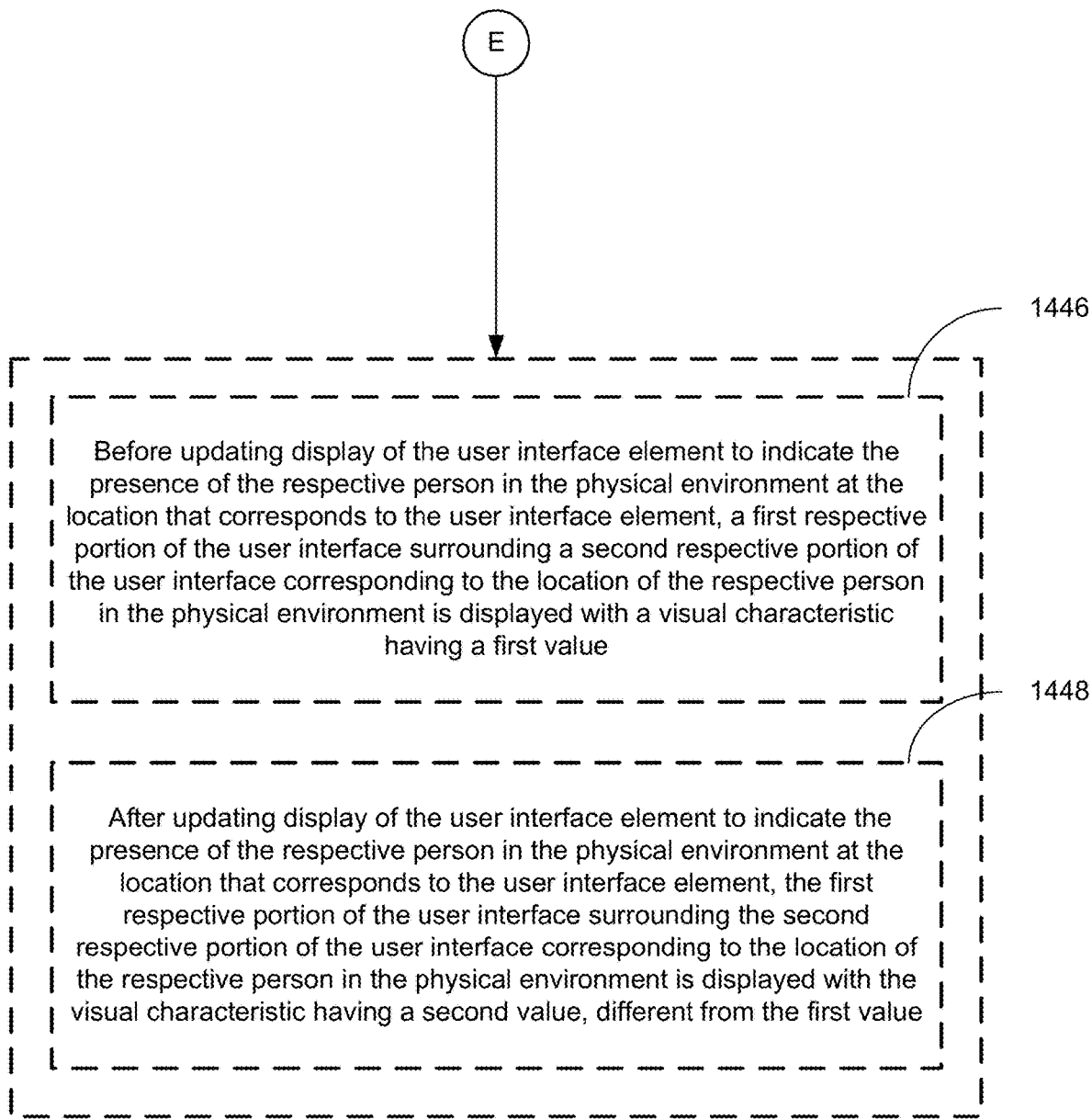

FIGS. 13A-13C illustrate examples of displaying representations of people, objects and/or portions of a physical environment of an electronic device through user interface(s) displayed by the electronic device in accordance with some embodiments.

FIG. 13A illustrates an electronic device 101 displaying, via a display generation component (e.g., display generation component 120 of FIG. 1), a user interface 1334. As described above with reference to FIGS. 1-6, the electronic device 101 optionally includes a display generation component (e.g., a touch screen) and a plurality of image sensors (e.g., image sensors 314 of FIG. 3). The image sensors optionally include one or more of a visible light camera, an infrared camera, a depth sensor, or any other sensor the electronic device 101 would be able to use to capture one or more images of a user or a part of the user while the user interacts with the electronic device 101. In some embodiments, the user interfaces shown below could also be implemented on a head-mounted display that includes a display generation component that displays the user interface to the user and sensors to detect the physical environment and/or movements of the user's hands (e.g., external sensors facing outwards from the user), and/or gaze of the user (e.g., internal sensors facing inwards towards the face of the user).

Device 101 optionally captures one or more images of the physical environment 1300 around device 101 (e.g., operating environment 100), including one or more objects in the physical environment 1300 around device 101. For example, in FIG. 13A, physical environment 1300 includes two objects (e.g., tree 1304a and ball 1306a), and two people (e.g., person 1302a and person 1308a). Legend 1303 provides a top-down view of physical environment 1300 in which element 101a corresponds to the location of device 101 in the physical environment, elements 1302c and 1308c correspond to the locations of people 1302a and 1308a, respectively, in physical environment 1300, and elements 1304c and 1306c correspond to the locations of tree 1304a and ball 1306a, respectively, in physical environment 1300. As shown in legend 1303, each of people 1302a and 1308a, and objects 1304a and 1306a, in FIG. 13A are further from device 101 than distance 1340. The relevance of distance 1340 will be described in more detail below.

In FIG. 13A, device 101 is displaying user interface 1334 (e.g., of application App C) at a relatively high (e.g., maximum) level of immersion 1332 on immersion scale 1330. For example, the display of FIG. 13A is optionally a result of device 101 detecting an input to increase the level of immersion of user interface 1334 to the level of immersion 1332 using an input element of device 101 (e.g., input element 920 of device 101, such as described with reference to FIG. 9A). In some embodiments, user interface 1334 is a user interface of an operating system of device 101 as opposed to a user interface of an application. At the level of immersion 1332 at which device 101 is displaying user interface 1334 in FIG. 13A, user interface 1334 is obscuring (e.g., fully obscuring) display of the physical environment 1300 of device 101 (e.g., objects, people, etc. in the physical environment 1300) via display generation component 120, such that the content of user interface 1334 is visible via display generation component 120, but representation(s) of physical environment 1300 are not visible via display generation component 120. In some embodiments, details relating to displaying user interface 1334 at a relatively high (e.g., maximum) level of immersion 1332 are as described with reference to method 1000. Although the description of FIGS. 13A-13C is provided in the context of user interface 1334 having a relatively high level of immersion 1332, it is understood that the features of FIGS. 13A-13C and method 1400 optionally apply analogously to any situation in which a virtual element, object, etc. displayed by device 101 at least partially obscures display of any portion of physical environment 1300 via display generation component 120.

In some embodiments, device 101 is able to detect one or more characteristics of objects, people, one or more portions of the physical environment 1300, etc., and in response to detecting certain characteristics, device 101 optionally allows one or more representations of those objects, people, or one or more portions of the physical environment 1300 to "break through" user interface 1334 such that they become visible via display generation component 120 (e.g., when they were not visible prior to detecting those characteristics). In some embodiments, representations of those objects, people, or one or more portions of the physical environment 1300 break through portions of user interface 1334 that correspond to the locations of those objects, people, or one or more portions of the physical environment 1300, and remaining portions of user interface 1334 remain displayed via display generation component 120.

For example, in FIG. 13A, both person 1302a and person 1308a are further than a threshold distance 1340 (e.g., 1, 3, 5, 10, 15, 30, 50, etc.) from device 101. At those distances, device 101 optionally causes a person to break through user interface 1334 if device 101 determines that the attention of that person is directed to the user of device 101. For example, in FIG. 13A, device 101 has determined that the attention of user 1302a is not directed to the user of device 101, and therefore a representation of person 1302a is not visible through user interface 1334. However, device 101 has determined that the attention of user 1308a is directed to the user of device 101. As such, device 101 displays representation 1308b via display generation component 120 through a portion of user interface 1334 (e.g., at the portion of display generation component 120 corresponding to the location of person 1308a within a three-dimensional environment including device 101, as described in this disclosure). In this way, a user of device 101 is able to see people in physical environment 1300 through user interface 1334 when those people are directing their attention to the user of device 101, even when those people are far away from the user of device 101. In some embodiments, when device 101 causes a person, object, portion of physical environment 1300, etc., to break through user interface 1334, device 101 ceases displaying a portion of user interface 1334 (e.g., or displays that portion of user interface 1334 with translucency), and displays a representation of that person, object, portion of physical environment 1300, etc., at that portion of user interface 1334. In some embodiments, the representation of that person, object, portion of physical environment 1300, etc., is displayed with a variable blur effect such that portions of user interface 1334 surrounding the representation of that person, object, portion of physical environment 1300, etc., are displayed with different amounts of blur that decreases as a function of distance from the representation of that person, object, portion of physical environment 1300, etc.

Device 101 optionally determines that the attention of a person is directed to the user of device 101 using one or more sensors on device 101 that capture images of, sounds of, and/or otherwise detect characteristics of, physical environment 1300. For example, in some embodiments, if the person is looking towards the electronic device and/or the user of the electronic device, the attention of the person is optionally determined to be directed to the user of the electronic device. In some embodiments, if the person is speaking towards the electronic device and/or the user of the electronic device, the attention of the person is optionally determined to be directed to the user of the electronic device. In some embodiments, an electronic device associated with the person detects, using sensors in communication with that electronic device, the relevant attention of the person and transmits such attention information to the electronic device of the user, which then responds accordingly. In some embodiments, the determination of attention of a person is based on one or more factors described with reference to method 1400, including based on gestures from that person (e.g., gestures directed to the user of device 101), speech from that person (e.g., speech directed to the user of device 101, speaking the name of the user of device 101, etc.), the speed with which the person is moving towards the user of device 101, the gaze of the person (e.g., gaze directed to the user of device 101), etc.

In some embodiments, additionally or alternatively to using factors about the attention of a person in physical environment 1300 to cause that person to break through user interface 1334, device 101 utilizes one or more factors about the interaction of the user of device 101 with that person in physical environment 1300 to cause that person to break through user interface 1334. For example, in some embodiments, if the user of device 101 is engaging with (e.g., gesturing towards, speaking towards, moving towards, etc.) the person, and device 101 detects such engagement of the user with that person, device 101 causes that person to break through user interface 1334. In some embodiments, device 101 uses a combination of factors including the attention of that person and the engagement of the user of device 101 with that person to break that person through user interface 1334.

In some embodiments, device 101 similarly causes objects that are further than the threshold distance 1340 from device 101 to break through user interface 1334 if device 101 determines that those objects are high risk objects, thus allowing the user of device 101 to see those objects via display generation component 120 (e.g., to avoid potential danger). For example, device 101 optionally determines that objects are high risk based on one or more factors described with reference to method 1400, including whether those objects will collide with the user of device 101 (e.g., based on detected trajectories of those objects). In FIG. 13A, device 101 has determined that ball 1306a is on a trajectory to collide with the user of device 101. As a result, device 101 allows ball 1306a to break through user interface 1334, and displays representation 1306b of ball 1306a via display generation component 120 in a manner and/or at a location on display generation component 120 similar to as described with reference to displaying representation 1308b of person 1308a through user interface 1334. Device 101 in FIG. 13A has conversely determined that tree 1304a is not a high risk object, and therefore does not cause tree 1304a to break through user interface 1334.

As shown in FIG. 13A, despite allowing certain representations of people, objects, portions of physical environment 1300, etc., to break through user interface 1334, in some embodiments, device 101 continues displaying the remaining portions of user interface 1334 at the relatively high level of immersion 1332. Thus, in some embodiments, the breaking through of people, objects, portions of physical environment 1300, etc. through user interface 1334 optionally does not cause the level of immersion 1332 at which device 101 is or would otherwise display user interface(s) to be reduced.

In some embodiments, device 101 allows a person, object, portion of physical environment 1300, etc., to break through user interface 1334 to various degrees based on a confidence of the determination that the object is a high risk object (e.g., in the case of objects), the attention of the person is directed to the user of device 101 (e.g., in the case of people), the user of device 101 is engaging with the person (e.g., in the case of people), etc. For example, in some embodiments, the fewer of the break through factors described herein and with reference to method 1400 a given object or person satisfies, the lower the confidence associated with that break through, and the more of the break through factors described herein and with reference to method 1400 a given object or person satisfies, the higher the confidence associated with that break through. In some embodiments, as the confidence of a given break through increases, device 101 displays the representation of that person, object, etc. through user interface 1334 with less translucency, more color saturation, higher brightness, etc. and/or displays the portion of user interface 1334 through which the representation of that person, object, etc. is displayed with more translucency, less color saturation, lower brightness, etc. For example, in FIG. 13B, device 101 has determined with relatively high confidence that the attention of person 1308a is directed to the user of device 101—therefore, device 101 is optionally displaying representation 1308b of person 1308a through user interface 1334 with relatively low translucency, relatively high color saturation, relatively high brightness, etc. and/or displaying the portion of user interface 1334 through which representation 1308b is being displayed with relatively high translucency, relatively low color saturation, relatively low brightness, etc. In contrast, in FIG. 13B, device 101 has optionally determined with relatively low confidence that object 1306a is a high risk object—therefore, device 101 is optionally displaying representation 1306b of object 1306a through user interface 1334 with relatively high translucency, relatively low color saturation, relatively low brightness, etc. and/or displaying the portion of user interface 1334 through which representation 1306b is being displayed with relatively low translucency, relatively high color saturation, relatively high brightness, etc.

In some embodiments, device 101 breaks through objects or people that are within threshold distance 1340 of device 101 whether or not those objects are high risk, the attention of those people is directed to the user of device 101, or the user of device 101 is engaging with those people. For example, in FIG. 13C, device 101 has detected tree 1304a within threshold distance 1340 of device 101. Tree 1304a is optionally not a high risk object (e.g., does not satisfy the high risk criteria described herein and/or with reference to method 1400), but because tree 1304a is within threshold distance 1340 of device, device 101 optionally displays representation 1304b of tree 1304a through user interface 1334, as shown in FIG. 13C. Further, in FIG. 13C, device 101 has determined that ball 1306a is no longer, or is not, a high risk object; therefore, because ball 1306a is further than threshold distance 1340 from device 101, device 101 is not displaying a representation of ball 1306a through user interface 1334. Finally, in contrast with FIG. 13A, in FIG. 13C, device 101 has determined that the attention of person 1302a is directed to the user of device 101, and the attention of person 1308a is not directed to the user of device 101; as such, because people 1302a and 1308a are further than threshold distance 1340 from device 101, device 101 displays representation 1302b of person 1302a through user interface 1334, but does not display a representation of person 1308a through user interface 1334.

FIGS. 14A-14F is a flowchart illustrating a method 1400 of allowing objects, people, and/or portions of an environment to be visible through a user interface displayed by the electronic device in accordance with some embodiments. In some embodiments, the method 1400 is performed at a computer system (e.g., computer system 101 in FIG. 1 such as a tablet, smartphone, wearable computer, or head mounted device) including a display generation component (e.g., display generation component 120 in FIGS. 1, 3, and 4) (e.g., a heads-up display, a display, a touchscreen, a projector, etc.) and one or more cameras (e.g., a camera (e.g., color sensors, infrared sensors, and other depth-sensing cameras) that points downward at a user's hand or a camera that points forward from the user's head). In some embodiments, the method 1400 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 1400 are, optionally, combined and/or the order of some operations is, optionally, changed.

In the method 1400, in some embodiments, an electronic device (e.g., computer system 101 in FIG. 1) in communication with a display generation component and one or more input devices (e.g., a mobile device (e.g., a tablet, a smartphone, a media player, or a wearable device), or a computer) displays (1402) a user interface that includes a user interface element, such as user interface 1334 in FIG. 13A. In some embodiments, the electronic device is a mobile device (e.g., a tablet, a smartphone, a media player, or a wearable device), or a computer. In some embodiments, the display generation component is a display integrated with the electronic device (optionally a touch screen display), external display such as a monitor, projector, television, or a hardware component (optionally integrated or external) for projecting a user interface or causing a user interface to be visible to one or more users, etc. In some embodiments, the electronic device is in communication with one or more input devices that include an electronic device or component capable of receiving a user input (e.g., capturing a user input, detecting a user input, etc.) and transmitting information associated with the user input to the electronic device. Examples of input devices include a touch screen, mouse (e.g., external), trackpad (optionally integrated or external), touchpad (optionally integrated or external), remote control device (e.g., external), another mobile device (e.g., separate from the electronic device), a handheld device (e.g., external), a controller (e.g., external), a camera, a depth sensor, a motion sensor (e.g., a hand tracking device, a hand motion sensor), a physical mechanical input element included in the electronic device (e.g., a button, a rotating mechanical element, a switch, etc.) and/or an eye tracking device, etc.

In some embodiments, the electronic device displays a three-dimensional environment, such as a computer-generated reality (CGR) environment such as a virtual reality (VR) environment, a mixed reality (MR) environment, or an augmented reality (AR) environment, etc. that is generated, displayed, or otherwise caused to be viewable by the electronic device. In some embodiments, the user interface element is a virtual element or object (e.g., a user interface of an application on the electronic device, a virtual object displayed in the three-dimensional environment, etc.). In some embodiments, the electronic device is not displaying a three-dimensional environment, but rather simply displaying content (e.g., the user interface with the user interface element) via the display generation component.

In some embodiments, the user interface element at least partially obscures display, via the display generation component, of a respective person in a physical environment of the electronic device (1404), such as obscuring display of people 1302a and 1308a in FIG. 13A (e.g., the display generation component optionally passes through the physical environment of the electronic device to the extent that virtual content displayed by the electronic device is not displayed overlaid on portions of that physical environment). In some embodiments, the user interface element displayed by the electronic device is displayed "in front of" or closer to the viewpoint of the electronic device than the respective person in the physical environment of the electronic device. As such, the user interface element optionally obscures/blocks display of a representation of the respective person via the display generation component (e.g., fully obscures display of the representation of the respective person (e.g., the user interface element is fully opaque and/or fully covers the representation of the respective person) or partially obscures display of the representation of the respective person (e.g., the user interface element is translucent and/or does not fully cover the representation of the respective person)). In some embodiments, the user interface and/or its content occludes an entirety of the physical environment such that no portion of the physical environment is visible via the display generation component. In some embodiments, the user interface and/or its content occludes less than an entirety of the physical environment such that portions of the physical environment are visible via the display generation component, while other portions (e.g., the respective person) are not visible via the display generation component. In some embodiments, the electronic device displays the user interface at a respective level of immersion as described with reference to methods 1000, 1200 and 1600.

In some embodiments, while displaying the user interface (1406), in accordance with a determination that the respective person is further than a threshold distance from the electronic device in the physical environment, such as people 1302*a* and 1308*a* in FIG. 13A (e.g., the person is further than 1, 3, 5, 10, 15, 50, 100, etc. feet from the electronic device. In some embodiments, the respective person, if visible via the display generation component, would be displayed in the three-dimensional environment displayed by the electronic device as being more than 1, 3, 5, 10, 15, 50, 100, etc. feet from the viewpoint of the electronic device in the three-dimensional environment) and that an attention of the respective person is directed to a user of the electronic device, such as person 1308*a* in FIG. 13A (e.g., the electronic device optionally includes one or more cameras, microphones, or other sensors that are able to detect the attention state of the respective person in the physical environment of the electronic device. In some embodiments, if the respective person is looking towards the electronic device and/or the user of the electronic device, the attention of the respective person is directed to the user of the electronic device. In some embodiments, if the respective person is speaking towards the electronic device and/or the user of the electronic device, the attention of the respective person is directed to the user of the electronic device. In some embodiments, an electronic device associated with the respective person (e.g., other than the electronic device) detects, using sensors in communication with that electronic device, the relevant attention of the respective person and transmits such attention information to the electronic device, which then responds accordingly.), the electronic device updates (1408) display of the user interface element to indicate a presence of the respective person in the physical environment at a location that corresponds to the user interface element, such as displaying representation 1308*b* in FIG. 13A (e.g., ceasing to display the user interface element, such that it is no longer "in front of" the respective person via the display generation component, and therefore such that a representation of the respective person, in the physical environment of the electronic device, is visible via the display generation component). In some embodiments, the electronic device increases a translucency of the user interface element such that the respective person becomes visible (or more visible) through the user interface element. In some embodiments, the electronic device moves the user interface element in the user interface such that it is no longer "in front of" the respective person in the physical environment of the electronic device. In some embodiments, the electronic device reduces a degree to which the user interface element obscures display of the respective person via the display generation component. In some embodiments, the electronic device visually indicates the presence and/or attention of the respective person. In some embodiments, the electronic device blurs or otherwise changes the visual appearance of the user interface element. In some embodiments, the electronic device updates the entirety of the displayed user interface (e.g., everything displayed in the user interface) as described above. In some embodiments, the electronic device only updates the portion of the user interface (e.g., the objects displayed in that portion of the user interface) that occludes the respective person, and does not modify display of the remainder of the user interface.

In some embodiments, in accordance with a determination the respective person is further than the threshold distance from the electronic device in the physical environment and that the attention of the respective person is not directed to the user of the electronic device (e.g., the respective person is not looking at and/or speaking towards the electronic device and/or the user of the electronic device), the electronic device forgoes updating (1410) the display of the user interface element, such as not displaying a representation of person 1302*a* in user interface 1334 in FIG. 13A. For example, not modifying display of the user interface and/or user interface element. As such, the user interface element optionally continues to obscure display of the respective person via the display generation component to the same degree as it was before. The above-described manner of selectively changing display of the user interface based on attention provides a quick and efficient manner of allowing the user of the electronic device to see a person in the physical environment of the electronic device via the display generation component, but only when interaction with the respective person is likely, which simplifies the interaction between the user and the electronic device and enhances the operability of the electronic device and makes the user-device interface more efficient (e.g., by not unnecessarily updating display of the user interface, thus maintaining continuity of the displayed user interface and avoiding user inputs to revert an erroneous update of the user interface), which additionally reduces power usage and improves battery life of the electronic device by enabling the user to use the electronic device more quickly and efficiently, while reducing errors in usage.

In some embodiments, while displaying the user interface (1412), in accordance with a determination that the respective person is closer than the threshold distance (e.g., 3, 5, 10, 15, etc.) from the electronic device in the physical environment, the electronic device updates (1414) display of the user interface element to indicate the presence of the respective person in the physical environment at the location that corresponds to the user interface element (e.g., whether or not the attention of the respect person is directed to the user of the electronic device). Therefore, in some embodiments, the electronic device updates display of the user interface element to indicate the presence of the respective person (e.g., as described previously) when the respective person is close, irrespective of the attention state of the respective person. The above-described manner of changing display of the user interface when a person is close to the electronic device provides a quick and efficient manner of allowing the user of the electronic device to see a close person in the physical environment of the electronic device via the display generation component, which simplifies the interaction between the user and the electronic device and enhances the operability of the electronic device and makes the user-device interface more efficient (e.g., by not requiring separate user input to indicate the presence of the respective person in the physical environment), which additionally reduces power usage and improves battery life of the electronic device by enabling the user to use the electronic device more quickly and efficiently, while reducing errors in usage.

In some embodiments, determining that the attention of the respective person is directed to the user of the electronic device is based on one or more gestures performed by the respective person detected by one or more sensors (e.g., one or more optical or other cameras capturing the physical environment of the electronic device, including the respective person) in communication with the electronic device (1416), such as described with reference to FIGS. 13A-13C. For example, if the electronic device detects that the respective person is pointing at, waving to, or otherwise gesturing towards the user of the electronic device with, for example, one or more hands of the respective person (e.g., in some embodiments, independent of how long the respective person is gesturing towards the user, and in some embodiments, after gesturing towards the user for longer than a time threshold such as 1, 3, 5, 10, 20, etc. seconds), the electronic device optionally determines that the attention of the respective person is directed to the user of the electronic device. In some embodiments, the electronic device determines that the attention of the respective person is directed to the user of the electronic device based on an above-described gesture in conjunction with one or more other factors described here (e.g., gaze of the respective person, speech of the respective person, speed and/or movement of the respective person, etc.), and determines that the attention of the respective person is not directed to the user of the electronic device when the above-described gesture is detected without detecting one or more of the other factors described herein. The above-described manner of determining attention of the respective person based on gestures from the respective person provides a quick and efficient manner of allowing the user of the electronic device to see a person in the physical environment of the electronic device via the display generation component when interaction with the respective person is likely, which simplifies the interaction between the user and the electronic device and enhances the operability of the electronic device and makes the user-device interface more efficient (e.g., by not unnecessarily updating display of the user interface, thus maintaining continuity of the displayed user interface and avoiding user inputs to revert an erroneous update of the user interface), which additionally reduces power usage and improves battery life of the electronic device by enabling the user to use the electronic device more quickly and efficiently, while reducing errors in usage.

In some embodiments, determining that the attention of the respective person is directed to the user of the electronic device is based on a gaze of the respective person detected by one or more sensors (e.g., one or more optical or other cameras capturing the physical environment of the electronic device, including the respective person) in communication with the electronic device (1418), such as described with reference to FIGS. 13A-13C. For example, if the electronic device detects that the respective person is looking at or towards (e.g., within a range of positions at or within a threshold distance, such as 0.5, 1, 3, 5, 10, 20 feet surrounding the user of the electronic device) the user of the electronic device (e.g., in some embodiments, independent of how long the respective person is looking towards the user, and in some embodiments, after looking towards the user for longer than a time threshold such as 1, 3, 5, 10, 20, etc. seconds), the electronic device optionally determines that the attention of the respective person is directed to the user of the electronic device. In some embodiments, the electronic device determines that the attention of the respective person is directed to the user of the electronic device based on an above-described gaze in conjunction with one or more other factors described here (e.g., gesture(s) of the respective person, speech of the respective person, speed and/or movement of the respective person, etc.), and determines that the attention of the respective person is not directed to the user of the electronic device when the above-described gaze is detected without detecting one or more of the other factors described herein. The above-described manner of determining attention of the respective person based on gaze from the respective person provides a quick and efficient manner of allowing the user of the electronic device to see a person in the physical environment of the electronic device via the display generation component when interaction with the respective person is likely, which simplifies the interaction between the user and the electronic device and enhances the operability of the electronic device and makes the user-device interface more efficient (e.g., by not unnecessarily updating display of the user interface, thus maintaining continuity of the displayed user interface and avoiding user inputs to revert an erroneous update of the user interface), which additionally reduces power usage and improves battery life of the electronic device by enabling the user to use the electronic device more quickly and efficiently, while reducing errors in usage.

In some embodiments, determining that the attention of the respective person is directed to the user of the electronic device is based on detected speech from the respective person detected by one or more sensors (e.g., one or more microphones capturing sound from the physical environment of the electronic device, including the respective person) in communication with the electronic device (1420), such as described with reference to FIGS. 13A-13C. For example, if the electronic device detects that the respective person is speaking a greeting (e.g., "Hello everyone!") or is otherwise speaking towards the user of the electronic device (e.g., in some embodiments, independent of how long the respective person is speaking towards the user, and in some embodiments, after speaking towards the user for longer than a time threshold such as 1, 3, 5, 10, 20, etc. seconds), the electronic device optionally determines that the attention of the respective person is directed to the user of the electronic device. In some embodiments, the electronic device determines that the attention of the respective person is directed to the user of the electronic device based on an above-described speech in conjunction with one or more other factors described here (e.g., gesture(s) of the respective person, gaze of the respective person, speed and/or movement of the respective person, etc.), and determines that the attention of the respective person is not directed to the user of the electronic device when the above-described speech is detected without detecting one or more of the other factors described herein. The above-described manner of determining attention of the respective person based on speech from the respective person provides a quick and efficient manner of allowing the user of the electronic device to see a person in the physical environment of the electronic device via the display generation component when interaction with the respective person is likely, which simplifies the interaction between the user and the electronic device and enhances the operability of the electronic device and makes the user-device interface more efficient (e.g., by not unnecessarily updating display of the user interface, thus maintaining continuity of the displayed user interface and avoiding user inputs to revert an erroneous update of the user interface), which additionally reduces power usage and improves battery life of the electronic device by enabling the user to use the electronic device more quickly and efficiently, while reducing errors in usage.

In some embodiments, determining that the attention of the respective person is directed to the user of the electronic device is based on a determination that the electronic device has detected that the speech from the respective person includes a name of the user of the electronic device (1422), such as described with reference to FIGS. 13A-13C. For example, if the respective person speaks the user's name, in some embodiments in any context (e.g., in a non-greeting statement, such as "I saw Tom (user) at the store today"), and in some embodiments in a particular context only (e.g., in a greeting statement, such as "Hi, Tom (user)"), the electronic device optionally determines that the attention of the respective person is directed to the user of the electronic device. In some embodiments, the electronic device determines that the attention of the respective person is directed to the user of the electronic device based on an above-described speaking of the user's name in conjunction with one or more other factors described here (e.g., gesture(s) of the respective person, gaze of the respective person, speed and/or movement of the respective person, etc.), and determines that the attention of the respective person is not directed to the user of the electronic device when the above-described speaking of the user's name is detected without detecting one or more of the other factors described herein. The above-described manner of determining attention of the respective person based on speaking of the user's name from the respective person provides a quick and efficient manner of allowing the user of the electronic device to see a person in the physical environment of the electronic device via the display generation component when interaction with the respective person is likely, which simplifies the interaction between the user and the electronic device and enhances the operability of the electronic device and makes the user-device interface more efficient (e.g., by not unnecessarily updating display of the user interface, thus maintaining continuity of the displayed user interface and avoiding user inputs to revert an erroneous update of the user interface), which additionally reduces power usage and improves battery life of the electronic device by enabling the user to use the electronic device more quickly and efficiently, while reducing errors in usage.

In some embodiments, determining that the attention of the respective person is directed to the user of the electronic device is based on a (e.g., speed of) movement of the respective person (e.g., towards the user of the electronic device) detected by one or more sensors (e.g., one or more optical or other cameras capturing the physical environment of the electronic device, including the respective person) in communication with the electronic device (1424), such as described with reference to FIGS. 13A-13C. For example, if the electronic device detects that the respective person is moving towards the user of the electronic device (e.g., the trajectory of the respective person based on the current movement of the respective person would lead the respective person to a distance less than a threshold distance, such as 0.5, 1, 3, 5, 10, 20 feet from the user of the electronic device), the electronic device optionally determines that the attention of the respective person is directed to the user of the electronic device. In some embodiments, the electronic device optionally requires the speed of the movement of the respective person to satisfy certain criteria (e.g., speed higher than a threshold such as 0.3 m/s, 0.5 m/s, 1 m/s, 3 m/s, 5 m/s, 10 m/s, 20 m/s; speed lower than threshold; etc.) in addition to the respective person moving towards the user of the electronic device, at which point the electronic device optionally determines that the attention of the respective person is directed to the user of the electronic device (and optionally does not so determine otherwise). In some embodiments, the electronic device determines that the attention of the respective person is directed to the user of the electronic device based on an above-described speed and/or movement of the respective person in conjunction with one or more other factors described here (e.g., gesture(s) of the respective person, gaze of the respective person, speech of the respective person, etc.), and determines that the attention of the respective person is not directed to the user of the electronic device when the above-described speed and/or movement of the respective person is detected without detecting one or more of the other factors described herein. The above-described manner of determining attention of the respective person based on the speed and/or movement of the respective person provides a quick and efficient manner of allowing the user of the electronic device to see a person in the physical environment of the electronic device via the display generation component when interaction with the respective person is likely, which simplifies the interaction between the user and the electronic device and enhances the operability of the electronic device and makes the user-device interface more efficient (e.g., by not unnecessarily updating display of the user interface, thus maintaining continuity of the displayed user interface and avoiding user inputs to revert an erroneous update of the user interface), which additionally reduces power usage and improves battery life of the electronic device by enabling the user to use the electronic device more quickly and efficiently, while reducing errors in usage.

In some embodiments, while displaying the user interface, the electronic device detects (1426) that the user of the electronic device is engaged in an interaction with the respective person. In some embodiments, in response to detecting that the user of the electronic device is engaged in the interaction with the respective person, the electronic device updates (1428) display of the user interface element to indicate the presence of the respective person in the physical environment at the location that corresponds to the user interface element, such as described with reference to FIGS. 13A-13C. For example, if the electronic device detects, using one or more sensors (e.g., an eye tracking device for detecting gaze of the user of the electronic device, a hand tracking device for detecting hand gestures and/or hand movement for the user of the electronic device, a microphone for detecting speech from the user of the electronic device, an accelerometer, gyroscope and/or other inertial measurement unit (IMU) that detects movement of the electronic device) that the user of the electronic device is gesturing towards the respective person (e.g., similarly to gestures detected from the respective person, as previously described), speaking towards the respective person (e.g., similarly to speech detected from the respective person, as previously described), moving towards the respective person (e.g., similarly to speed and/or movement detected from the respective person, as previously described), looking towards the respective person (e.g., similarly to gaze detected from the respective person, as previously described) and/or etc., the electronic device optionally determines that the user of the electronic device is engaged with the respective person. In some embodiments, the electronic device determines that the user is engaged with the respective person based on one of the above-described factors (e.g., gestures, speech, movement, gaze); in some embodiments, the electronic device determines that the user is engaged with the respective person based on two or more of the above-described factors, and determines that the user is not engaged with the respective person if only one of the above-described factors is detected. In some embodiments, the electronic device requires at least one of the above-described user-based factors (e.g., gestures, speech, movement of the user, gaze) and at least one or more above-described respective person-based factors (e.g., gesture(s) of the respective person, gaze of the respective person, speed and/or movement of the respective person, speech from the respective person) to determine that the user is engaged with the respective person, and determines that the user is not engaged with the respective person otherwise. In some embodiments, if the electronic device determines that the user is not engaged with the respective person, the electronic device optionally does not update display of the user interface element to indicate the presence of the respective person in the physical environment (in some embodiments, unless the electronic device does so based on an attention of the respective person, as previously described). The above-described manner of changing display of the user interface based on engagement of the user with the respective person provides a quick and efficient manner of allowing the user of the electronic device to see a person in the physical environment of the electronic device via the display generation component, but only when interaction with the respective person is likely, which simplifies the interaction between the user and the electronic device and enhances the operability of the electronic device and makes the user-device interface more efficient (e.g., by not unnecessarily updating display of the user interface, thus maintaining continuity of the displayed user interface and avoiding user inputs to revert an erroneous update of the user interface), which additionally reduces power usage and improves battery life of the electronic device by enabling the user to use the electronic device more quickly and efficiently, while reducing errors in usage.

In some embodiments, updating display of the user interface element to indicate the presence of the respective person in the physical environment at the location that corresponds to the user interface element includes (1430), in accordance with a determination that one or more first criteria are satisfied, changing display of the user interface element by a first amount (e.g., if less than a threshold number (e.g., two, three) of the multiple above-described factors (e.g., gesture(s) of the respective person, gaze of the respective person, speed and/or movement of the respective person, speech from the respective person, gesture(s) of the user, gaze of the user, speed and/or movement of the user, speech from the user) is satisfied, the electronic device optionally updates the user interface element in a first manner, such as moving the user interface element by a first amount, increasing a transparency of the user interface element by a first amount, blurring the user interface element by a first amount, updating a first portion of the user interface, and/or etc.). In some embodiments, updating (1432) display of the user interface element to indicate the presence of the respective person in the physical environment at the location that corresponds to the user interface element includes, in accordance with a determination that one or more second criteria, different from the first criteria, are satisfied, changing (1434) display of the user interface element by a second amount, different from the first amount, such as the differing displays of representation 1306b in FIGS. 13A and 13B. For example, if more than the threshold number (e.g., two, three) of the multiple above-described factors (e.g., gesture(s) of the respective person, gaze of the respective person, speed and/or movement of the respective person, speech from the respective person, gesture(s) of the user, gaze of the user, speed and/or movement of the user, speech from the user) is satisfied, the electronic device optionally updates the user interface element in a second manner, different from the first manner, such as moving the user interface element by a second amount, different from (e.g., greater than) the first amount, increasing a transparency of the user interface element by a second amount, different from (e.g., greater than) the first amount, blurring the user interface element by a second amount, different from (e.g., greater than) the first amount, updating a second portion of the user interface, different from (e.g., greater than) the first portion, and/or etc. Therefore, in some embodiments, as more respective person-attention and/or user-engagement factors are detected by the electronic device, the electronic device optionally updates display of the user interface element to, for example, make the representation of the respective person more visible via the display generation component. In some embodiments, as fewer respective person-attention and/or user-engagement factors are detected by the electronic device, the electronic device optionally updates display of the user interface element to, for example, make the representation of the respective person less visible via the display generation component. As such, the higher the confidence that the attention of the respective person is directed towards the user and/or the user is engaged with the respective person, the more drastically the electronic device updates the display of the user interface element, and the less the confidence that the attention of the respective person is directed towards the user and/or the user is engaged with the respective person, the less drastically the electronic device updates the display of the user interface. The above-described manner of changing display of the user interface by (e.g., gradual) different amounts depending on the confidence with which the attention of the respective person is determined (or engagement with the respective person is determined) provides a quick and efficient manner of allowing the user of the electronic device to see a person in the physical environment of the electronic device via the display generation component to the extent that interaction with the respective person is likely, which simplifies the interaction between the user and the electronic device and enhances the operability of the electronic device and makes the user-device interface more efficient (e.g., by not unnecessarily updating display of the user interface, thus maintaining continuity of the displayed user interface and avoiding user inputs to revert an erroneous update of the user interface), which additionally reduces power usage and improves battery life of the electronic device by enabling the user to use the electronic device more quickly and efficiently, while reducing errors in usage.

In some embodiments, the user interface includes a respective user interface element that at least partially obscures display, via the display generation component, of a respective object in a physical environment of the electronic device (1436), such as objects 1304a and 1306a in FIGS. 13A-13C (e.g., ceiling fan, stairs, an elevation drop-off in the physical environment, other objects, etc. In some embodiments, the object is an object that may collide with the user. In some embodiments, the object is an object that may cause injury to the user). In some embodiments, while displaying the user interface (1438), in accordance with a determination that the respective object is further than a respective threshold distance (e.g., the same as the threshold distance relevant with respect to the respective person, or different from (e.g., further or closer than) the threshold distance relevant with respect to the respective person) from the electronic device in the physical environment, such as objects 1304a and 1306a in FIG. 13B (e.g., the object is further than 3, 5, 10, 15, 30, 50, etc. feet from the electronic device. In some embodiments, the object, if visible via the display generation component, would be displayed in the three-dimensional environment displayed by the electronic device as being more than 3, 5, 10, 15, 30, 50, etc. feet from the viewpoint of the electronic device in the three-dimensional environment), and that the respective object satisfies one or more first criteria, such as object 1306b in FIG. 13A (e.g., the object is a potentially dangerous object to the user. For example, an object moving towards the user at a sufficient speed (e.g., faster than 0.5 m/s, 1 m/s, 2 m/s, 4 m/s, 10 m/s, 20 m/s) such that collision with the user would likely cause the user injury. In some embodiments, additionally or alternatively, an object for which the trajectory and/or speed of the object indicates the object will collide with the user. In some embodiments, additionally or alternatively, an object for which the trajectory and/or speed of the user indicates the user will collide with or arrive at the object (e.g., a table, a drop-off or stairs the user could fall down if not aware of the object, etc.)), the electronic device updates (1440) display of the respective user interface element to indicate the presence of the respective object in the physical environment at the location that corresponds to the respective user interface element, such as displaying representation 1306*b* in FIG. 13A (e.g., in the same or similar manner as previously described with reference to updating display of the user interface element to indicate the presence of the respective person in the physical environment at the location that corresponds to the user interface element).

In some embodiments, in accordance with a determination that the respective object is further than the respective threshold distance from the electronic device in the physical environment, and that the respective object does not satisfy the one or more first criteria, such as for object 1304*a* in FIG. 13A (e.g., the object is not a potentially dangerous object to the user. For example, an object moving towards the user at a low speed (e.g., lower than 0.5 m/s, 1 m/s, 2 m/s, 4 m/s, 10 m/s, 20 m/s) such that collision with the user would likely not cause the user injury. In some embodiments, additionally or alternatively, an object for which the trajectory and/or speed of the object indicates the object will not collide with the user. In some embodiments, additionally or alternatively, an object for which the trajectory and/or speed of the user indicates the user will not collide with or arrive at the object (e.g., a table, a drop-off or stairs the user could fall down if not aware of the object, etc.)), the electronic device forgoes updating (1442) the display of the respective user interface element, such as not displaying a representation of object 1304*a* in user interface 1334 in FIG. 13A (e.g., in the same or similar manner as previously described with reference to forgoing updating display of the user interface element to indicate the presence of the respective person in the physical environment at the location that corresponds to the user interface element). In some embodiments, in accordance with a determination that the respective object is closer than the respective threshold distance to the electronic device in the physical environment, such as object 1304*a* in FIG. 13C (e.g., whether or not the respective object satisfies the one or more first criteria), the electronic device updates (1444) display of the respective user interface element to indicate the presence of the respective object in the physical environment at the location that corresponds to the respective user interface element, such as displaying representation 1304*b* in FIG. 13C (e.g., in the same or similar manner as previously described with reference to updating display of the user interface element to indicate the presence of the respective person in the physical environment at the location that corresponds to the user interface element). The above-described manner of selectively changing display of the user interface based on the existence of objects in the physical environment of the electronic device provides a quick and efficient manner of allowing the user of the electronic device to see the physical environment of the electronic device via the display generation component, but only when likely relevant (e.g., for safety when using the electronic device), which simplifies the interaction between the user and the electronic device and enhances the operability of the electronic device and makes the user-device interface more efficient (e.g., by not unnecessarily updating display of the user interface when there are no objects in the physical environment of the electronic device, thus maintaining continuity of the displayed user interface and avoiding user inputs to reverse an erroneous update of the user interface), which additionally reduces power usage and improves battery life of the electronic device by enabling the user to use the electronic device more quickly and efficiently, while reducing errors in usage.

In some embodiments, before updating display of the user interface element to indicate the presence of the respective person in the physical environment at the location that corresponds to the user interface element, a first respective portion of the user interface surrounding a second respective portion of the user interface corresponding to the location of the respective person in the physical environment is displayed with a visual characteristic having a first value (1446) (e.g., the portion of the user interface element that would surround the representation of the respective person if the representation of the respective person were visible through the user interface element is displayed in a non-blurred state, with a first color profile, at a first brightness, at a first translucency, etc.). In some embodiments, after updating display of the user interface element to indicate the presence of the respective person in the physical environment at the location that corresponds to the user interface element, the first respective portion of the user interface surrounding the second respective portion of the user interface corresponding to the location of the respective person in the physical environment is displayed with the visual characteristic having a second value, different from the first value (1448) (e.g., the portion of the user interface element that surrounds the representation of the respective person that is visible through the user interface element is displayed in a blurred state, with a second color profile, different from the first color profile, at a second brightness, different from the first brightness, at a second translucency, different from the first translucency, etc.). For example, in some embodiments, the portions of the user interface displayed surrounding the representation of the respective person visible via the display generation component are displayed with a visual effect (e.g., blurred, more transparent, etc.). In some embodiments, the portions of the user interface surrounding the representation of the respective person are those portions of the user interface within a threshold distance (e.g., 0.5, 1, 3, 5, 20 feet) of (e.g., the boundary of) the representation of the respective person displayed via the display generation component. In some embodiments, the portions of the user interface further than the threshold distance of (e.g., the boundary of) the representation of the respective person are not displayed with the visual effect (e.g., are not altered as a result of the updating of the display of the user interface element based on the respective person, are displayed non-blurred, are displayed less transparent, etc.). In some embodiments, the visual effect applied to the user interface decreases in magnitude the as a function of the distance from (e.g., the boundary of) the representation of the respective person. The above-described manner of changing the user interface by different amounts based on distance from the representation of the respective person reduces visual clutter in the user interface, which simplifies the interaction between the user and the electronic device and enhances the operability of the electronic device and makes the user-device interface more efficient (e.g., by helping to clearly indicate the presence of the respective user as being separate from the content of the user interface), which additionally reduces power usage and improves battery life of the electronic device by enabling the user to use the electronic device more quickly and efficiently, while reducing errors in usage.

Figure 15A:
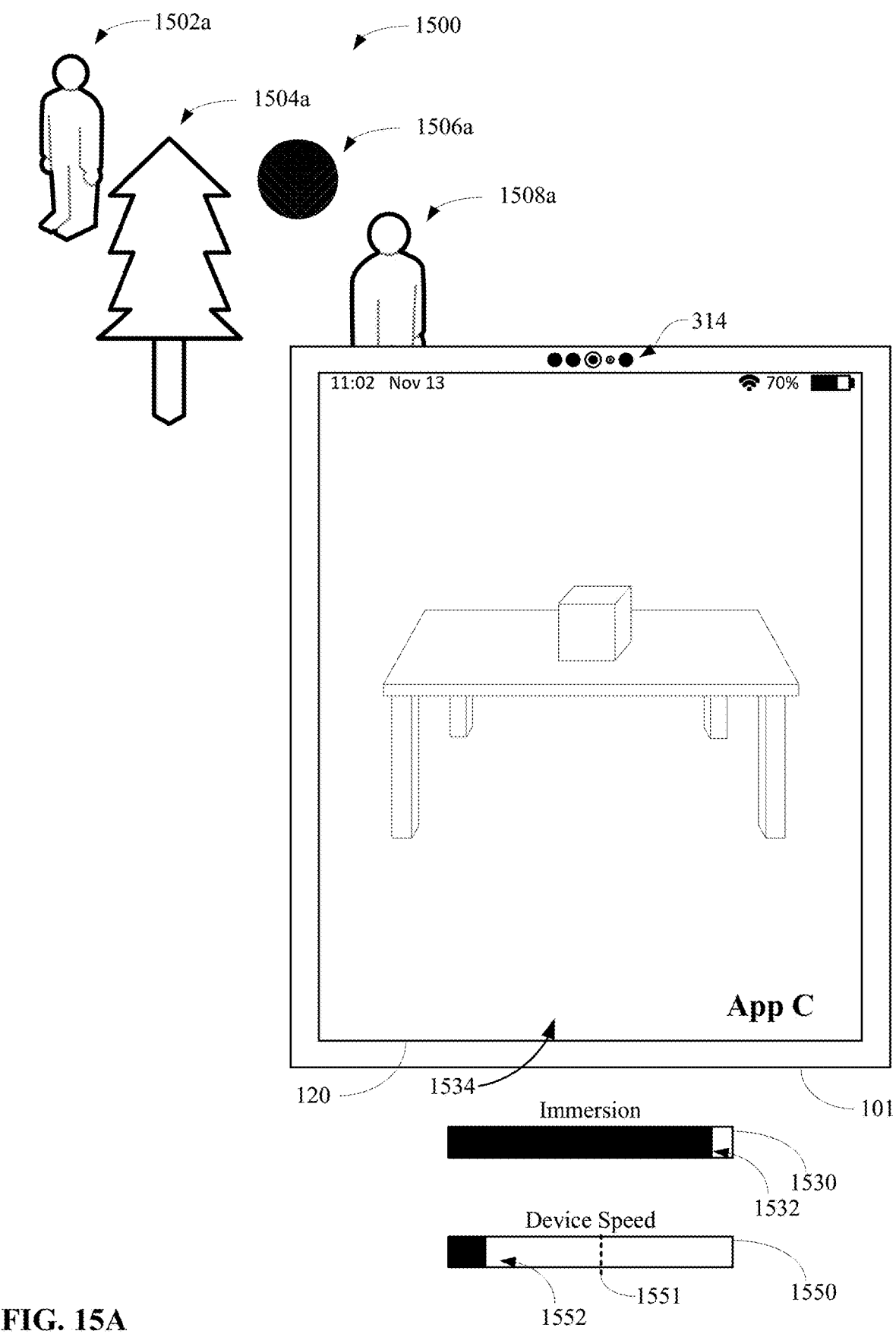
FIGS. 15A-15C illustrate examples of reducing the level of immersion associated with a user interface based on characteristics of the electronic device and/or physical environment of the electronic device in accordance with some embodiments.
Figure 15B:
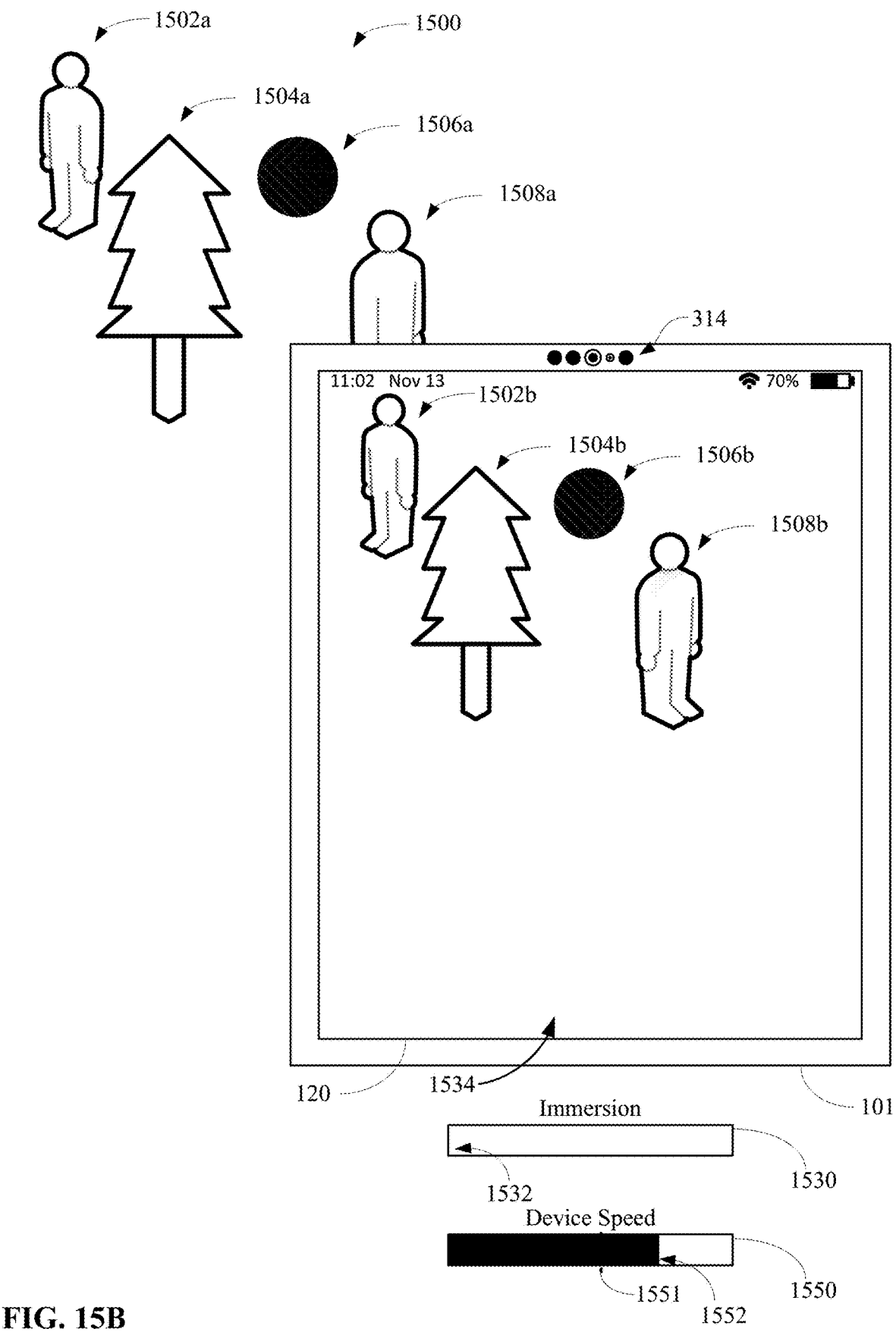
Figure 15C:
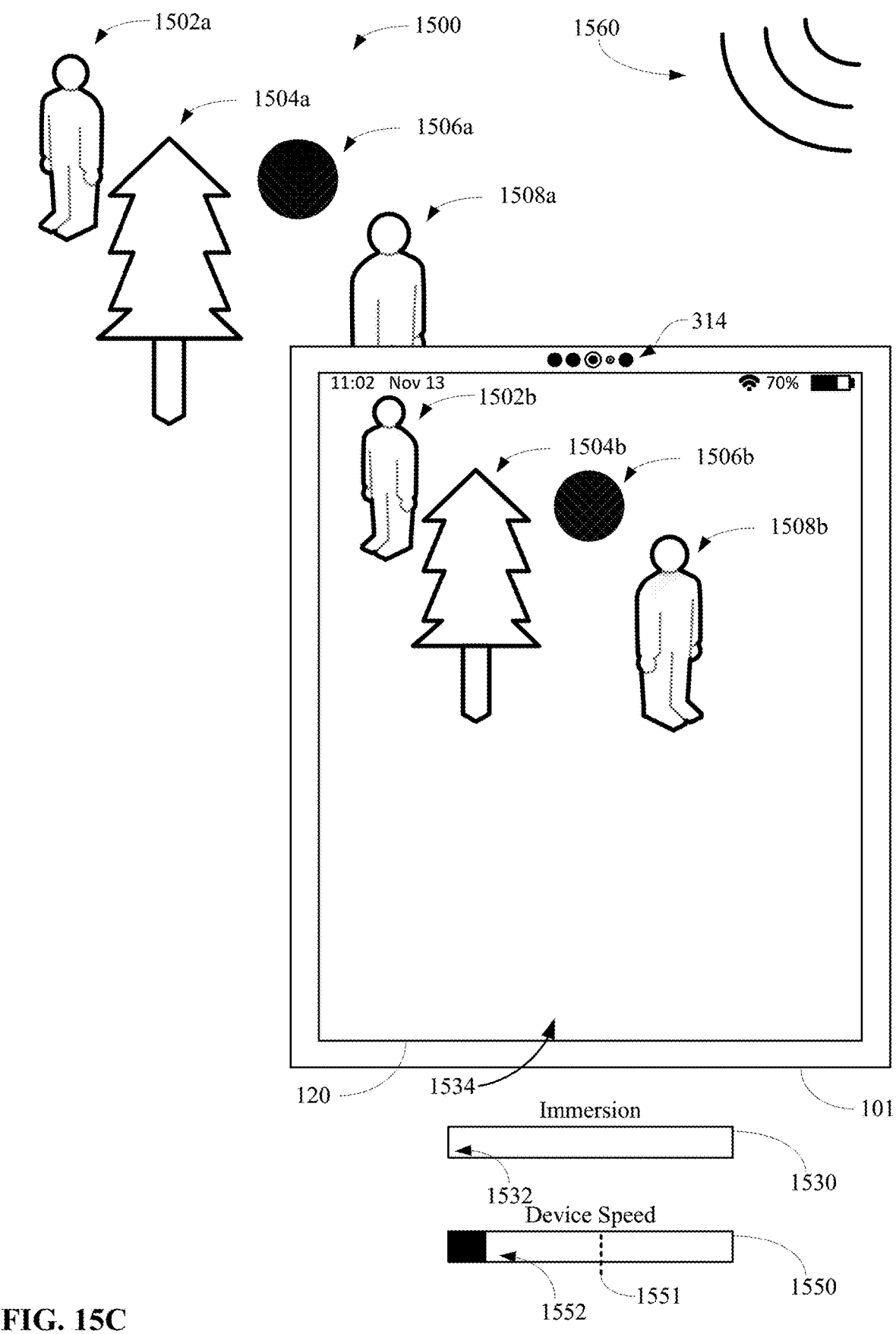

FIGS. 15A-15C illustrate examples of an electronic device reducing the level of immersion at which it is displaying user interface(s) based on characteristics of the device and/or characteristics of the environment of the device in accordance with some embodiments.

FIG. 15A illustrates an electronic device 101 displaying, via a display generation component (e.g., display generation component 120 of FIG. 1), a user interface 1534. As described above with reference to FIGS. 1-6, the electronic device 101 optionally includes a display generation component (e.g., a touch screen) and a plurality of image sensors (e.g., image sensors 314 of FIG. 3). The image sensors optionally include one or more of a visible light camera, an infrared camera, a depth sensor, or any other sensor the electronic device 101 would be able to use to capture one or more images of a user or a part of the user while the user interacts with the electronic device 101. In some embodiments, the user interfaces shown below could also be implemented on a head-mounted display that includes a display generation component that displays the user interface to the user and sensors to detect the physical environment and/or movements of the user's hands (e.g., external sensors facing outwards from the user), and/or gaze of the user (e.g., internal sensors facing inwards towards the face of the user).

Device 101 optionally captures one or more images of the physical environment 1500 around device 101 (e.g., operating environment 100), including one or more objects in the physical environment 1500 around device 101. For example, in FIG. 15A, physical environment 1500 includes two objects (e.g., tree 1504a and ball 1506a), and two people (e.g., person 1502a and person 1508a). In FIG. 15A, device 101 is displaying user interface 1534 (e.g., of application App C) at a relatively high (e.g., maximum) level of immersion 1532 on immersion scale 1530. For example, the display of FIG. 15A is optionally a result of device 101 detecting an input to increase the level of immersion of user interface 1534 to the level of immersion 1532 using an input element of device 101 (e.g., input element 920 of device 101, such as described with reference to FIG. 9A). In some embodiments, user interface 1534 is a user interface of an operating system of device 101 as opposed to a user interface of an application. At the level of immersion 1532 at which device 101 is displaying user interface 1534 in FIG. 15A, user interface 1534 is obscuring (e.g., fully obscuring) display of the physical environment 1500 of device 101 (e.g., objects, people, etc. in the physical environment 1500) via display generation component 120, such that the content of user interface 1534 (e.g., a virtual box on a virtual table) is visible via display generation component 120, but representation(s) of physical environment 1500 are not visible via display generation component 120. In some embodiments, details relating to displaying user interface 1534 at a relatively high (e.g., maximum) level of immersion 1532 are as described with reference to method 1000. Although the description of FIGS. 15A-15C is provided in the context of user interface 1534 having a relatively high level of immersion 1532, it is understood that the features of FIGS. 15A-15C and method 1600 optionally apply analogously to any situation in which a virtual element, object, etc. displayed by device 101 at least partially obscures display of any portion of physical environment 1500 via display generation component 120.

In some embodiments, device 101 is able to detect one or more characteristics of device 101 and/or environment 1500, and in response to detecting certain characteristics, device 101 optionally reduces the level of immersion 1532 at which it displays user interface 1534 such that objects, people and/or one or more portions of physical environment 1500 become at least partially visible via display generation component 120 (e.g., when they were not visible, or not fully visible, prior to detecting those characteristics). In some embodiments, device 101 reduces the level of immersion 1532 in response to detecting (e.g., using an accelerometer, a GPS position detector, and/or other inertial measurement unit (IMU)) characteristics of the (e.g., speed of) movement of device 101 (e.g., if device is moving faster than a speed threshold, such as 0.5, 1, 3, 5, 10, 20, 50 miles per hour). In some embodiments, device 101 reduces the level of immersion 1532 in response to detecting (e.g., using a camera, microphone, etc.) characteristics of physical environment 1500 (e.g., if environment 1500 includes a sound associated with a potentially dangerous situation, such as the sound of glass breaking or the sound of a firm alarm). In some embodiments, device 101 only performs the above-described reductions of immersion if device 101 detects objects and/or hazards in environment 1500—if device 101 detects no objects and/or hazards in environment 1500, device 101 optionally does not perform the above speed- and/or sound-based reductions of immersion, even if the required speed and/or sound characteristics are detected by device 101. In some embodiments, device 101 reduces the level of immersion at which device 101 is displaying user interface 1534 to a predetermined, relatively low (e.g., minimum) level of immersion such that display of the entirety of user interface 1534 is modified (e.g., as compared to the response of device 101 in FIGS. 13A-13C in response to different situations, in which the display of portions of user interface 1334 is modified while the display of other portions of user interface 1334 is not modified).

For example, in FIG. 15A, the speed 1552 of device 101 is below a speed threshold 1551 (e.g., 0.5, 1, 3, 5, 10, 20, 50 miles per hour) on speed scale 1550. Therefore, device 101 has not modified the immersion 1532 of user interface 1534, and the objects, people and/or portions of physical environment 1500 remain obscured by user interface 1534.

In FIG. 15B, device 101 detects that the speed 1552 of device 101 has exceeded speed threshold 1551 on speed scale 1550. As a result, device 101 optionally modifies the level of immersion 1532 at which it was displaying user interface 1534. In some embodiments, if device 101 determines that it is traveling in a vehicle (e.g., car, airplane, etc.), it does not modify the level of immersion 1532 in response to detecting speed 1552 above speed threshold 1551. In FIG. 15B, device 101 has reduced the level of immersion 1532 to a minimum level of immersion such that none of user interface 1534 is displayed via display generation component 120, and representations of the objects (e.g., 1504b, 1506b), people (e.g., 1502b, 1508b) and/or portions of physical environment 1500 are fully visible via display generation component 120. In some embodiments, device 101 does not reduce the level of immersion 1532 to a minimum level of immersion, but rather a relatively low (e.g., non-zero) level of immersion. Details relating to the display of user interface 1534 and/or representations 1502b, 1504b, 1506b and 1508b at relatively low levels of immersion are optionally as described with reference to method 1000. Therefore, as described above, device 101 optionally makes the physical environment 1500 of device 101 visible via display generation component 120 when device 101 is moving at a relatively high speed (e.g., above a speed threshold) to help ensure that the user that is using device 101 is able to see the physical environment 1500 via display generation component 120 to avoid potentially dangerous situations that might arise from movement at that speed.

In some embodiments, device 101 returns to displaying user interface 1534 at the previous level of immersion (e.g., the level of immersion at which device 101 was displaying user interface 1534 when the immersion-reducing speed was detected, such as shown in FIG. 15A) in response to detecting the speed 1552 of device 101 falling below speed threshold 1551. In some embodiments, device 101 does not return to displaying user interface 1534 at the previous level of immersion in response to detecting the speed 1552 of device 101 falling below speed threshold 1551—rather, in some embodiments, device 101 requires separate user input for increasing the level of immersion 1532 (e.g., similar to as described with reference to FIGS. 11A-11B) after having reduced it as described with reference to FIG. 15B.

FIG. 15C illustrates a scenario in which device 101 reduces the level of immersion 1532 at which it is displaying user interface 1534 in response to detecting certain characteristics of sound(s) in physical environment 1500. In particular, in FIG. 15B, device 101 detects sound 1560 in environment 1500. Sound 1560 is optionally a sound that is associated with a potentially dangerous situation, such as the sound of something breaking, the voice of a person in the physical environment of the electronic device having a high stress value, the sound of an alarm (e.g., smoke, fire, carbon monoxide, burglar, etc.), etc. As a result, even though speed 1552 of device 101 is below speed threshold 1551, device 101 optionally modifies the level of immersion 1532 at which it was displaying user interface 1534. In FIG. 15C, device 101 has reduced the level of immersion 1532 to a minimum level of immersion such that none of user interface 1534 is displayed via display generation component 120, and representations of the objects (e.g., 1504*b*, 1506*b*), people (e.g., 1502*b*, 1508*b*) and/or portions of physical environment 1500 are fully visible via display generation component 120. In some embodiments, device 101 does not reduce the level of immersion 1532 to a minimum level of immersion, but rather a relatively low (e.g., non-zero) level of immersion. Details relating to the display of user interface 1534 and/or representations 1502*b*, 1504*b*, 1506*b* and 1508*b* at relatively low levels of immersion are optionally as described with reference to method 1000. Therefore, as described above, device 101 optionally makes the physical environment 1500 of device 101 visible via display generation component 120 when device 101 detects a sound associated with a potentially dangerous situation in environment 1500 to help ensure that the user that is using device 101 is able to see the physical environment 1500 via display generation component 120 to avoid potentially dangerous situations that might exist or have arisen in environment 1500.

In some embodiments, device 101 returns to displaying user interface 1534 at the previous level of immersion (e.g., the level of immersion at which device 101 was displaying user interface 1534 when the sound 1560 was detected, such as shown in FIG. 15A) in response to the sound 1560 no longer being detected by device 101 and/or no longer satisfying the sound criteria (e.g., for a time threshold, such as 1, 3, 5, 10, 30, 60 seconds after sound 1560 is no longer detected by device 101). In some embodiments, device 101 does not return to displaying user interface 1534 at the previous level of immersion in response to the sound 1560 no longer being detected by device 101 and/or no longer satisfying the sound criteria—rather, in some embodiments, device 101 requires separate user input for increasing the level of immersion 1532 (e.g., similar to as described with reference to FIGS. 11A-11B) after having reduced it as described with reference to FIG. 15C.

Figure 16A:
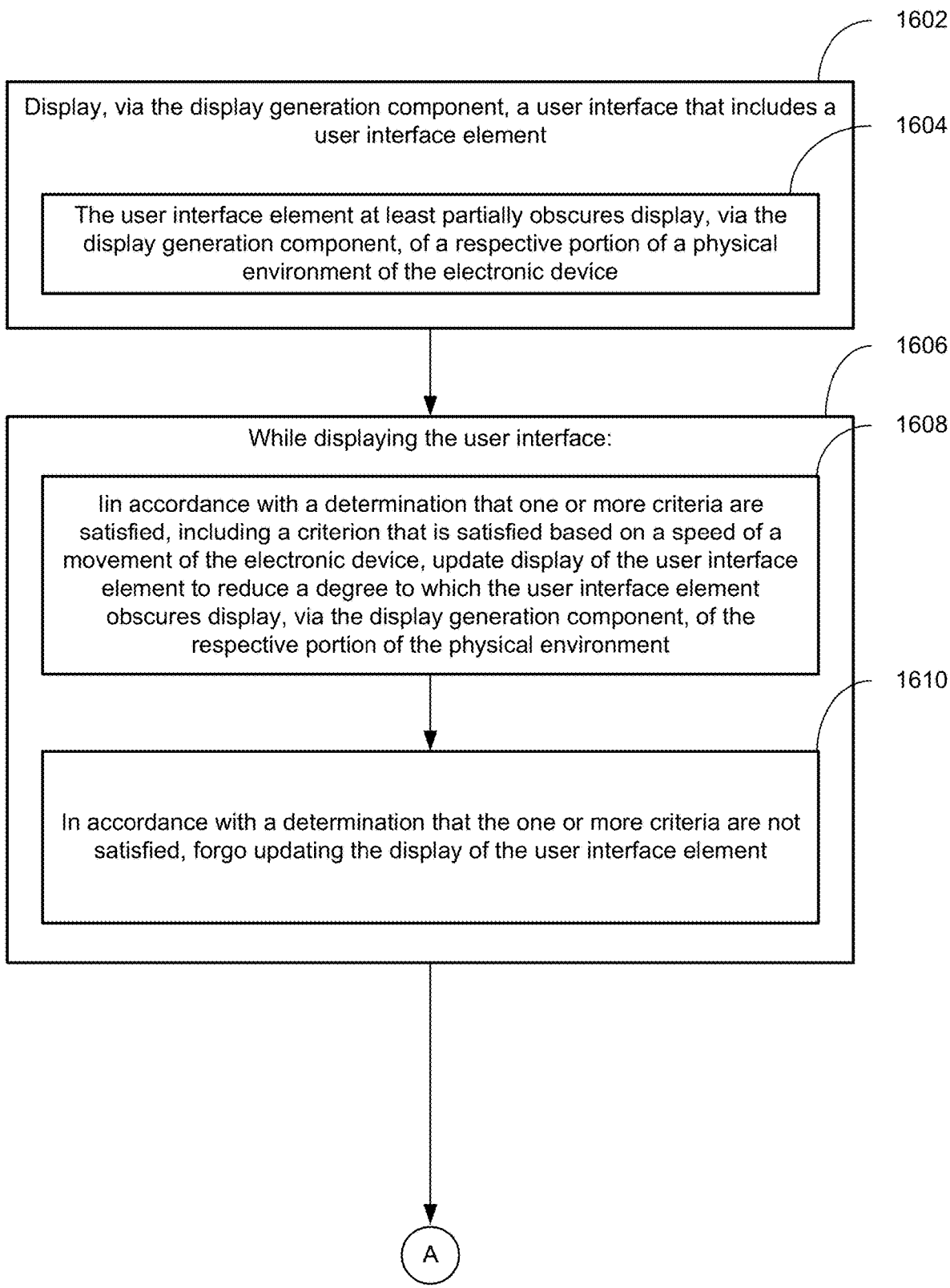
FIGS. 16A-16C is a flowchart illustrating a method of reducing the level of immersion associated with a user interface based on characteristics of the electronic device and/or physical environment of the electronic device in accordance with some embodiments.
Figure 16B:
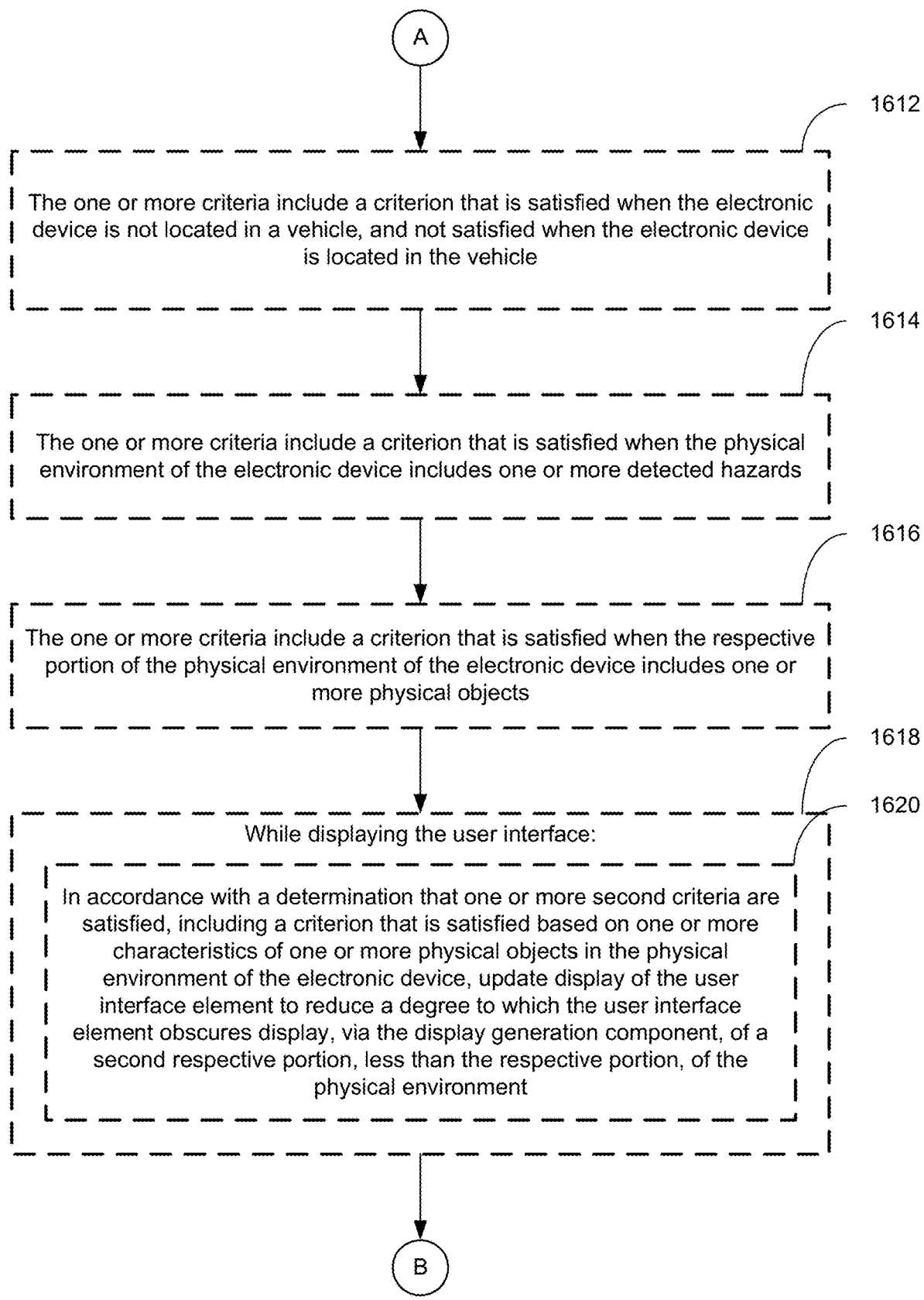
Figure 16C:
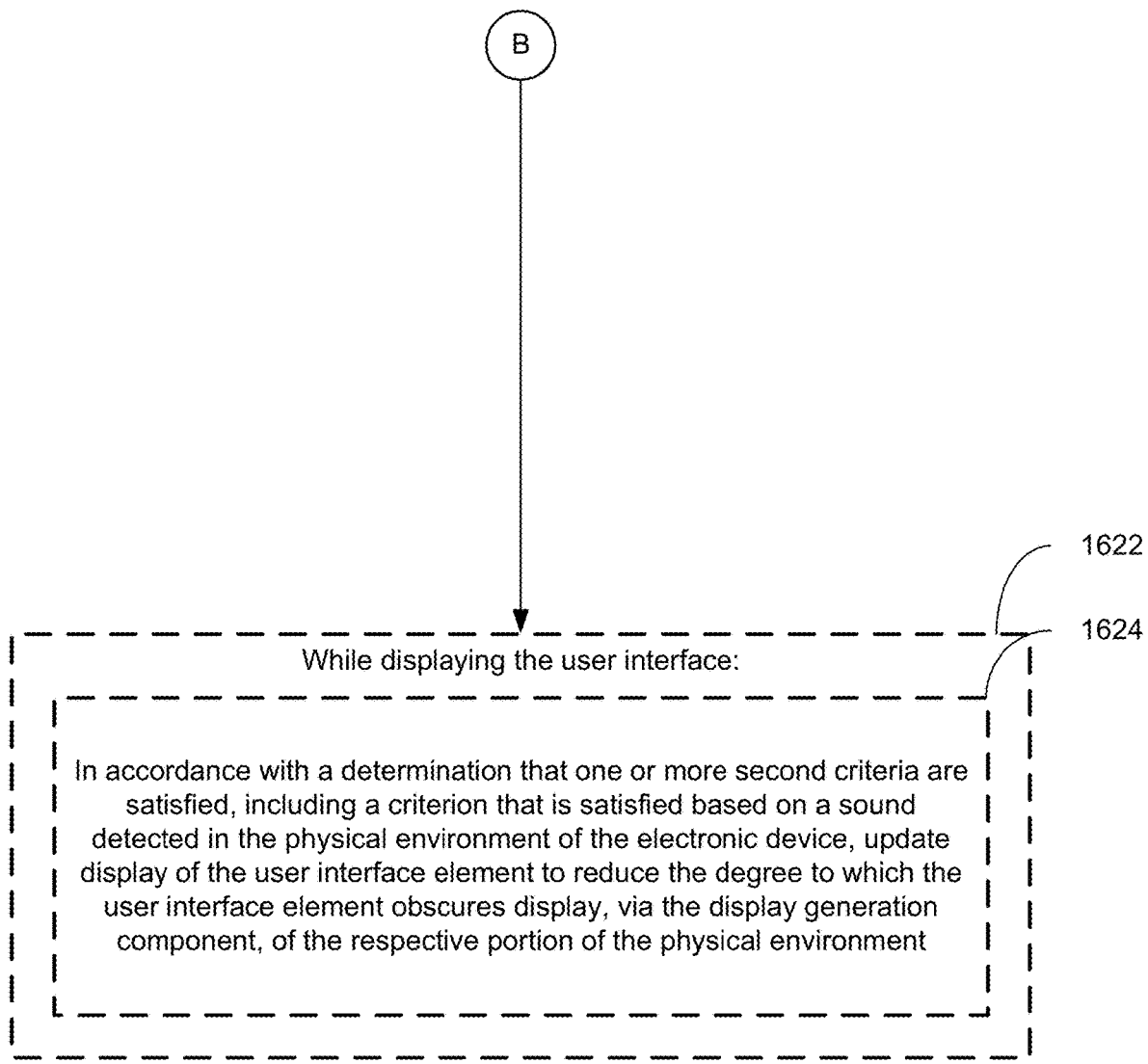

FIGS. 16A-16C is a flowchart illustrating a method 1600 of reducing the level of immersion associated with a user interface based on characteristics of the electronic device and/or physical environment of the electronic device in accordance with some embodiments. In some embodiments, the method 1600 is performed at a computer system (e.g., computer system 101 in FIG. 1 such as a tablet, smartphone, wearable computer, or head mounted device) including a display generation component (e.g., display generation component 120 in FIGS. 1, 3, and 4) (e.g., a heads-up display, a display, a touchscreen, a projector, etc.) and one or more cameras (e.g., a camera (e.g., color sensors, infrared sensors, and other depth-sensing cameras) that points downward at a user's hand or a camera that points forward from the user's head). In some embodiments, the method 1600 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 1600 are, optionally, combined and/or the order of some operations is, optionally, changed.

In the method 1600, in some embodiments, an electronic device (e.g., computer system 101 in FIG. 1) in communication with a display generation component and one or more input devices (e.g., a mobile device (e.g., a tablet, a smartphone, a media player, or a wearable device), or a computer) displays (1602) a user interface that includes a user interface element, such as user interface 1534 in FIG. 15A. In some embodiments, the electronic device is a mobile device (e.g., a tablet, a smartphone, a media player, or a wearable device), or a computer. In some embodiments, the display generation component is a display integrated with the electronic device (optionally a touch screen display), external display such as a monitor, projector, television, or a hardware component (optionally integrated or external) for projecting a user interface or causing a user interface to be visible to one or more users, etc. In some embodiments, the electronic device is in communication with one or more input devices that include an electronic device or component capable of receiving a user input (e.g., capturing a user input, detecting a user input, etc.) and transmitting information associated with the user input to the electronic device. Examples of input devices include a touch screen, mouse (e.g., external), trackpad (optionally integrated or external), touchpad (optionally integrated or external), remote control device (e.g., external), another mobile device (e.g., separate from the electronic device), a handheld device (e.g., external), a controller (e.g., external), a camera, a depth sensor, a motion sensor (e.g., a hand tracking device, a hand motion sensor), a physical mechanical input element included in the electronic device (e.g., a button, a rotating mechanical element, a switch, etc.) and/or an eye tracking device, etc.

In some embodiments, the electronic device displays a three-dimensional environment, such as a computer-generated reality (CGR) environment such as a virtual reality (VR) environment, a mixed reality (MR) environment, or an augmented reality (AR) environment, etc. that is generated, displayed, or otherwise caused to be viewable by the electronic device. In some embodiments, the user interface element is a virtual element or object (e.g., a user interface of an application on the electronic device, a virtual object displayed in the three-dimensional environment, etc.). In some embodiments, the electronic device is not displaying a three-dimensional environment, but rather simply displaying content (e.g., the user interface with the user interface element) via the display generation component. In some embodiments, the user interface element at least partially obscures display, via the display generation component, of a respective portion of a physical environment of the electronic device (1604), such as obscuring display of 1502a, 1504a, 1506a and 1508a in FIG. 15A (e.g., the display generation component optionally passes through the physical environment of the electronic device to the extent that virtual content displayed by the electronic device is not displayed overlaid on portions of that physical environment. In some embodiments, the user interface element displayed by the electronic device is displayed "in front of" or closer to the viewpoint of the electronic device than the respective portion of the physical environment of the electronic device (e.g., the respective portion including a person in the physical environment, an object in the physical environment, and/or etc.). As such, the user interface element optionally obscures/blocks display of a representation of respective portion of the physical environment via the display generation component (e.g., fully obscures display of the representation of the respective portion (e.g., the user interface element is fully opaque and/or fully covers the representation of the respective portion of the physical environment) or partially obscures display of the representation of the respective portion (e.g., the user interface element is translucent and/or does not fully cover the representation of the respective portion)). In some embodiments, the user interface and/or its content occludes an entirety of the physical environment such that no portion of the physical environment is visible via the display generation component. In some embodiments, the user interface and/or its content occludes less than an entirety of the physical environment such that portions of the physical environment are visible via the display generation component, while other portions (e.g., the respective person) are not visible via the display generation component. In some embodiments, the electronic device displays the user interface at a respective level of immersion as described with reference to methods 1000, 1200 and 1400.

In some embodiments, while displaying the user interface (1606), in accordance with a determination that one or more criteria are satisfied, including a criterion that is satisfied based on a speed of a movement of the electronic device, such as shown in FIG. 15B (e.g., the speed with which the electronic device is moving, such as detected via an accelerometer, a GPS position detector, and/or other inertial measurement unit (IMU), is greater than a speed threshold (e.g., 3, 5, 10 miles per hour). For example, the user of the electronic device is running while holding, wearing, and/or otherwise using the electronic device), the electronic device updates (1608) display of the user interface element to reduce a degree to which the user interface element obscures display, via the display generation component, of the respective portion of the physical environment, such as reducing display of user interface 1534 in FIG. 15B such that representations 1502b, 1504b, 1506b and/or 1508b are visible via display generation component 120 in FIG. 15B (e.g., ceasing to display the user interface element, such that it is no longer "in front of" the respective portion via the display generation component, and therefore such that a representation of the respective portion, in the physical environment of the electronic device, is visible via the display generation component). In some embodiments, the electronic device increases a translucency of the user interface element such that the respective portion becomes visible (or more visible) through the user interface element. In some embodiments, the electronic device moves the user interface element in the user interface such that it is no longer "in front of" the respective portion of the physical environment of the electronic device. In some embodiments, the electronic device updates the entirety of the displayed user interface (e.g., everything displayed in the user interface) as described above. In some embodiments, the electronic device only updates the portion of the user interface (e.g., the objects displayed in that portion of the user interface) that occludes the respective portion, and does not modify display of the remainder of the user interface. In some embodiments, the electronic device reduces the level of immersion to a low level of immersion or no level of immersion, as described with reference to method 1000. In some embodiments, the faster the speed of the movement of the electronic device, the more the electronic device reduces the level of immersion.

In some embodiments, in accordance with a determination that the one or more criteria are not satisfied, the electronic device forgoes updating (1610) the display of the user interface element. For example, not modifying display of the user interface and/or user interface element (e.g., maintaining the level of immersion of the electronic device). As such, the user interface element optionally continues to obscure display of the respective portion via the display generation component to the same degree as it was before. The above-described manner of selectively changing display of the user interface based on the speed of the electronic device provides a quick and efficient manner of allowing the user of the electronic device to see the physical environment of the electronic device via the display generation component, but only when likely relevant (e.g., for safety when using the electronic device), which simplifies the interaction between the user and the electronic device and enhances the operability of the electronic device and makes the user-device interface more efficient (e.g., by not unnecessarily updating display of the user interface, thus maintaining continuity of the displayed user interface and avoiding user inputs to reverse an erroneous update of the user interface), which additionally reduces power usage and improves battery life of the electronic device by enabling the user to use the electronic device more quickly and efficiently, while reducing errors in usage.

In some embodiments, the one or more criteria include a criterion that is satisfied when the electronic device is not located in a vehicle (e.g., an automobile, an airplane, a boat, a train, a bus, etc.), and not satisfied when the electronic device is located in the vehicle (1612). For example, if the electronic device determines that it is located in a vehicle, then updating the display of the user interface element to reduce the degree to which the user interface element obscures display, via the display generation component, of the respective portion of the physical environment is optionally forgone even if the speed of movement of the electronic device satisfies the criterion that is satisfied based on the speed of the movement of the electronic device. In some embodiments, the speed of the movement of the electronic device that causes the updating of the display of the user interface element as described above is the speed of the movement of the electronic device with respect to its immediate surroundings in the physical environment—therefore, in some embodiments, while in a vehicle—even if the vehicle is moving at a speed that would satisfy the criterion that is satisfied based on the speed of the movement of the electronic device—the electronic device would optionally not be moving quickly relative to its immediate surroundings in the physical environment (e.g., within the vehicle), and therefore would optionally not update the display of the user interface element as described above. In some embodiments, the electronic device determines it is in a vehicle based on characteristics of its movement (e.g., moving faster than a user could move without being in a vehicle), based on image recognition of its surroundings, and/or based on communication with an electronic system within the vehicle (e.g., the infotainment system of the vehicle). In some embodiments, if the electronic device detects movement at a high speed using a first set of sensors (e.g., via IMU) but does not detect movement with respect to its immediate surroundings in physical environment using a second set of sensors (e.g., via an optical camera), the electronic device determines that it is in a vehicle or in another location in which the detected high speed of movement via the first set of sensors should not (and will not) cause updating of the user interface element as described here. The above-described manner of accounting for whether the electronic device is traveling in a vehicle provides a quick and efficient manner of avoiding unnecessarily modifying display of the user interface element based on speed in situations where the speed is not with respect to the immediate surroundings of the electronic device, which simplifies the interaction between the user and the electronic device and enhances the operability of the electronic device and makes the user-device interface more efficient (e.g., by not unnecessarily updating display of the user interface, thus maintaining continuity of the displayed user interface and avoiding user inputs to reverse an erroneous update of the user interface), which additionally reduces power usage and improves battery life of the electronic device by enabling the user to use the electronic device more quickly and efficiently, while reducing errors in usage.

In some embodiments, the one or more criteria include a criterion that is satisfied when the physical environment of the electronic device includes one or more detected hazards (1614) (e.g., stairs that the user can fall down, an object that the user can trip over, etc.). In some embodiments, the electronic device uses one or more sensors (e.g., cameras) to detect and/or identify the one or more hazards in the physical environment of the electronic device. In some embodiments, the electronic device detects and/or responds to the detected hazards in manners described with reference to method 1400 (e.g., based on proximity to the user, based on movement characteristics of the hazards, etc.). The above-described manner of selectively changing display of the user interface based on the existence of hazards in the physical environment of the electronic device provides a quick and efficient manner of allowing the user of the electronic device to see the physical environment of the electronic device via the display generation component, but only when likely relevant (e.g., for safety when using the electronic device), which simplifies the interaction between the user and the electronic device and enhances the operability of the electronic device and makes the user-device interface more efficient (e.g., by not unnecessarily updating display of the user interface when there are no hazards in the physical environment of the electronic device, thus maintaining continuity of the displayed user interface and avoiding user inputs to reverse an erroneous update of the user interface), which additionally reduces power usage and improves battery life of the electronic device by enabling the user to use the electronic device more quickly and efficiently, while reducing errors in usage.

In some embodiments, the one or more criteria include a criterion that is satisfied when the respective portion of the physical environment of the electronic device includes one or more physical objects (1616), such as in FIGS. 15A-15B. For example, in some embodiments, the electronic device only modifies display of the user interface element if the part of the physical environment obscured by the user interface element is determined, by the electronic device, to include one or more physical objects (e.g., hazards as described herein with reference to method 1600 and/or as described with reference to method 1400). In some embodiments, if the part of the physical environment obscured by the user interface element is determined, by the electronic device, to not include one or more physical objects (e.g., hazards; for example, if a different part of the physical environment of the electronic device includes the one or more physical objects), then the electronic device optionally does not modify display of the user interface element as described above. The above-described manner of selectively changing display of the user interface based on whether the displayed user interface actually occludes display of physical objects that might pose a danger to the user of the electronic device provides a quick and efficient manner of allowing the user of the electronic device to see the physical environment of the electronic device via the display generation component, but only when likely relevant (e.g., for safety when using the electronic device), which simplifies the interaction between the user and the electronic device and enhances the operability of the electronic device and makes the user-device interface more efficient (e.g., by not unnecessarily updating display of the user interface when there are no objects being occluded by the user interface displayed by the electronic device, thus maintaining continuity of the displayed user interface and avoiding user inputs to reverse an erroneous update of the user interface), which additionally reduces power usage and improves battery life of the electronic device by enabling the user to use the electronic device more quickly and efficiently, while reducing errors in usage.

In some embodiments, while displaying the user interface (1618), in accordance with a determination that one or more second criteria are satisfied, including a criterion that is satisfied based on one or more characteristics of one or more physical objects in the physical environment of the electronic device, such as described with reference to FIGS. 13A-13C (e.g., criteria about physical objects in the physical environment of the electronic device that cause the electronic device to make representations of those physical objects more visible via the display generation component than they were before, such as described with reference to method 1400 and/or as described herein with reference to method 1600. In some embodiments, the one or more second criteria are not satisfied based on the speed of the movement of the electronic device), the electronic device updates (1620) display of the user interface element to reduce a degree to which the user interface element obscures display, via the display generation component, of a second respective portion, less than the respective portion, of the physical environment, such as comparing FIGS. 13A-13C to FIGS. 15A-15C. For example, in some embodiments, if characteristics of one or more physical objects in the physical environment of the electronic device cause the electronic device to modify the display of the user interface displayed via the display generation component, the electronic device only modifies display of those portions of the user interface that obscure display of representations of those one or more physical objects via the display generation component (e.g., to make the representations of those one or more physical objects more visible via the display generation component). In some embodiments, the electronic device maintains the display (e.g., does not modify the display) of other portions of the user interface that do not obscure display of the representations of those one or more physical objects. In contrast, in some embodiments, if the speed of the movement of the electronic device is what causes the electronic device to modify the display of the user interface displayed via the display generation component, the electronic device optionally modifies a larger part (or all) of the user interface displayed via the display generation component to make a larger part (or all) of the representation of the physical environment visible via the display generation component (e.g., in some embodiments, independent of the locations of (e.g., any) physical objects in the physical environment of the electronic device). The above-described manner of modifying display of different portions of the user interface depending on what causes the modification to occur provides a quick and efficient manner of modifying only those portion(s) of the user interface most likely to be needed to be modified (e.g., for safety when using the electronic device), which simplifies the interaction between the user and the electronic device and enhances the operability of the electronic device and makes the user-device interface more efficient (e.g., by not unnecessarily updating display of too much of the user interface, thus maintaining greater continuity of the displayed user interface and avoiding user inputs to reverse an erroneous update of the user interface), which additionally reduces power usage and improves battery life of the electronic device by enabling the user to use the electronic device more quickly and efficiently, while reducing errors in usage.

In some embodiments, while displaying the user interface (1622), in accordance with a determination that one or more second criteria are satisfied, including a criterion that is satisfied based on a sound detected in the physical environment of the electronic device, such as sound 1560 in FIG. 15C (e.g., the criterion is satisfied if the electronic device detects, via a microphone, a sound that is normally associated with a potentially dangerous situation, such as the sound of something breaking, the voice of a person in the physical environment of the electronic device having a high stress value, the sound of an alarm (e.g., smoke, fire, carbon monoxide, burglar, etc.), etc. In some embodiments, the one or more second criteria include another criterion that is satisfied when the volume of the sound is higher than a threshold level to indicate that the source of the sound is nearby/in the nearby physical environment of the electronic device, and is not satisfied otherwise. In some embodiments, the one or more second criteria include a criterion that is satisfied when a characteristic of the sound (e.g., frequency, etc.) other than the volume of the sound indicates that the source of the sound is nearby/in the nearby physical environment of the electronic device, and is not satisfied otherwise), the electronic device updates (1624) display of the user interface element to reduce the degree to which the user interface element obscures display, via the display generation component, of the respective portion of the physical environment such as reducing display of user interface 1534 in FIG. 15C such that representations 1502b, 1504b, 1506b and/or 1508b are visible via display generation component 120 in FIG. 15C. In some embodiments, the electronic device responds similarly (or in the same way) to sounds that satisfy the one or more second criteria as it does when the one or more criteria (e.g., including a speed-based criterion) is satisfied. In some embodiments, the closer the source of the sound to the electronic device, the more the electronic device reduces the level of immersion. In some embodiments, if the one or more second criteria are not satisfied, the electronic device does not reduce the level of immersion based on the detected sound. The above-described manner of selectively changing display of the user interface based on sound detected by the electronic device provides a quick and efficient manner of allowing the user of the electronic device to see the physical environment of the electronic device via the display generation component based on multiple potentially relevant triggers, which simplifies the interaction between the user and the electronic device and enhances the operability of the electronic device and makes the user-device interface more efficient (e.g., by providing for more ways via which the electronic device makes the physical environment more visible, thus avoiding requiring additional user input to make the physical environment more visible), which additionally reduces power usage and improves battery life of the electronic device by enabling the user to use the electronic device more quickly and efficiently, while reducing errors in usage.

In some embodiments, aspects/operations of methods 800, 1000, 1200, 1400, and 1600 may be interchanged, substituted, and/or added between these methods. For brevity, these details are not repeated here.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

The invention claimed is:

1. A method comprising:
  at an electronic device in communication with a display generation component and an eye tracking device:
    concurrently displaying, via the display generation component:
      a first user interface associated with a first application; and
      a second user interface surrounding at least a portion of the first user interface, wherein the second user interface includes a respective portion of a three-dimensional environment;
    while concurrently displaying the first user interface and the portion of the second user interface that surrounds at least the portion of the first user interface, detecting, via the eye tracking device, that a gaze of a user is directed to the first user interface; and
    in response to detecting that the gaze of the user is directed to the first user interface:
      in accordance with a determination that one or more criteria are satisfied, deemphasizing the second user interface with respect to the first user interface, including deemphasizing the respective portion of the three-dimensional environment while maintaining display of the respective portion of the three-dimensional environment.

2. The method of claim 1, wherein the one or more criteria include a criterion that is satisfied when the first application is an application of a first type, and is not satisfied when the first application is an application of a second type, different from the first type, the method further comprising:
  in response to detecting that the gaze of the user is directed to the first user interface:
    in accordance with a determination that the one or more criteria are not satisfied, forgoing deemphasizing the second user interface with respect to the first user interface.

3. The method of claim 1, further comprising:
after detecting that the gaze of the user is directed to the first user interface and while displaying the second user interface as deemphasized with respect to the first user interface, detecting, via the eye tracking device, that the gaze of the user is directed to the second user interface; and in response to detecting that the gaze of the user is directed to the second user interface, in accordance with a determination that one or more second criteria are satisfied, emphasizing the second user interface with respect to the first user interface.

4. The method of claim 1, wherein:
before detecting that the gaze of the user is directed to the first user interface, the first user interface and the second user interface are displayed concurrently with a virtual object that is not in a physical environment of the electronic device, and deemphasizing the second user interface with respect to the first user interface includes deemphasizing the virtual object with respect to the first user interface.

5. The method of claim 1, wherein:
before detecting that the gaze of the user is directed to the first user interface, the first user interface and the second user interface are displayed concurrently with a virtual object that is not in a physical environment of the electronic device, and deemphasizing the second user interface with respect to the first user interface includes
deemphasizing the virtual object with respect to the first user interface.

6. The method of claim 1, wherein the second user interface includes a virtual object that is not in a physical environment of the electronic device.

7. The method of claim 1, wherein:
before detecting that the gaze of the user is directed to the first user interface, the first user interface is displayed at a first level of immersion, and deemphasizing the second user interface with respect to the first user interface includes maintaining display of the first user interface at the first level of immersion.

8. The method of claim 1, wherein the first user interface is displayed overlaid on the second user interface.

9. An electronic device, comprising:
one or more processors;
memory; and
one or more programs, wherein the one or more programs are stored in the memory and configured to be executed by the one or more processors, the one or more programs including instructions for:
concurrently displaying, via a display generation component:
a first user interface associated with a first application; and
a second user interface surrounding at least a portion of the first user interface, wherein the second user interface includes a respective portion of a three-dimensional environment;
while concurrently displaying the first user interface and the portion of the second user interface that surrounds at least the portion of the first user interface, detecting, via an eye tracking device, that a gaze of a user is directed to the first user interface; and
in response to detecting that the gaze of the user is directed to the first user interface:
in accordance with a determination that one or more criteria are satisfied, deemphasizing the second user interface with respect to the first user interface, including deemphasizing the respective portion of the three-dimensional environment while maintaining display of the respective portion of the three-dimensional environment while maintaining display of the respective portion of the three-dimensional environment.

10. A non-transitory computer readable storage medium storing one or more programs, the one or more programs comprising instructions, which when executed by one or more processors of an electronic device, cause the electronic device to perform a method comprising:
concurrently displaying, via a display generation component:
a first user interface associated with a first application; and
a second user interface surrounding at least a portion of the first user interface, wherein the second user interface includes a respective portion of a three-dimensional environment;
while concurrently displaying the first user interface and the portion of the second user interface that surrounds at least the portion of the first user interface, detecting, via an eye tracking device, that a gaze of a user is directed to the first user interface; and
in response to detecting that the gaze of the user is directed to the first user interface:
in accordance with a determination that one or more criteria are satisfied, deemphasizing the second user interface with respect to the first user interface, including deemphasizing the respective portion of the three-dimensional environment while maintaining display of the respective portion of the three-dimensional environment.

11. The method of claim 1, further comprising:
in response to detecting that the gaze of the user is directed to the first user interface,
while displaying the second user interface deemphasized with respect to the first user interface, detecting, via the eye tracking device that the gaze of the user is directed to the respective portion of the three-dimensional environment; and
in response to detecting the gaze of the user is directed to the respective portion of the three-dimensional environment, ceasing to deemphasize the second user interface, including ceasing to deemphasize the respective portion of the three-dimensional environment.

12. The method of claim 7, further comprising:
while displaying the first user interface at the first level of immersion, receiving, via one or more input devices, an input corresponding to a request to change a current level of immersion; and
in response to receiving the input corresponding to the request to change the current level of immersion, displaying the first user interface at a second level of immersion different from the first level of immersion in accordance with the input corresponding to the request to change the current level of immersion.

13. The electronic device of claim 9, wherein the one or more criteria include a criterion that is satisfied when the first application is an application of a first type, and is not satisfied when the first application is an application of a second type, different from the first type, wherein the one or more programs further include instructions for:
in response to detecting that the gaze of the user is directed to the first user interface:

in accordance with a determination that the one or more criteria are not satisfied, forgoing deemphasizing the second user interface with respect to the first user interface.

14. The electronic device of claim 9, wherein the one or more programs further include instructions for:
   after detecting that the gaze of the user is directed to the first user interface and while displaying the second user interface as deemphasized with respect to the first user interface, detecting, via the eye tracking device, that the gaze of the user is directed to the second user interface; and
   in response to detecting that the gaze of the user is directed to the second user interface, in accordance with a determination that one or more second criteria are satisfied, emphasizing the second user interface with respect to the first user interface.

15. The electronic device of claim 9, wherein:
   before detecting that the gaze of the user is directed to the first user interface, the first user interface and the second user interface are displayed concurrently with a virtual object that is not in a physical environment of the electronic device, and
   deemphasizing the second user interface with respect to the first user interface includes deemphasizing the virtual object with respect to the first user interface.

16. The electronic device of claim 9, wherein:
   before detecting that the gaze of the user is directed to the first user interface, the first user interface and the second user interface are displayed concurrently with a virtual object that is not in a physical environment of the electronic device, and
   deemphasizing the second user interface with respect to the first user interface includes deemphasizing the virtual object with respect to the first user interface.

17. The electronic device of claim 9, wherein the second user interface includes a virtual object that is not in a physical environment of the electronic device.

18. The electronic device of claim 9, wherein:
   before detecting that the gaze of the user is directed to the first user interface, the first user interface is displayed at a first level of immersion, and
   deemphasizing the second user interface with respect to the first user interface includes maintaining display of the first user interface at the first level of immersion.

19. The electronic device of claim 18, wherein the one or more programs further include instructions for:
   while displaying the first user interface at the first level of immersion, receiving, via one or more input devices, an input corresponding to a request to change a current level of immersion; and
   in response to receiving the input corresponding to the request to change the current level of immersion, displaying the first user interface at a second level of immersion different from the first level of immersion in accordance with the input corresponding to the request to change the current level of immersion.

20. The electronic device of claim 9, wherein the first user interface is displayed overlaid on the second user interface.

21. The electronic device of claim 9, wherein the one or more programs further include instructions for:
   in response to detecting that the gaze of the user is directed to the first user interface,
   while displaying the second user interface deemphasized with respect to the first user interface, detecting, via the eye tracking device that the gaze of the user is directed to the respective portion of the three-dimensional environment; and
   in response to detecting the gaze of the user is directed to the respective portion of the three-dimensional environment, ceasing to deemphasize the second user interface, including ceasing to deemphasize the respective portion of the three-dimensional environment.

22. The non-transitory computer readable medium of claim 10, wherein the one or more criteria include a criterion that is satisfied when the first application is an application of a first type, and is not satisfied when the first application is an application of a second type, different from the first type, the method further comprising:
   in response to detecting that the gaze of the user is directed to the first user interface:
      in accordance with a determination that the one or more criteria are not satisfied, forgoing deemphasizing the second user interface with respect to the first user interface.

23. The non-transitory computer readable medium of claim 10, wherein the method further comprises:
   after detecting that the gaze of the user is directed to the first user interface and while displaying the second user interface as deemphasized with respect to the first user interface, detecting, via the eye tracking device, that the gaze of the user is directed to the second user interface; and
   in response to detecting that the gaze of the user is directed to the second user interface, in accordance with a determination that one or more second criteria are satisfied, emphasizing the second user interface with respect to the first user interface.

24. The non-transitory computer readable medium of claim 10, wherein:
   before detecting that the gaze of the user is directed to the first user interface, the first user interface and the second user interface are displayed concurrently with a virtual object that is not in a physical environment of the electronic device, and
   emphasizing the second user interface with respect to the first user interface includes deemphasizing the virtual object with respect to the first user interface.

25. The non-transitory computer readable medium of claim 10, wherein:
   before detecting that the gaze of the user is directed to the first user interface, the first user interface and the second user interface are displayed concurrently with a virtual object that is not in a physical environment of the electronic device, and
   deemphasizing the second user interface with respect to the first user interface includes deemphasizing the virtual object with respect to the first user interface.

26. The non-transitory computer readable medium of claim 10, wherein the second user interface includes a virtual object that is not in a physical environment of the electronic device.

27. The non-transitory computer readable medium of claim 10, wherein:
   before detecting that the gaze of the user is directed to the first user interface, the first user interface is displayed at a first level of immersion, and
   deemphasizing the second user interface with respect to the first user interface includes maintaining display of the first user interface at the first level of immersion.

28. The non-transitory computer readable medium of claim 27, wherein the method further comprises:

while displaying the first user interface at the first level of immersion, receiving, via one or more input devices, an input corresponding to a request to change a current level of immersion; and in response to receiving the input corresponding to the request to change the current level of immersion, displaying the first user interface at a second level of immersion different from the first level of immersion in accordance with the input corresponding to the request to change the current level of immersion.

29. The non-transitory computer readable medium of claim 10, wherein the first user interface is displayed overlaid on the second user interface.

30. The non-transitory computer readable medium of claim 10, wherein the method further comprises:

in response to detecting that the gaze of the user is directed to the first user interface, while displaying the second user interface deemphasized with respect to the first user interface, detecting, via the eye tracking device that the gaze of the user is directed to the respective portion of the three-dimensional environment; and in response to detecting the gaze of the user is directed to the respective portion of the three-dimensional environment, ceasing to deemphasize the second user interface, including ceasing to deemphasize the respective portion of the three-dimensional environment.

* * * * *

UNITED STATES PATENT AND TRADEMARK OFFICE
CERTIFICATE OF CORRECTION

| | | |
|---|---|---|
| PATENT NO. | : 11,995,285 B2 | Page 1 of 1 |
| APPLICATION NO. | : 17/932655 | |
| DATED | : May 28, 2024 | |
| INVENTOR(S) | : Nicholas W. Henderson et al. | |

It is certified that error appears in the above-identified patent and that said Letters Patent is hereby corrected as shown below:

In the Claims

In Column 96, Line 41, Claim 24, delete "emphasizing" and insert -- deemphasizing --.

Signed and Sealed this
Sixteenth Day of September, 2025

Coke Morgan Stewart
*Acting Director of the United States Patent and Trademark Office*